(12) United States Patent
Tsutsumi et al.

(10) Patent No.: US 9,350,018 B2
(45) Date of Patent: May 24, 2016

(54) NEGATIVE ELECTRODE FOR USE IN SECONDARY BATTERY AND SECONDARY BATTERY INCLUDING THE SAME

(75) Inventors: Kazuo Tsutsumi, Akashi (JP); Kazuya Nishimura, Akashi (JP); Tomoaki Takasaki, Akashi (JP); Tetsuo Sakai, Ikeda (JP); Jinhan Yao, Ikeda (JP); Takashi Mukai, Ikeda (JP)

(73) Assignees: KAWASAKI JUKOGYO KABUSHIKI KAISHA, Kobe-shi (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 345 days.

(21) Appl. No.: 13/824,877

(22) PCT Filed: Mar. 11, 2011

(86) PCT No.: PCT/JP2011/001446
§ 371 (c)(1),
(2), (4) Date: Jun. 24, 2013

(87) PCT Pub. No.: WO2012/042696
PCT Pub. Date: Apr. 5, 2012

(65) Prior Publication Data
US 2013/0273402 A1 Oct. 17, 2013

(30) Foreign Application Priority Data
Sep. 30, 2010 (JP) .................. 2010-221430

(51) Int. Cl.
*H01M 4/38* (2006.01)
*H01M 4/48* (2010.01)
(Continued)

(52) U.S. Cl.
CPC ................ *H01M 4/383* (2013.01); *H01M 4/48* (2013.01); *H01M 4/50* (2013.01); *H01M 4/52* (2013.01); *H01M 10/30* (2013.01); *Y02E 60/124* (2013.01)

(58) Field of Classification Search
CPC ......... H01M 4/38; H01M 4/383; H01M 4/48; H01M 4/50; H01M 4/52; H01M 10/30
See application file for complete search history.

(56) References Cited

U.S. PATENT DOCUMENTS

| 5,376,475 A | 12/1994 | Ovshinsky et al. |
| 6,403,253 B1 | 6/2002 | Wainwright et al. |

(Continued)

FOREIGN PATENT DOCUMENTS

| CN | 201160087 Y | 12/2008 |
| JP | 2003-317794 A | 11/2003 |

(Continued)

OTHER PUBLICATIONS

Machine Translation of: JP 2003/317794A, Tsutsumi et al., Nov. 7, 2003.*

(Continued)

*Primary Examiner* — Kenneth Douyette
(74) *Attorney, Agent, or Firm* — Marshall, Gerstein & Borun LLP

(57) ABSTRACT

A secondary battery includes: a fiber negative electrode having a surface on which a negative electrode active material coating is formed, the coating containing a compound of $A_aM_bX_cZ_d$; a fiber positive electrode including a positive electrode active material coating containing nickel hydroxide; an aqueous electrolyte solution; and a separator. The negative electrode coating has an uncoated surface. A is selected from the group consisting of Li, Na, K, Rb, Cs, Be, Mg, Ca, Sr, and Ba; M is selected from the group consisting of Ti, V, Cr, Mn, Fe, Co, Ni, Cu, Nb, Mo, Ru, Pd, Ag, Ta, W, Pr, Sm, Eu, and Pb; X is selected from the group consisting of B, Al, Si, P, S, Ga, and Ge; Z is selected from the group consisting of O, S, N, F, Cl, Br, and I; and $0 \leq a \leq 6$, $1 \leq b \leq 5$, $0 \leq c \leq 4$, $0 < d \leq 12$, and $0 \leq a/b \leq 4$.

9 Claims, 28 Drawing Sheets

(51) Int. Cl.
*H01M 4/50* (2010.01)
*H01M 4/52* (2010.01)
*H01M 10/30* (2006.01)

(56) References Cited

U.S. PATENT DOCUMENTS

| | | | |
|---|---|---|---|
| 2008/0274394 A1* | 11/2008 | Schormann et al. | 429/50 |
| 2008/0280141 A1* | 11/2008 | Dobbs et al. | 428/403 |
| 2008/0318133 A1* | 12/2008 | Matsuyama et al. | 429/300 |
| 2011/0123858 A1* | 5/2011 | Zaghib | C01D 15/02 429/188 |
| 2011/0287320 A1 | 11/2011 | Takasaki et al. | |
| 2012/0040246 A1 | 2/2012 | Sakai et al. | |

FOREIGN PATENT DOCUMENTS

| | | |
|---|---|---|
| JP | 2005-108646 A | 4/2005 |
| JP | 4301527 | 7/2009 |
| TW | 201023417 A | 6/2010 |
| WO | WO-95/21470 A1 | 8/1995 |
| WO | WO-2008/099609 A1 | 8/2008 |
| WO | WO-2010/089991 A1 | 8/2010 |

OTHER PUBLICATIONS

Office Action for Taiwanese Patent Application No. 100108860, with English-language search report, mailed Aug. 7, 2013.
Extended European Search Report for Application No. 11828266.4, dated Nov. 25, 2013.
Office Action for Chinese Patent Application No. 201180045490.1, dated Oct. 23, 2014.
Deutscher et al., "Investigations on an Aqueous Lithium Secondary Cell," Journal of Power Sources, No. 55, pp. 41-46, 1995.
Shinyama et al., "Improvement of High-Temperature Characteristics of the Sintered Nickel Positive Electrode for an Alkaline Storage Battery," Electrochemistry, vol. 71, No. 8, pp. 686-690, 2003.
International Search Report for PCT/JP2011/001446, mailed May 10, 2011.

* cited by examiner

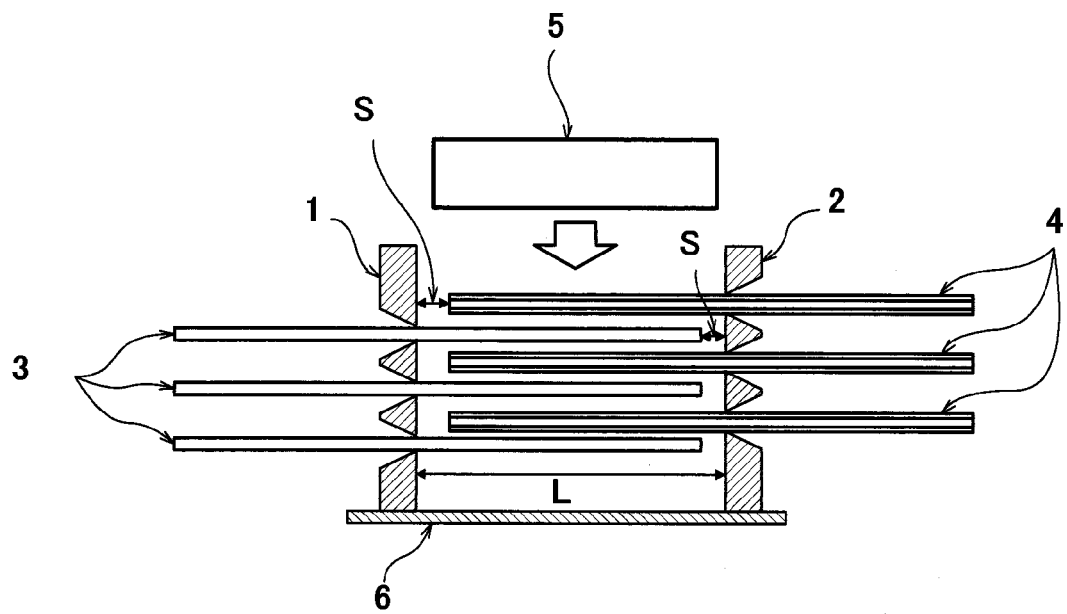
Fig. 1
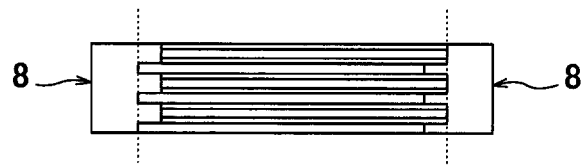
Fig. 2A
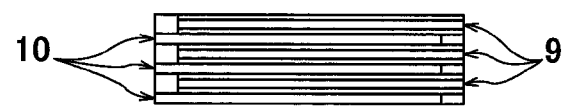
Fig. 2B
Fig. 2C

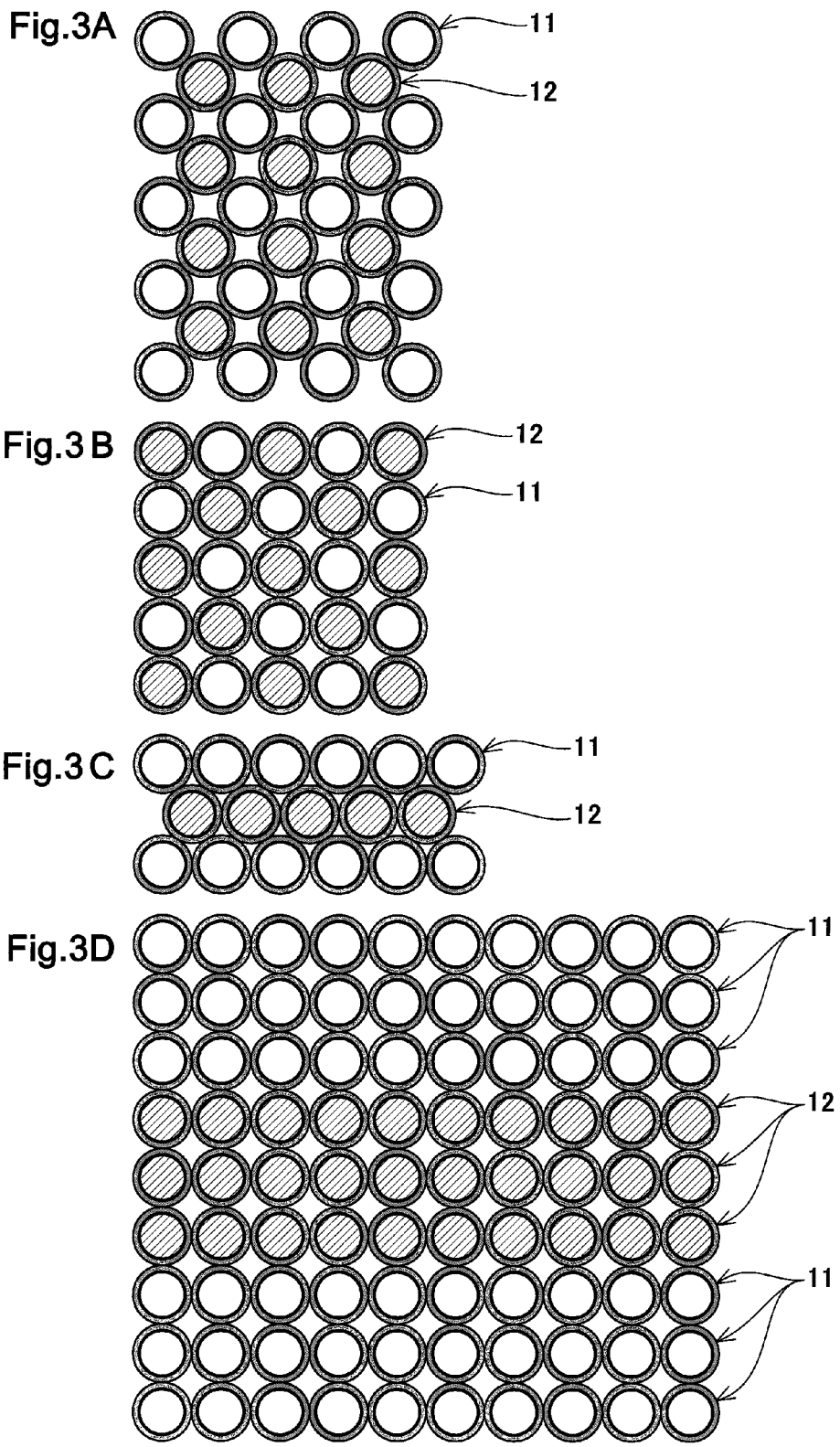

Fig.4A
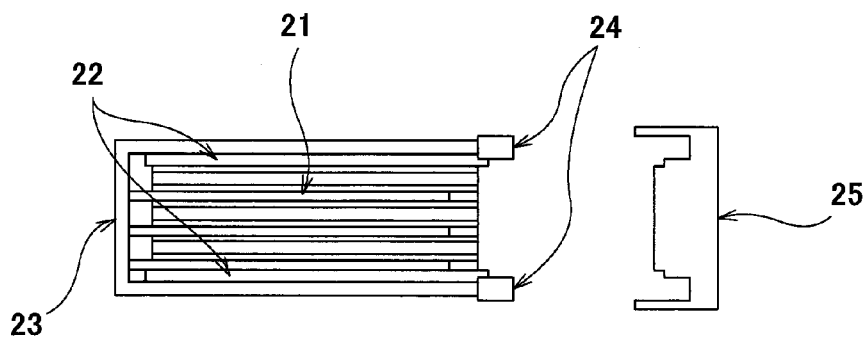
Fig. 4B
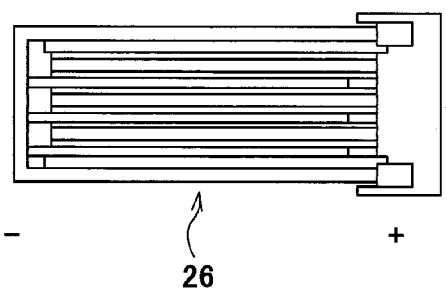
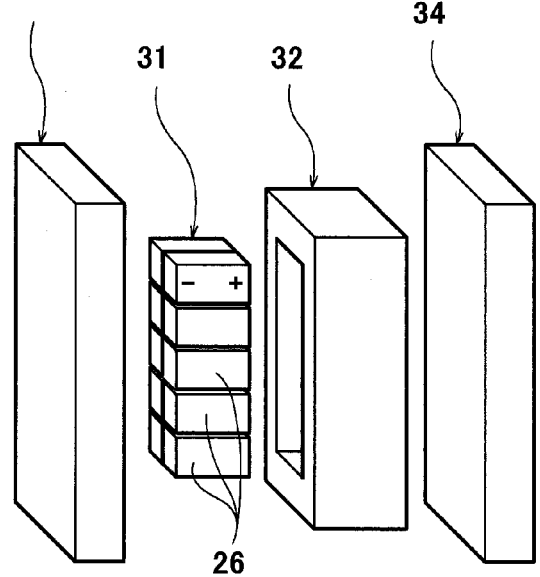
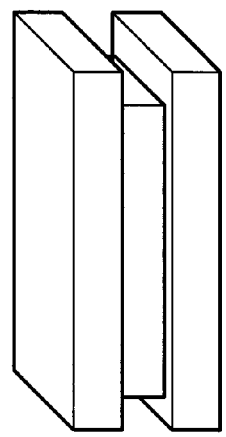
Fig.5A Fig.5B

NEGATIVE ELECTRODE FOR USE IN SECONDARY BATTERY AND SECONDARY BATTERY INCLUDING THE SAME

TECHNICAL FIELD

The present invention relates to a negative electrode for use in a secondary battery, which is formed by coating the surface of a carbon fiber current collector with a negative electrode active material containing a metal element capable of redox reactions, and to a novel aqueous secondary battery including the negative electrode.

BACKGROUND ART

Currently known secondary batteries using an aqueous alkali solution as an electrolyte solution include nickel-metal hydride batteries, nickel-cadmium batteries, nickel-iron batteries, and nickel-zinc batteries. Nickel hydroxide is used for a positive electrode of such an alkaline secondary battery. In the case of a nickel-cadmium battery, a mixture of metal cadmium and cadmium hydroxide is used for a negative electrode. In the case of a nickel-iron battery, a mixture of metal iron and iron hydroxide is used for a negative electrode. In the case of a nickel-zinc battery, a mixture of metal zinc and zinc hydroxide is used for a negative electrode. In the case of a nickel-metal hydride battery, a hydrogen storage alloy is used for a negative electrode. In the case of an alkaline secondary battery, an aqueous alkali solution, such as a caustic potash solution or a caustic soda solution in which lithium hydroxide is dissolved, is usually used as an electrolyte solution.

Among these secondary batteries, in the case of a nickel-cadmium battery, a nickel-iron battery, and a nickel-zinc battery, dissolution and redeposition reactions occur at the negative electrode when charging and discharging are performed. Therefore, these batteries are inferior in terms of power capability. In the case of a nickel-zinc battery, a negative electrode active material is deposited in a dendritic form at the time of redeposition. Accordingly, nickel-zinc batteries are short-lived and have a risk of short-circuiting. Although nickel-cadmium batteries were wide spread, their capacity per volume is approximately half of that of nickel-metal hydride batteries. Moreover, effects of cadmium on the human body have been an issue of concern. Furthermore, the discharge voltage of nickel-cadmium batteries is the same as that of nickel-metal hydride batteries. For these reasons, nowadays nickel-cadmium batteries have been almost entirely replaced by nickel-metal hydride batteries.

Charging and discharging reactions in an alkaline electrolyte solution of a nickel-metal hydride battery can be represented by formulas shown below. In the formulas, M represents a metal element (hydrogen storage alloy).

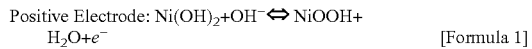

Positive Electrode: $Ni(OH)_2 + OH^- \Leftrightarrow NiOOH + H_2O + e^-$ [Formula 1]

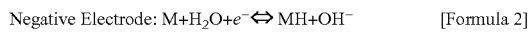

Negative Electrode: $M + H_2O + e^- \Leftrightarrow MH + OH^-$ [Formula 2]

All reactions: $Ni(OH)_2 + M \Leftrightarrow NiOOH + MH$ [Formula 3]

During charging, at the positive electrode, nickel hydroxide desorbs hydrogen, and oxy nickel hydroxide is formed. At this time, the metal (hydrogen storage alloy) of the negative electrode absorbs hydrogen that is produced through electrolysis of water, and becomes a hydride. On the other hand, during discharging, hydrogen is desorbed from the metal of the negative electrode, and electricity is generated together with water.

Nickel-metal hydride batteries have high-power capability and realize stable charging and discharging. Therefore, nickel-metal hydride batteries are widely used in household electrical appliances, mobile devices such as mobile phones and laptop PCs, and rechargeable power tools. Nickel-metal hydride batteries are expected to be utilized as an emergency power supply for facilities such as factories or hospitals where reliability is considered as the most important feature of the emergency power supply. The primary object of using an emergency power supply is to prevent devices from stopping when power failure has occurred, by discharging previously charged electric power. Therefore, such an emergency power supply needs to be always fully charged and ready for use.

Accordingly, a secondary battery to be used as such an emergency power supply is not a high-rate charging type battery which is fully charged within a short period of time and thereafter the charging is stopped, but is a battery capable of maintaining its capacity at a particular level or higher after being charged. Such a battery employs, for example, a charging method in which after the battery is fully charged, charging is continued with a weak electric current to compensate for the battery's self-discharge (i.e., trickle charging), or a charging method in which when the battery is fully charged, a current flows through a bypass circuit within a battery charger so that a load on the battery is reduced to zero (i.e., float charging).

When the battery is overcharged, oxygen gas is evolved from the positive electrode through a reaction shown below (represented by Formula 4). A large part of the evolved oxygen reacts with hydrogen at the surface of the negative electrode, and thereby water is produced as shown in Formula 5. M represents a metal element (hydrogen storage alloy). Accordingly, nickel-metal hydride batteries are formed such that the discharge capacity of the negative electrode is equivalent to or higher than the discharge capacity of the positive electrode, i.e., the battery capacity is limited by the positive electrode.

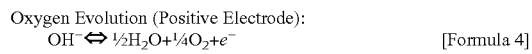

Oxygen Evolution (Positive Electrode):
$OH^- \Leftrightarrow \frac{1}{2}H_2O + \frac{1}{4}O_2 + e^-$ [Formula 4]

Oxygen Absorption (Negative Electrode):
$MH + \frac{1}{4}O_2 \Leftrightarrow M + \frac{1}{2}H_2O$ [Formula 5]

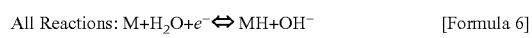

All Reactions: $M + H_2O + e^- \Leftrightarrow MH + OH^-$ [Formula 6]

However, a part of the evolved oxygen oxidizes the hydrogen storage alloy, causing degradation of the negative electrode, resulting in a decrease in the hydrogen absorption/desorption rate and the chargeable capacity of the negative electrode. In particular, if a secondary battery is charged under a high-temperature atmosphere, then charging efficiency is reduced, resulting in lower battery capacity than in a case where the secondary battery is charged under an ordinary temperature. The reason for this is that under a high-temperature condition, an oxygen evolution potential is lowered and the oxygen evolution reaction shown in [Formula 4] occurs prior to the charging reaction shown in [Formula 1]. An increase in battery voltage, an increase in battery temperature, or differential values of those increases with reference to time, is usually used to detect the end of charging of a battery. However, there is a drawback that such a method does not always work accurately depending on the usage environment of the battery.

Emergency power supplies are assumed to be used under a wide range of temperatures. Therefore, it is necessary to improve the aforementioned charging efficiency under high temperatures. Also, if an overcharged state is kept for a long period of time as in the case of float charging, then the amount of oxygen evolution from the positive electrode increases, which increases a risk of oxidation degradation of the surface of the negative electrode. If such oxidation degradation of the surface of the negative electrode occurs, the hydrogen absorption/desorption capability and charging capacity of the negative electrode are reduced. There is disclosed an effective method of suppressing the oxygen evolution under a high temperature (Non Patent Literature 1), in which method the surface of a nickel positive electrode is coated with a hydroxide containing yttrium, calcium, or cobalt. However, the potential of these compounds is lower than that of nickel hydroxide, and the coating of such a compound tends to cause a decrease in battery potential. For this reason, a negative electrode material that is not easily oxidized is sought after.

In a case where a secondary battery is installed in a vehicle or a factory facility, it is assumed that the secondary battery is used under a wider range of temperatures than in a case where the secondary battery is applied in a household electrical appliance. Moreover, in such a case, the battery to be installed is large-sized, and accordingly, it is considered that the cost of replacing the battery is high. Therefore, the battery is required to be durable enough to withstand a long-term use (longer than 10 to 20 years) under a high-temperature environment. Also in this respect, a negative electrode material that is not easily oxidized is sought after.

$LaNi_5$-based alloys and La—Mg—Ni based superlattice alloys that are widely used in nickel-metal hydride batteries contain expensive elements such as rare earth elements. The use of such alloys is a contributing factor to the high cost of fabricating a negative electrode and to the high cost of fabricating the entire battery. Since these elements are unevenly distributed resources, it is necessary to use a universal resource as an electrode material from the standpoint of stable resource supply.

Alkaline secondary batteries in which not an easily oxidized hydrogen storage alloy but an inoxidizable oxide is used for an electrode are currently under consideration. For example, Non Patent Literature 2 discloses a rechargeable aqueous lithium ion battery in which $MnO_2$ and carbon are used for a positive electrode and a negative electrode, respectively, and an electrolyte solution contains a lithium compound. However, the aqueous lithium ion battery disclosed in Non Patent Literature 2 exhibits a rapid capacity decrease within 10 cycles of charging and discharging. Thus, it is considered that the aqueous lithium ion battery disclosed in Non Patent Literature 2 has no practical use.

Patent Literature 1 discloses a rechargeable aqueous lithium ion secondary battery in which a lithium manganese oxide or a lithium vanadium oxide is used for a positive electrode and a negative electrode, respectively, and an electrolyte solution in which a lithium salt is dissolved is used. However, a current used for charging and discharging is 1 mA/g, which is significantly small, and the battery degrades after 20 to 30 cycles of charging and discharging. Thus, it is considered that the aqueous lithium ion battery disclosed in Patent Literature 1 has no practical use.

Patent Literature 2 discloses an aqueous lithium ion secondary battery in which: a combination of two kinds of lithium intercalation compounds is used, the lithium intercalation compounds having different charging/discharging potentials of 3.4 V or higher (e.g., $LiFePO_4$: 3.45 V) and 2.2 V or lower (e.g., $Li_4Ti_5O_{12}$), respectively; and an aqueous solution in which a lithium salt is dissolved and of which the pH is 14 or higher is used as an electrolyte solution. Patent Literature 3 discloses an aqueous secondary battery in which $NiO_2$, $CoO_2$, $Mn_3O_4$, $MnO_2$, $VO_2$, $V_2O_5$, $MoO_2$, or $WO_3$ is used as an active material.

However, the secondary batteries disclosed in Patent Literature 2 and Patent Literature 3 require lithium ion intercalation/deintercalation reactions to occur. Accordingly, the high-rate discharge capability and cycle-life performance of these batteries are poor. The reason for this is as follows: since a lithium ion is larger in size than a hydrogen ion, the diffusion rate of lithium ions is slow and changes in electrode volume caused by lithium ion insertion and extraction are great.

Patent Literature 4 discloses a secondary battery including a fiber electrode that is obtained by forming a thin active material layer around each of very thin fibrous current collectors. The fiber electrode of the secondary battery has a completely different structure from that of electrodes of conventional secondary batteries. Such a structure makes it possible to greatly improve the high-power capability of the battery. The fiber electrode has a significantly large surface area, which allows charging and discharging to be performed with a high current density. The charging/discharging speed can be greatly improved by forming both positive and negative electrodes into such fiber electrodes. In order to fabricate such a fiber electrode, it is necessary to use a negative electrode material that allows an active material layer to be readily formed on a very thin fibrous current collector.

CITATION LIST

Patent Literature

PTL 1: Japanese Patent No. 4301527
PTL 2: U.S. Pat. No. 6,403,253
PTL 3: U.S. Pat. No. 5,376,475
PTL 4: International Publication No. WO 2008/099609

Non Patent Literature

NPL 1: K. Shinyama et al., Electrochemistry, 71, 8, (2003).
NPL 2: R. L. Deuscher et al., Journal of Power Sources, 55, 41 (1995).

SUMMARY OF INVENTION

Technical Problem

As described above, a nickel-metal hydride battery has high-power capability and realizes stable charging and discharging. However, a nickel-metal hydride battery has a problem that the hydrogen storage alloy of the negative electrode degrades in a case, for example, where an overcharged state continues for a long period of time, or where the ambient temperature is high, or where the nickel-metal hydride battery is used as an industrial large-sized battery in a severe condition.

In a lithium ion battery, lithium ions ($Li^+$) serve as an intercalating species whether the lithium ion battery is aqueous or nonaqueous. In a lithium ion battery, electricity is conducted by the movement of the lithium ions. Since the lithium ion is a metal ion, its moving speed is slower than that of a proton ($H^+$), the amount of chargeable/dischargeable current is not very large, and its responsiveness is low. In a lithium ion battery, lithium ion intercalation into and deintercalation from an active material are repeated when charging and discharging are performed. Therefore, significant structural changes occur to an electrode material, which tends to cause degradation of the electrode material. For this reason, a lithium ion battery also has a problem of short cycle life.

A lithium ion battery has another problem as follows. Lithium ions that have moved to the negative electrode at the time of charging do not entirely return to the positive electrode at the time of discharging. This causes irreversible capacity and results in a gradual decrease in the battery capacity. A nonaqueous electrolyte solution is widely used in lithium ion batteries. Since the electrical resistance of a nonaqueous electrolyte solution is great, the charging/discharging speed of the battery is limited. On the other hand, in the case of a lithium ion battery using an aqueous electrolyte solution, the charge/discharge cycle life is short as described above. Therefore, a lithium ion battery using an aqueous electrolyte solution has no practical use.

The present invention aims to provide a novel secondary battery including an electrode that is not easily degraded even in an overcharged state, having high capacity and a favorable cycle life, and being suitable for float charging. The present invention also aims to provide a novel secondary battery, in which hydrogen ions serve as an intercalating species and which is capable of directly absorbing and desorbing hydrogen ions without involving conversion of the hydrogen ions into hydrogen molecules or hydrogen atoms.

Solution to Problem

The inventors of the present invention conducted intensive research to solve the above-described problems of the conventional art. As a result of the intensive research, the inventors fabricated a fiber negative electrode in which a compound containing a metal capable of redox reactions is used as a negative electrode active material, and found that a high-capacity secondary battery with suppressed electrode degradation can be fabricated by combining the following components: the fiber negative electrode; a fiber positive electrode in which a positive electrode active material containing nickel hydroxide is used; an aqueous electrolyte solution; and a separator.

Specifically, the present invention relates to a secondary battery including: a fiber negative electrode including a carbon fiber, the carbon fiber having a surface on which a negative electrode active material coating represented by a chemical formula 1 which is $A_aM_bX_cZ_d$ is formed; a fiber positive electrode including a carbon fiber, the carbon fiber having a surface on which a positive electrode active material coating is formed, the positive electrode active material coating containing nickel hydroxide; an aqueous electrolyte solution; and a separator. The negative electrode active material coating has a surface uncoated with an electrically conductive material. In the chemical formula 1, A represents at least one kind of metal element selected from the group consisting of Li, Na, K, Rb, Cs, Be, Mg, Ca, Sr, and Ba; M represents at least one kind of transition metal element selected from the group consisting of Ti, V, Cr, Mn, Fe, Co, Ni, Cu, Nb, Mo, Ru, Pd, Ag, Ta, W, Pr, Sm, Eu, and Pb; X represents at least one kind of typical element selected from the group consisting of B, Al, Si, P, S, Ga, and Ge; Z represents at least one kind of typical element selected from the group consisting of O, S, N, F, Cl, Br, and I; and $0 \leq a \leq 6$, $1 \leq b \leq 5$, $0 \leq c \leq 4$, $0 \leq d \leq 12$, and $0 \leq a/b \leq 4$.

In a nickel-metal hydride battery, nickel hydroxide is used for a positive electrode, and a hydrogen storage alloy such as LaNi$_5$-based alloy is used for a negative electrode. In a lithium ion battery, it is usual to use a metal oxide containing lithium for a positive electrode, and to use a carbon material such as graphite or a silicon material for a negative electrode. Meanwhile, a feature of the secondary battery according to the present invention is to use: a fiber negative electrode including a carbon fiber serving as a current collector, the carbon fiber having a surface on which a negative electrode active material coating is formed, the negative electrode active material coating containing a compound represented by a chemical formula 1 which is $A_aM_bX_cZ_d$; and a fiber positive electrode including a carbon fiber, the carbon fiber having a surface on which a positive electrode active material coating is formed, the positive electrode active material coating containing nickel hydroxide.

Some materials used as an active material of a battery have relatively low electrical conductivity. In the case of using such a material as an active material of a battery, a conductive agent is necessary for obtaining discharge capacity. In the case of a conventional powder active material, there are known methods of coating the surface of the active material with a conductive agent. Examples of the methods include: a method of forming a carbon coating on LiFePO$_4$ which is drawing attention as a positive electrode active material for use in a lithium ion battery; and a method of forming a cobalt coating on Ni(OH)$_2$ which is widely used as a positive electrode active material for use in an alkaline secondary battery. In the case where the surface of the active material is coated with a conductive agent, the electrical conductivity of the active material is improved, and thereby the active material utilization can be improved.

However, if a large amount of the conductive agent is added, and thereby a coating layer becomes thick, then the reaction between the active material and ion is hindered, which causes a decrease in the charging/discharging speed, resulting in unsuitableness for high-rate charging/discharging. On the other hand, if the coating layer is too thin, the advantage of adding a conductive agent cannot be sufficiently obtained. For these reasons, it is necessary to adjust the thickness of coating of an electrically conductive material to such a thickness as not to hinder ion diffusion.

The material represented by the chemical formula 1 has poor electrical conductivity. Therefore, in order to improve the active material utilization, it is necessary to increase the proportion of the added conductive agent to the material. However, in industrial applications, it is essential for the battery to have high-power capability, and if a method in which a large amount of conductive agent is added to a powder active material is used, sufficient output power cannot be obtained since ion diffusion is hindered. In addition, the increase in the proportion of the added conductive agent causes a decrease in the proportion of the active material to the entire battery. Consequently, energy density per unit volume decreases even though a discharged capacity of the active material per unit weight is increased.

In a case where an electrode is formed as a fiber electrode, a current collector is disposed at the core of the electrode and an active material layer can be formed around the current collector. In this electrode structure, the current collector also serves as a conductive agent. Accordingly, electrons are supplied from the inside of the electrode, and thereby the electrical conductivity of the electrode can be improved. The outer periphery of the active material layer is in direct contact with an electrolyte solution. Therefore, unlike conventional electrodes, the reaction between the active material and ion is not suppressed due to a conductive agent layer. Thus, this electrode structure is excellent in terms of sufficiently improving the active material utilization and the high-rate charge/discharge capability. In fact, in the case of using the material represented by the chemical formula 1, a high discharge capacity of 250 mAh/g which is as high as the discharge capacity of a hydrogen storage alloy is realized, and also, an active material utilization of nearly 80% is maintained even when ultrafast discharging of 50 C is performed.

A high-capacity secondary battery in which electrode degradation is less likely to occur than in conventional fiber batteries can be fabricated by combining such a fiber negative electrode as described above and a fiber positive electrode in which a positive electrode active material containing nickel hydroxide is used.

The secondary battery according to the present invention uses protons as an intercalating species, and is capable of directly absorbing and desorbing protons without involving conversion of the protons into hydrogen molecules or hydrogen atoms. In the secondary battery according to the present invention, electrode degradation does not easily occur even in an overcharged state. The secondary battery according to the present invention has high capacity and a favorable cycle life, and is suitable for float charging.

The compound represented by the chemical formula 1 may have such a structure that M in the chemical formula 1 is partially replaced by an element such as Sc, Zn, Y, Zr, La, Nd, Gd, Tb, Dy, Ho, Er, Tm, Yb, Lu, Hf, or Bi.

The secondary battery according to the present invention uses protons (hydrogen ions) as an intercalating species. Therefore, it is not necessary for the aqueous electrolyte solution to contain $Li^+$. However, the aqueous electrolyte solution may contain $Li^+$ so long as the concentration of $Li^+$ does not cause a decrease in the high-rate discharge capability. Similarly, in the secondary battery according to the present invention, it is not necessary for the aqueous electrolyte solution to contain $Na^+$. However, the aqueous electrolyte solution may contain $Na^+$ so long as the concentration of $Na^+$ does not cause a decrease in the high-rate discharge capability.

Preferably, M in the chemical formula 1 includes: at least one kind of metal element selected from the group consisting of Ti, V, Cr, Mn, Fe, Co, Ni, Cu, Nb, Mo, Ru, Pd, Ag, Ta, W, Pr, Sm, Eu, and Pb; and at least one kind of metal element selected from the group consisting of Bi, In, and Ce.

The following advantages (1) to (3), i.e., (1) an increased potential of the negative electrode, (2) a widened plateau in a discharge curve, and (3) an extended life of the electrode, are obtained if M in the chemical formula 1 includes: at least one kind of metal element selected from the group consisting of Ti, V, Cr, Mn, Fe, Co, Ni, Cu, Nb, Mo, Ru, Pd, Ag, Ta, W, Pr, Sm, Eu, and Pb; and at least one kind of metal element selected from the group consisting of Bi, In, and Ce.

Preferably, the compound represented by the chemical formula 1 is $LiMn_eNi_fO_2$ ($1 \leq f/e \leq 1.5$).

It is also preferred that the compound represented by the chemical formula 1 is $LiNi_oD_pO_2$ (D represents Bi or Al, and $0 < p/o \leq 0.3$).

Preferably, the compound is $LiNi_oBi_{p1}O_2$ ($0 < p1/o \leq 0.2$).
Preferably, the compound is $LiNi_oAl_{p2}O_2$ ($0 < p2/o \leq 0.3$).

It is also preferred that the compound represented by the chemical formula 1 is $LiMn_qE_rO_2$ (E represents Ce, Bi, or Al, and $0 < r/q < 0.3$).

Preferably, the compound is $LiMn_qCe_{r1}O_2$ ($0 < r1/q < 0.25$).
Preferably, the compound is $LiMn_qBi_{r2}O_2$ ($0 < r2/q \leq 0.1$).
Preferably, the compound is $LiMn_qAl_{r3}O_2$ ($0.02 < r3/q < 0.3$).

It is also preferred that the compound represented by the chemical formula 1 is $Na_sMnO_2$ ($0.4 < s < 0.85$).

Preferably, in the secondary battery according to the present invention, the fiber negative electrode and the fiber positive electrode are stacked alternately in such a manner that horizontal end positions of the fiber negative electrode and horizontal end positions of the fiber positive electrode are displaced from each other, and the fiber negative electrode and the fiber positive electrode are press-formed vertically.

Preferably, a separator coating is formed on a surface of the fiber negative electrode or on a surface of the fiber positive electrode.

Preferably, a negative electrode terminal and a positive electrode terminal are disposed at end portions of the press-formed fiber negative and positive electrodes.

Preferably, the fiber negative electrode and the fiber positive electrode are fixed by means of an adhesive.

A battery stack (high-capacity battery) may be formed by combining a plurality of the secondary batteries, an insulating framework member, and an electrically conductive framing member.

A battery module may be formed by stacking a plurality of the secondary batteries.

A battery module may be formed by stacking a plurality of the battery stacks (high-capacity batteries).

The present invention also relates to a negative electrode for use in a secondary battery using protons as an intercalating species. The negative electrode includes a carbon fiber. The carbon fiber has a surface on which a negative electrode active material coating is formed. The negative electrode active material coating is represented by a chemical formula 1 which is $A_aM_bX_cZ_d$. In the chemical formula 1, A represents at least one kind of metal element selected from the group consisting of Li, Na, K, Rb, Cs, Be, Mg, Ca, Sr, and Ba; M represents at least one kind of transition metal element selected from the group consisting of Ti, V, Cr, Mn, Fe, Co, Ni, Cu, Nb, Mo, Ru, Pd, Ag, Ta, W, Pr, Sm, Eu, and Pb; X represents at least one kind of typical element selected from the group consisting of B, Al, Si, P, S, Ga, and Ge; Z represents at least one kind of typical element selected from the group consisting of O, S, N, F, Cl, Br, and I; and $0 \leq a \leq 6$, $1 \leq b \leq 5$, $0 \leq c \leq 4$, $0 < d \leq 12$, and $0 \leq a/b \leq 4$.

Advantageous Effects of Invention

In the secondary battery according to the present invention, an influence of electrode oxidation due to overcharging is very small, and charging and discharging are performed by using protons as an intercalating species. This makes it possible to attain high power capability. The secondary battery according to the present invention has high capacity, and is capable of achieving a cycle life of 50 cycles or more.

BRIEF DESCRIPTION OF DRAWINGS

FIG. 1 is a schematic structural diagram showing a pressurizing cutter configured to cut fiber positive electrodes and fiber negative electrodes while stacking and press-forming them.

FIGS. 2A to 2C illustrate a structure of a fiber electrode stack.

FIGS. 3A to 3D are schematic diagrams each showing an example of arrangement of fiber positive electrodes and fiber negative electrodes.

FIGS. 4A and 4B are schematic structural diagrams showing an example of a secondary battery according to the present invention.

FIGS. 5A and 5B are schematic structural diagrams showing a battery stack which is formed by combining a plurality of unit batteries.

DESCRIPTION OF EMBODIMENTS

Figure 6:
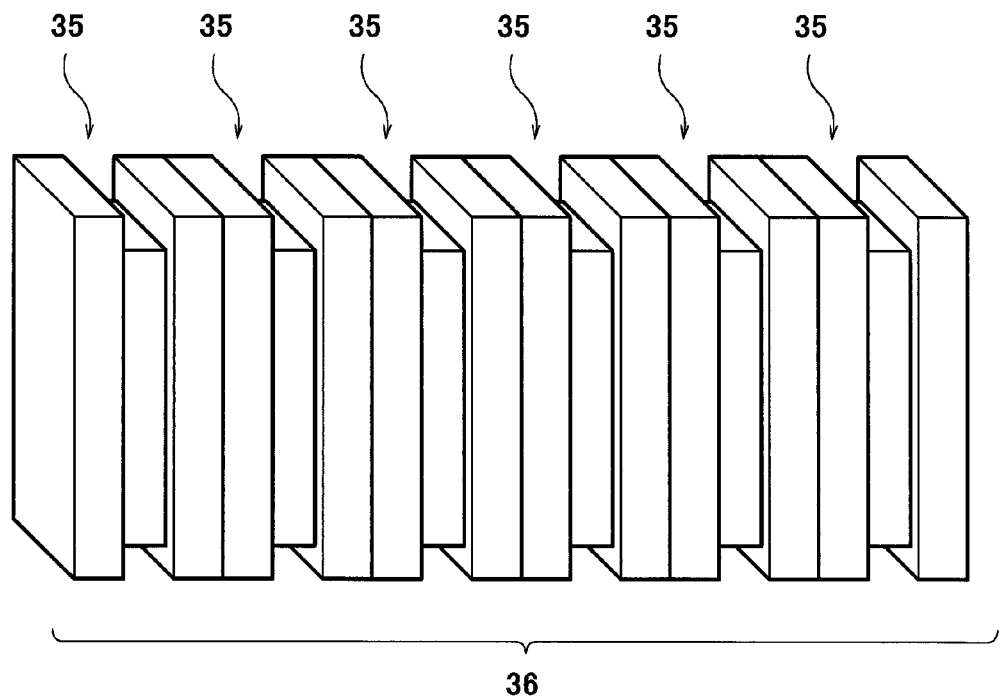
FIG. 6 is a schematic structural diagram showing a battery module which is formed by stacking a plurality of such battery stacks as shown in FIG. 5.

Hereinafter, an embodiment of the present invention is described. The present invention is not limited to the description given below.

As described above, a secondary battery according to the present invention includes: a fiber negative electrode including a carbon fiber, the carbon fiber having a surface on which a negative electrode active material coating is formed, the negative electrode active material coating containing a compound represented by a chemical formula 1 which is $A_aM_bX_cZ_d$; a fiber positive electrode including a carbon fiber, the carbon fiber having a surface on which a positive electrode active material coating is formed, the positive electrode active material coating containing nickel hydroxide; an aqueous electrolyte solution; and a separator. The negative electrode active material coating has a surface uncoated with an electrically conductive material. In the chemical formula 1, A represents at least one kind of metal element selected from the group consisting of Li, Na, K, Rb, Cs, Be, Mg, Ca, Sr, and Ba; M represents at least one kind of transition metal element selected from the group consisting of Ti, V, Cr, Mn, Fe, Co, Ni, Cu, Nb, Mo, Ru, Pd, Ag, Ta, W, Pr, Sm, Eu, and Pb; X represents at least one kind of typical element selected from the group consisting of B, Al, Si, P, S, Ga, and Ge; Z represents at least one kind of typical element selected from the group consisting of O, S, N, F, Cl, Br, and I; and $0 \leq a \leq 6$, $1 \leq b \leq 5$, $0 \leq c \leq 4$, $0 < d \leq 12$, and $0 \leq a/b \leq 4$.

Examples of the compound represented by the chemical formula 1 include vanadium trioxide, vanadium pentoxide, lithium vanadate, lithium chromate, lithium manganese oxide, lithium cobalt oxide, lithium ferrite, sodium ferrite, lithium nickel oxide, lithium titanate, iron phosphate, lithium iron phosphate, lithium iron silicate, and cobalt phosphate.

Other than the above elements, the compound represented by the chemical formula 1 may contain different typical elements, alkali metal elements, or alkaline-earth metal elements.

A first feature of the secondary battery according to the present invention is to use, as a negative electrode active material, a compound containing an element capable of redox reactions. The compound represented by the chemical formula 1 is different from a hydrogen storage alloy which serves as a negative electrode material of a nickel-metal hydride battery, and is also different from a carbon material, or a silicon material, which serves as a negative electrode material of a conventional lithium ion battery.

A second feature of the secondary battery according to the present invention is to use protons as an intercalating species. Protons have higher mobility in an electrolyte solution than lithium ions, and allow the secondary battery to exert its high-power charge/discharge capability. The use of protons also allows the secondary battery to be used in an atmosphere under a severe temperature.

A description is given below, focusing on protons as an intercalating species smaller than lithium ions. Currently, fuel cells and nickel-metal hydride batteries use protons as an intercalating species. It is known that in a fuel cell, hydrogen molecules (i.e., hydrogen gas) become hydrogen atoms at the surface of a negative electrode through a catalytic action, and then lose electrons at the electrode to become protons. Meanwhile, in a nickel-metal hydride battery, protons receive electrons at the surface of a hydrogen storage alloy during charging to become hydrogen atoms, and the hydrogen atoms are absorbed into the metal. It is known that in a nickel-metal hydride battery, hydrogen atoms lose electrons at the surface of the hydrogen storage alloy during discharging to become protons, and the protons move into a solution. Thus, the conversion of hydrogen molecules into protons requires three steps in the case of a fuel cell and two steps in the case of a nickel-metal hydride battery.

In a nickel-metal hydride battery, when charging is performed, hydrogen is absorbed into the hydrogen storage alloy, and energy is stored in the negative electrode. However, theoretically speaking, merely 83% of the stored energy can be extracted as electric power at a maximum. In contrast, in the secondary battery according to the present invention, protons merely move from the positive electrode to the negative electrode at the time of charging and from the negative electrode to the positive electrode at the time of discharging, without causing exergy loss. For this reason, theoretically speaking, 100% of the energy stored during the charging by means of the protons can be extracted as electric power.

A third feature of the secondary battery according to the present invention is that both of the negative electrode and the positive electrode are fiber electrodes. By forming the electrodes not as plate electrodes but as fiber electrodes, the surface area of the electrodes is significantly increased. Accordingly, it is expected that chemical reactivity of the electrodes is greatly increased. It is considered more effective to form a stacked body of fiber positive electrodes and/or fiber negative electrodes on which a thin separator coating is formed, thereby increasing a separator surface area in addition to the electrode surface area and reducing an inter-electrode distance to reduce a moving distance of protons.

1. Fiber Negative Electrode Fabrication Method

A negative electrode active material coating containing the compound represented by the chemical formula 1 can be formed on a carbon fiber (or on Ni plating if the carbon fiber is plated with Ni) by performing the steps of: (1-1) forming a tubular coating of a transition metal oxide or a transition metal hydroxide on the surface of the carbon fiber; and (1-2) hydrothermally treating the coating obtained in the step (1-1) at 100 to 250° C. in a Li ion-containing aqueous solution in the presence of an oxidant, thereby forming a Li-doped or Na-doped transition metal oxide coating as a negative electrode active material coating.

The diameter of the carbon fiber, which serves as a negative electrode current collector, is not particularly limited but may be determined with reference to the thickness of a conventional nickel positive electrode current collector. Specifically, a positive electrode using a sintered nickel substrate or a positive electrode using a foamed nickel substrate has a thickness of 300 μm or greater. Therefore, it is preferred that the diameter of an electrically conductive fiber used as a negative electrode current collector as well as a positive electrode current collector in the present invention is much less than 300 μm. Accordingly, the diameter of each single fiber forming the electrically conductive fiber is preferably 0.1 to 100 μm, and more preferably, 2 to 50 μm.

In the case of using single carbon fibers having a diameter of less than 0.1 μm, the mechanical strength of each single fiber is insufficient. Therefore, there is a risk that the single fibers are cut due to a clamping force when they are bundled together by means of a solderless terminal, or that the single fibers are cut due to the weight of an active material deposited thereon. Further, if the diameter of each single fiber is less than 0.1 μm, its electrical conductivity is low. This may cause a difficulty with uniform deposition of the active material.

On the other hand, in the case of using single carbon fibers having a diameter of greater than 100 μm, the active material deposited on each single fiber tends to be distorted. Accordingly, there is a risk of reduction in charge/discharge cycle-life performance. If single fibers having a large diameter are bundled together to form an electrode, the size of the electrode is increased, resulting in a decrease in active material loading per volume of the electrode, which is another problem.

Although the length and aspect ratio of the carbon fiber are not particularly limited, it is preferred that the length is approximately 10 to 1000 mm, and the aspect ratio is approximately 2000 to 200000.

It is preferred that 100 to 20000 single carbon fibers, which serve as negative electrode current collectors, are bundled together into one carbon fiber tow. More preferably, 1000 to 5000 single carbon fibers are bundled together into one carbon fiber tow. A single electrode (negative electrode) may be formed by fixing one end of the fiber tow by means of a solderless terminal. Alternatively, a carbon fiber that is formed by twisting 2 to 10 single fibers together may be used. A fiber negative electrode may be formed by bundling together 50 to 1000 such twisted threads of carbon fibers.

If the number of fibers forming one fiber tow is less than 100, their function as a negative electrode or positive electrode active material retainer, that is, the fibers' function of preventing dropping of the active material by being pressure-bonded to each other, may decrease. On the other hand, if the number of fibers forming one fiber tow is more than 2000, it becomes difficult to uniformly form a tubular active material coating on each fiber.

Since carbon fibers are electrically conductive fibers, they can be directly used as fibrous current collectors. However, the electrical conductivity of the surface of the carbon fibers can be further improved by plating the carbon fibers with Ni. In order to realize high-power capability and a long life of the electrode, it is very effective to form a Ni plating coating on the carbon fibers which serve as current collectors.

Applicable methods of plating carbon fibers with Ni include: a physical thin film formation method; a method of depositing Ni through thermal decomposition of nickel carbonyl; an electroless plating method; and an electrolytic plating method. Among such methods, a method most suitable for uniformly forming a Ni plating coating on each of 1000 or more single fibers forming a carbon fiber tow is as follows: forming a thin Ni coating by electroless Ni plating; and then performing electrolytic Ni plating thereon.

Electroless Ni plating is a method in which Ni metal deposition is performed through chemical reduction action. This method does not require application of an electric current.

Therefore, with this method, a Ni coating having a uniform thickness can be formed on a carbon fiber tow even if the carbon fiber tow has insufficient electrical conductivity and has a complex and intricate shape. Accordingly, if a thin Ni coating (Ni plating coating) is formed on a carbon fiber tow by electroless Ni plating prior to performing electrolytic Ni plating, then the thin Ni coating can be used as an undercoating for forming a Ni plating coating with improved thickness uniformity. Furthermore, since the electrical conductivity of the carbon fiber surface is improved with this method, plating efficiency at the time of performing electrolytic Ni plating is improved. This makes it possible to realize efficient mass manufacturing.

Applicable methods of electroless Ni plating on carbon fibers include: a well-known nickel-phosphorus alloy plating (phosphorus content: 5 to 12%) deposition method in which a hypophosphite is used as a reductant; and a nickel-boron alloy plating (boron content: 0.2 to 3%) deposition method in which a reduction action of dimethylamine borane is utilized. A thickness of 0.1 to 0.5 µm of the Ni plating coating formed by such an electroless Ni plating method is satisfactory.

Next, electrolytic Ni plating on the carbon fibers, on which the electroless Ni plating has previously been performed, may be performed in a well-known Watts bath. The thickness of a Ni plating coating formed by an electrolytic plating method is preferably 0.5 to 15 µm, and more preferably, 1 to 8 µm. If the thickness of the Ni plating coating is less than 0.5 µm, there is a possibility that sufficient electrical conductivity cannot be obtained. If the Ni plating coating has a thickness of 0.5 to 15 µm, sufficient electrical conductivity is obtained, and in addition, fine irregularity of the carbon fiber surface can be reflected in the Ni plating.

Any transition metal oxide compound or transition metal hydroxide compound may be used without specific restriction so long as a coating of the compound can be formed on the carbon fiber surface. Examples of the compound include TiO, $Ti_2O_3$, $TiO_2$, $V_2O_3$, $V_2O_5$, CrO, $Cr_2O_3$, $CrO_2$, MnO, $Mn_3O_4$, $Mn_2O_3$, $MnO_2$, $MnO_3$, FeO, $Fe_3O_4$, $Fe_2O_3$, COO, $Co_2O_3$, $CO_3O_4$, $CoO_2$, NiO, $Ni_3O_4$, $Ni_2O_3$, $NiO_2$, $Cu_2O$, CuO, and ZnO.

It is not essential to obtain an oxide in the step (1-1) since the hydroxide coating is oxidized in the step (1-2). However, by performing oxidation treatment in the air in the step (1-1), a denser oxide coating can be obtained, and detachment of the negative electrode active material coating from the carbon fiber is advantageously suppressed in the step (1-2). For this reason, in the case of forming a hydroxide coating in the step (1-1), it is preferred to oxidize the coating in the air.

Step (1-1)

The method of forming a tubular coating of either a transition metal oxide or a transition metal hydroxide on the carbon fiber (or on a Ni plating if the carbon fiber is plated with Ni) may be, but not limited to, a slurry method, a physical thin film formation method, an aerosol deposition method, an electroplating method, or an electrodeposition method. Hereinafter, these methods are described.

In the slurry method, slurry that is obtained by dispersing transition metal oxide particles or transition metal hydroxide particles together with organic matter in a solvent is applied onto a current collector. Then, the solvent is vaporized and thereby an electrode is formed. After an active material is applied onto the current collector, the current collector may be passed through a slit or a die, and thereby the thickness of the slurry can be thinly and uniformly adjusted.

Examples of the physical thin film formation method include a vapor deposition method and a sputtering method. With these methods, a highly dense coating of a transition metal oxide or a transition metal hydroxide can be formed on the carbon fiber surface without using an additive such as a thickener or a binder. It should be noted that a treatment time for forming the transition metal oxide coating or the transition metal hydroxide coating becomes long if the coating is formed to have a large thickness.

The aerosol deposition method is a method of applying, at once, a jet of transition metal oxide powder or transition metal hydroxide powder existing in a positive pressure atmosphere to a current collector existing in a negative pressure atmosphere, thereby forming a coating of the transition metal oxide or the transition metal hydroxide on the current collector. It should be noted that if the transition metal oxide powder or the transition metal hydroxide powder has low ductility, a uniform coating of the transition metal oxide or the transition metal hydroxide is not easily formed.

The electroplating method is a method of electrochemically forming a metal coating on the carbon fiber surface. However, with the electroplating method, a transition metal oxide layer or a transition metal hydroxide layer cannot be directly formed on the carbon fiber surface. Therefore, it is necessary that the carbon fiber surface is first plated with a transition metal, and then the transition metal is oxidized through high-temperature oxidation treatment. The high-temperature oxidation treatment may be, for example, to increase the temperature to 500 to 1000° C. under an oxidizing atmosphere.

Conditions for performing the electroplating method are not particularly limited but depend on a metal to be plated on the carbon fiber surface. The concentration of a transition metal salt used for the plating may be adjusted to fall within the range of 0.01 to 1 mol/L, and the electroplating may be performed with a current density of 1 $mA/cm^2$ to 0.1 $A/cm^2$. In this manner, the carbon fiber may be plated with the transition metal.

In the electrodeposition method, a base material on which a coating is to be formed (i.e., the carbon fiber serving as a current collector), and an electrode to serve as a counter electrode, are immersed in a solution that contains the compositions of the coating to be formed, and then a current is applied. As a result, the coating is formed on the base material. To be specific, if the ions of the compositions of the coating to be formed are cations, a current is applied while the base material is used as a cathode. In this manner, a transition metal oxide coating or a transition metal hydroxide coating can be formed on the surface of the base material. Alternatively, a current may be applied while using the base material as an anode to perform anodic oxidation and also to cause the base material to capture the composition ions present in a bath. Also in this manner, a coating can be formed on the surface of the base material. In the case of having deposited a metal hydroxide coating, a metal oxide coating can be obtained by drying the metal hydroxide coating in an air atmosphere at a temperature of 100° C. or higher.

If the electrodeposition method is used, a transition metal oxide coating or a transition metal hydroxide coating can be directly formed on the carbon fiber. Although conditions for performing the electrodeposition method are not particularly limited, it is preferred that the concentration of a metal salt to be deposited is adjusted to fall within the range of 0.01 to 1 mol/L, and the electrodeposition is performed with a current density of 1 $mA/cm^2$ to 0.1 $A/cm^2$.

In the case of the fiber negative electrode according to the present invention where the current collector is a carbon fiber, it is preferred to use the electroplating method or the electrodeposition method to form a transition metal oxide coating or a transition metal hydroxide coating. According to the electroplating method or the electrodeposition method, a transition metal oxide coating or a transition metal hydroxide coating can be formed on the surface of the carbon fiber, so long as the carbon fiber is in contact with an electroplating bath or an electrodeposition bath. Moreover, these methods realize high degree of adhesion of the coating and high degree of smoothness of the coating surface, and allow a uniform coating of a transition metal oxide or a transition metal hydroxide to be readily formed at low cost. The electrodeposition method is the most preferable method since it allows a coating of a transition metal oxide or a transition metal hydroxide to be directly formed on the carbon fiber which serves as a current collector.

In the case of forming a transition metal oxide coating or a transition metal hydroxide coating on the carbon fiber surface by using the electroplating method or the electrodeposition method, a conductive agent may be dispersed in a treatment bath (an electroplating bath or an electrodeposition bath) when performing the electroplating or electrodeposition, such that the conductive agent is co-deposited with a transition metal oxide or a transition metal hydroxide. However, it should be noted that if the co-deposition method is performed in combination with the electroplating method, there is a risk that the conductive agent is oxidized in the oxidation treatment performed at a latter stage.

The conductive agent to be added into the electroplating bath or the electrodeposition bath may be any material, so long as it has electrical conductivity and stably exists within a charge/discharge voltage range. Specifically, preferred examples of the conductive agent include a carbon material or a nickel fine powder. It is preferred to add approximately 1 to 20 wt % of the conductive agent to the electrodeposition bath. It is preferred to further add approximately 1 wt % of a surfactant to the electrodeposition bath since the addition of the surfactant facilitates the dispersion of the conductive agent in the electrodeposition bath.

Other than the above-described methods, there is also a method of forming a thin transition metal oxide coating or a thin transition metal hydroxide coating on the carbon fiber surface by using a metal alkoxide. The metal alkoxide herein refers to a compound, in which the hydrogen of the hydroxyl group of an alcohol molecule is replaced by a metal atom and which is represented by the following general formula: $M(OR)_n$ (M: metal, R: alkyl group, n: the oxidation number of a metal element). Alkali metals, alkaline-earth metals, transition metals, rare earth elements, and various elements in groups 13 to 16 of the periodic table may form metal alkoxides. By hydrolyzing such a metal alkoxide through a reaction with water, a transition metal oxide layer or a transition metal hydroxide layer can be formed on the carbon fiber surface. This method is applicable if it is difficult to form a metal oxide coating or a metal hydroxide coating through the electrodeposition method.

Preferably, the amount of coating of a transition metal oxide or a transition metal hydroxide layered on the carbon fiber surface is 1 to 30 mg/cm$^2$. If the amount of coating to be layered on the carbon fiber surface is set to fall within this range, a necessary capacity for the battery can be obtained, and also, delamination between the negative electrode active material coating and the current collector becomes less likely to occur. Although the thickness of the negative electrode active material coating is not particularly limited, it is preferred that the thickness is set to 0.5 μm to 30 μm, and more preferably, 1 μm to 10 μm.

(Step (1-2))

Next, in the step (1-2), the carbon fiber obtained in the step (1-1), on which the transition metal oxide coating or the transition metal hydroxide coating is formed, is hydrothermally treated at 100 to 250° C. in a Li ion-containing or Na ion-containing aqueous solution in the presence of an oxidant. As a result, the transition metal oxide coating or the transition metal hydroxide coating becomes a coating of a Li-doped or Na-doped transition metal oxide which serves as a negative electrode active material.

For example, a transition metal oxide coating is formed on the carbon fiber surface, which transition metal oxide coating is represented by the following formula (1): $M_gO_h$ (wherein: M is at least one kind of transition metal selected from the group consisting of Ti, V, Cr, Mn, Fe, Co, and Ni; 1≤g≤3; and 1≤h≤5). Then, the coating is heat treated in a Li ion-containing solution in the presence of an oxidant. As a result, lithium modification occurs to the transition metal oxide formed on the carbon fiber surface, and the transition metal oxide becomes a Li-doped transition metal oxide represented by the following formula (2): $Li_iM_jO_k$ (wherein: 0<i≤2; 1≤j≤5; 2≤k≤5; and M is the same as in the formula (1)).

Specifically, if the transition metal oxide is $Mn_3O_4$, then the resultant Li-doped transition metal oxide is a compound represented by the following formula (2-1): $Li_{i1}Mn_{j1}O_{k1}$ (wherein: the valence of Mn is in the range of 3 to 4; 0<i1≤2; 1≤j1≤2; and 2≤k1≤4).

In relation to the formula (1), g×α=h×2 represents a relationship among the number of atoms g of the transition metal M, the number of atoms h of oxygen O, and the valence α of the transition metal M. In relation to the formula (2), i×1+g×β=k×2 represents a relationship among the number of atoms i of Li, the number of atoms j of the transition metal M, the number of atoms k of oxygen O, and the valence β of the transition metal M. Similarly, in relation to the formula (2-1), j1×1+g1×β1=k1×2 represents a relationship among the number of atoms j1 of Li, the number of atoms j1 of Mn, the number of atoms i1 of oxygen O, and the valence β1 of Mn. Thus, the number of atoms of each element is suitably specified in accordance with its valence.

However, in a secondary battery using a fiber negative electrode, the negative electrode active material of which is an oxide containing lithium and manganese such as $Li_{1+x}Mn_2O_4$ or $Li_xMn_2O_4$, Mn dissolution occurs at high temperatures, which may result in significant capacity deterioration.

In order to suppress the Mn dissolution at high temperatures, it is preferred to use a negative electrode active material in which a part of Mn is replaced by, for example, Al, P, Ti, Cr, Fe, Co, Ni, Cu, Sr, Y, Zr, In, Sn, Bi, or a rare earth element. Considering the structural stability and the voltage of the fiber negative electrode, it is preferred that the element that replaces a part of Mn is Al, Bi, Ni, or a rare earth element. Moreover, in terms of cost, it is more preferred that the element that replaces a part of Mn is Al or Ni.

For example, a transition metal oxide coating is formed, which is represented by the following formula (1-2): $(Mn_{1-x}A_x)_3O_4$ (wherein: A is at least one kind of element selected from the group consisting of Al, Ti, Cr, Fe, Co, Ni, Cu, Sr, Y, Zr, Bi, and a rare earth element; and 0.05≤x≤0.25). Thereafter, the transition metal oxide coating is doped with Li. In this manner, a Li-doped transition metal oxide coating is formed, which is represented by the following formula (2-2): $Li_{i2}(Mn_{1-y}A_y)_{j2}O_{k2}$ (wherein: the valence of Mn is in the range of 3 to 4; 0<i2≤2; 1≤j2≤2; 2≤k2≤4; 0.05≤y≤0.25; and A is the same as in the formula (1-2)).

Also in this case, similar to the above, in relation to the formula (2-2), i2×1+j2×β2=k2×2 represents a relationship among the number of atoms i2 of Li, the number of atoms j2 of $(Mn_{1-y}A_y)$, the number of atoms k2 of oxygen O, and the valence β2 of the transition metal M.

In the case of forming a transition metal oxide coating, a coating containing two or more kinds of metal oxides, for example, a Ni oxide and a Mn oxide, may be formed, and then hydrothermal treatment may be performed in a Li ion-containing solution in the presence of an oxidant. In this manner, a fiber negative electrode of which an active material is a lithium nickel manganese oxide coating can be obtained. As an alternative manner, a transition metal oxide coating containing two or more kinds of metal oxides may be formed by dispersing fine particles of transition metal oxides in an electrodeposition bath and co-depositing them, and then hydrothermal treatment may be performed in the same manner as above.

For example, in a case where an aqueous solution in which a bismuth salt and a nickel salt are mixed is used as an electrodeposition bath, the bismuth salt tends to sediment. Such sedimentation of the bismuth salt can be suppressed to some extent by adding ammonia or a polysaccharide (e.g., mannitol) to the electrodeposition bath. However, if adding such an impurity to the electrodeposition bath is undesirable, the following method may be used: dispersing a fine powder of bismuth oxide into a nickel nitrate aqueous solution and co-depositing the bismuth oxide with nickel hydroxide.

Non-limiting examples of the oxidant include air, oxygen, ozone, chlorine, bromine, a chlorate, peroxodisulfuric acid, a hypochlorite, and a hydrogen peroxide solution. A hypochlorite is particularly preferred as the oxidant. Among hypochlorites, sodium hypochlorite is preferred.

In a step (2), a Li ion (or Na ion) amount and an oxidant amount vary depending on the form of oxidation, or the amount, of the transition metal oxide. That is, a Li ion (or Na ion) amount and an oxidation equivalent or a reducing equivalent necessary for a starting material to be a target product may be estimated.

Assume a case where $Li_iM_jO_k$ is obtained from the transition metal oxide represented by the Formula (1), which is $M_gO_h$. In this case, $(\beta-\alpha)$ or more oxidation equivalents of an oxidant may be used per equivalent of $M_gO_h$. Here, it should be noted that if the value of $(\beta-\alpha)$ is a negative real number, then $(\alpha-\beta)$ reducing equivalents of a reductant are used instead.

Described below are specific examples of the amount of usage of the oxidant on the assumption that an ideal reaction occurs.

If 0.4 or more oxidation equivalent of an oxidant is used per equivalent of a transition metal oxide $Mn_3O_4$ (the valence $\alpha$ of Mn is 2.6+), then $LiMnO_2$ (the valence $\beta$ of Mn is 3+) is obtained. If 0.9 or more oxidation equivalent of an oxidant is used per equivalent of the transition metal oxide $Mn_3O_4$, then $LiMn_2O_4$ (the valence of Mn is 3.5+) is obtained.

If one or more oxidation equivalent is used per equivalent of a transition metal oxide MnO (the valence of Mn is 2+), then $LiMnO_2$ (the valence of Mn is 3+) is obtained. If 1.5 or more oxidation equivalents of an oxidant is used per equivalent of the transition metal oxide MnO, then $LiMn_2O_4$ (the valence of Mn is 3.5+) is obtained.

If 0.5 or more reducing equivalent of a reductant is used per equivalent of a transition metal oxide $MnO_2$ (the valence of Mn is 4+), then $LiMn_2O_4$ (the valence of Mn is 3.5+) is obtained. If one or more reducing equivalent of a reductant is used per equivalent of the transition metal oxide $MnO_2$, then $LiMnO_2$ (the valence of Mn is 3+) is obtained.

In reality, however, it is difficult to cause an ideal reaction. Therefore, it is preferred to add the oxidant or the reductant by an amount that is 1 to 8 times as much as a theoretical equivalent. It is more preferred to add the oxidant or the reductant by an amount that is 1.5 to 4 times as much as the theoretical equivalent.

The same is true of a Na—Mn—O based compound. However, in a composition formula $Na_xMnO_2$, the coefficient x varies depending on the amount of NaOH and the amount of an oxide.

At the time of performing the hydrothermal treatment in the step (1-2), if the Li ion-containing or Na ion-containing solution that contains an oxidant is under alkaline conditions, then the solution may be heated as it is. However, if the solution is under acidic conditions, in particular, if the pH value (hydrogen ion concentration index) is small, then it is preferred that the solution is heated with a substance for increasing the pH value added thereto. Examples of the substance to be added include: an alkali hydroxide such as sodium hydroxide, potassium hydroxide, or lithium hydroxide; an ammonia compound such as ammonia gas or ammonia water; and an alkaline carbonate compound such as sodium carbonate, potassium carbonate, lithium carbonate, or ammonium carbonate.

Any solution in which Li ions are dissolved may be used as the Li ion-containing solution in the hydrothermal treatment. For example, an aqueous solution of a water-soluble lithium compound may be used. Specifically, a lithium chloride aqueous solution, a lithium nitrate aqueous solution, or a lithium hydroxide aqueous solution may be suitably used as the Li ion-containing solution. A single kind or a mixture of two or more kinds of these water-soluble lithium compounds may be used to prepare the Li ion-containing solution. The water-soluble lithium compounds used here may be either anhydrous compounds or hydrated compounds.

Similarly, any solution in which Na ions are dissolved may be used as the Na ion-containing solution in the hydrothermal treatment. For example, an aqueous solution of a water-soluble sodium compound may be used. Specifically, a sodium chloride aqueous solution, a sodium nitrate aqueous solution, or a sodium hydroxide aqueous solution may be suitably used as the Na ion-containing solution. A single kind or a mixture of two or more kinds of these water-soluble sodium compounds may be used to prepare the Na ion-containing solution. The water-soluble sodium compounds used here may be either anhydrous compounds or hydrated compounds.

The usage amount of the water-soluble lithium compound may be determined such that Li is added to the solution by a necessary amount or more for obtaining a target product, in terms of the elemental molar ratio of Li to the number of moles of the transition metal in the transition metal oxide or transition metal hydroxide subjected to the hydrothermal treatment. It is preferred to add Li by an amount that is one to five times as much as a theoretical amount. It is more preferred to add Li by an amount that is one to three times as much as the theoretical amount. The concentration of the water-soluble lithium compound is preferably in the range of 0.05 to 10 mol/L, and more preferably, in the range of 1 to 6 mol/L. The same is true of the water-soluble sodium compound.

The temperature at which to perform the hydrothermal treatment is 100 to 250° C. Preferably, the temperature at which to perform the hydrothermal treatment is 100 to 200° C. Even if the temperature of the hydrothermal treatment is lower than 100° C., the reaction still progresses. In this case, however, the reaction rate is slow. Therefore, it is preferred that the temperature of the hydrothermal treatment is 100° C. or higher. If the hydrothermal treatment is to be performed at a temperature higher than 250° C., then a large-scale device is necessary for the hydrothermal treatment, resulting in a high cost.

It is preferred that the hydrothermal treatment is performed in the presence of an oxidant in the following manner: the carbon fiber on which a transition metal oxide coating or a transition metal hydroxide coating is formed is immersed in the Li ion-containing or Na ion-containing solution; the solution in which the carbon fiber is immersed is contained in a corrosion-resistant and pressure-resistant container and the container is sealed; and the hydrothermal treatment is performed under pressure or under saturated vapor pressure.

The hydrothermal treatment may be performed under a pressure of 0.05 to 40 MPa. Setting the pressure within this range allows the transition metal oxide to be sufficiently Li-doped or Na-doped, and eliminates the necessity of using a large-scale corrosion-resistant and pressure-resistant container. Accordingly, setting the pressure within this range is also preferable from an economic point of view. In view of the above, it is particularly preferred that the hydrothermal treatment is performed under a pressure of 0.1 to 10 MPa.

The hydrothermal treatment time depends on the temperature at which to perform the hydrothermal treatment. The hydrothermal treatment time may be five hours or longer if the temperature is in the range of 100 to 200° C., or may be three hours or longer if the temperature is in the range of 200 to 400° C. Preferably, the hydrothermal treatment time is suitably set so as not to cause dropping of the negative electrode active material coating formed on the carbon fiber surface. To be specific, it is preferred that the hydrothermal treatment time is within the range of 5 to 50 hours. More preferably, the hydrothermal treatment time is within the range of 10 to 30 hours.

In the manner as described above, a fiber negative electrode of which the carbon fiber surface is coated with the Li-doped or Na-doped transition metal oxide (i.e., coated with a negative electrode active material) can be obtained. If moisture is removed from the fiber negative electrode by drying the fiber negative electrode under reduced pressure at a temperature of approximately 80 to 150° C., then the fiber negative electrode can be used as a more favorable electrode.

On the fiber negative electrode of the present invention obtained in the above-described manner, a negative electrode active material coating (i.e., a negative electrode active material layer) having a tubular shape is directly formed on the carbon fiber surface. Therefore, a step where a negative electrode active material is made into an electrode, which is necessary in the conventional art, is no longer necessary. That is, the production of the negative electrode active material and the fabrication of the fiber negative electrode can be performed at the same time.

The fiber negative electrode according to the present invention is formed such that a flaky negative electrode active material agglomerates into a mass; the mass is perpendicularly adhered to a current collector; and a porous negative electrode active material coating is formed on the fiber negative electrode. Accordingly, the electrode has a significantly large surface area and a structure that allows an electrolyte solution to easily permeate, and is capable of mitigating a stress that occurs due to expansion and contraction of the negative electrode active material. In addition, since the current collector is a thin columnar carbon fiber, a tubular negative electrode active material coating is formed on the carbon fiber surface. As a result, a significantly large electrode surface area is obtained. Since the negative electrode active material coating forms a fully tubular shape, its volume change due to charging and discharging is suppressed.

Accordingly, even in a case where expansion and contraction repeatedly occur, detachment or dropping of the negative electrode active material coating is less likely to occur as compared to a plate electrode. If fiber negative electrodes of this type are bundled together, the fibers of the electrodes are pressure-bonded to each other and thus effectively prevent the dropping of the negative electrode active material coating. Consequently, the fiber negative electrode according to the present invention is long-lived and has excellent electrode characteristics.

2. Fiber Positive Electrode Fabrication Method

A positive electrode active material coating that contains nickel hydroxide can be formed on the surface of a carbon fiber by performing the following steps of: (2-1) plating the carbon fiber with Ni; (2-2) performing electrolysis in a nickel nitrate bath where the Ni-plated carbon fiber is used as a cathode and a nickel plate is used as an anode, thereby electrodepositing a positive electrode active material containing nickel hydroxide on the surface of the carbon fiber; and (2-3) immersing the carbon fiber, which is coated with nickel hydroxide, in a caustic alkali aqueous solution.

The diameter of a single carbon fiber serving as a positive electrode current collector is preferably 0.1 to 100 µm, and more preferably, 2 to 50 µm. Although nickel hydroxide has such a characteristic that spherical crystal growth tends to occur, if the diameter of the single fiber is 0.1 to 100 µm, and more particularly, 2 to 50 µm, then a tubular coating of nickel hydroxide can be formed on the carbon fiber surface while maintaining the fiber's mechanical strength. The nickel hydroxide coating thus formed does not easily detach from the carbon fiber even if expansion and contraction occur due to charging and discharging, that is, the nickel hydroxide coating exhibits excellent adhesion.

It is preferred that 100 to 20000 single carbon fibers, which serve as positive electrode current collectors, are bundled together into one carbon fiber tow. More preferably, 1000 to 5000 single carbon fibers are bundled together into one carbon fiber tow. A single electrode (positive electrode) may be formed by fixing one end of the fiber tow by means of a solderless terminal. Alternatively, a carbon fiber that is formed by twisting 2 to 10 single fibers together may be used. A fiber positive electrode may be formed by bundling together 50 to 2000 such twisted threads of carbon fibers.

The theoretical capacity of nickel hydroxide (positive electrode) and the theoretical capacity of the fiber negative electrode according to the present invention are 289 mAh/g and 250 mAh/g, respectively, which are close values. Generally speaking, for batteries currently put in practical use, the negative electrode capacity is set to be higher than the positive electrode capacity (i.e., the battery capacity is limited by the positive electrode). In such a case, it is necessary to set the number of negative electrode fibers to be more than the number of positive electrode fibers. On the other hand, in the case of fabricating a battery in which the negative electrode capacity is lower than the positive electrode capacity, i.e., the battery capacity is limited by the negative electrode, the number of positive electrode fibers may be set to be more than the number of negative electrode fibers.

(Step (2-1))

Since carbon fibers are originally hydrophobic, carbon fibers may be hydrophilized by using a surfactant. Such hydrophilized carbon fibers allow nickel hydroxide to be electrodeposited on their surface. However, since such hydrophilization treatment alone is not enough for the carbon fibers to obtain sufficient electrical conductivity, nickel hydroxide which is an electrodeposit is deposited non-uniformly among the carbon fibers. In view of this, prior to the electrodeposition of nickel hydroxide, each carbon fiber was uniformly coated with Ni. This made it possible to form, on the surface of each carbon fiber, a nickel hydroxide coating that has a concentrically uniform thickness. The reason for this relates to the electrical conductivity of the carbon fiber surface. Although the electrical resistivity of a carbon fiber is approximately $4 \times 10^{-7}$ Ωm, the electrical resistivity is decreased to approximately $6 \times 10^{-8}$ Ωm when the carbon fiber is coated with Ni. As a result, the electrical conductivity of the carbon fiber surface is increased by approximately ten times. Thus, it is presumed that the Ni coating brings improvements in the electrical conductivity and hydrophilicity of the carbon fiber surface, and makes it possible to form a uniform nickel hydroxide coating through electrodeposition.

As previously mentioned, the most suitable method for forming a Ni coating on a carbon fiber is as follows: forming a thin Ni coating by electroless Ni plating; and then performing electrolytic Ni plating thereon. The method in which the electroless Ni plating and the electrolytic Ni plating are performed on the carbon fiber is the same as in the fiber negative electrode fabrication method.

In a case where Ni plating that reflects fine irregularity of the carbon fiber surface has been performed, if an electrodeposit is deposited onto the irregular portions on the carbon fiber surface in the following electrodeposition process, then an anchor effect is exerted, which brings an advantage that the adhesion of nickel hydroxide, which is a positive electrode active material, is increased.

Meanwhile, if the Ni plating coating becomes thick, the irregularity of the surface of the Ni coating is reduced, and if the thickness of the Ni plating coating exceeds 15 μm, the surface of the Ni coating becomes substantially smooth. In such a case, the adhesion of nickel hydroxide, which is a positive electrode active material, is reduced. It is presumed that a preferable fiber current collector is one having a porous surface, exerting an anchor effect, and capable of maintaining electrical conductivity. Such a fiber current collector can be obtained by forming a Ni plating coating having a preferable thickness of 0.5 to 15 μm or a more preferable thickness of 1 to 8 μm on the surface of a carbon fiber through an electroless plating method followed by an electrolytic plating method.

(Step (2-2))

Next, electrolysis is performed in a nickel nitrate bath, in which the carbon fiber that has gone through the step (2-1) is used as a cathode and a nickel plate is used as an anode. Through the electrolysis, a positive electrode active material coating containing nickel hydroxide is electrodeposited on the surface of the Ni plating coating of the carbon fiber.

The concentration of a nickel nitrate aqueous solution used in the electrodeposition is preferably 0.05 to 1.5 mol/L, and more preferably, 0.3 to 1 mol/L. A current density at the time of performing the electrodeposition is preferably 0.1 to 30 mA/cm$^2$, and more preferably, 1 to 20 mA/cm$^2$. The thickness of the positive electrode active material coating containing nickel hydroxide is preferably 0.5 to 30 μm, and more preferably, 5 to 15 μm. If the thickness is less than 0.5 μm, there is a risk that sufficient battery capacity cannot be obtained. On the other hand, if the thickness of the positive electrode active material coating containing nickel hydroxide is greater than 30 μm, the thickness is formed unevenly, which may result in an increased likelihood of dropping of the positive electrode active material coating from the carbon fiber surface when the positive electrode active material coating expands due to charging and discharging.

When a plurality of carbon fibers that have gone through the step (2-2) are in a state of being bundled together, if the positive electrode active material coating of each carbon fiber expands due to charging and discharging, then surrounding fibers press the expanding positive electrode active material coating, thereby exerting an effect of preventing detachment and dropping of the positive electrode active material coating.

(Step (2-3))

The inventors of the present invention have confirmed that the positive electrode active material coating containing nickel hydroxide, which is formed by the electrodeposition method, is in an amorphous state since nickel nitrate or an ammine complex partially remains in the active material coating. Therefore, if charging and discharging are performed when the active material coating is in such a state, the active material utilization is limited to approximately 30% (in a case where the theoretical capacity is 289 mAh/g). In order to allow the positive electrode active material coating, whish is formed by the electrodeposition method, to sufficiently function as a positive electrode active material, the inventors took into consideration various treatment methods such as heating an electrodeposition bath or adjusting pH of the bath, and found that hydrothermal treatment using a high-temperature caustic alkali aqueous solution was most effective. Hydrothermally treated nickel hydroxide was observed with an electron microscope, and it was confirmed that amorphous nickel hydroxide had transformed into crystalline nickel hydroxide. A fiber positive electrode containing such nickel hydroxide was used in charging and discharging, and it was confirmed that the active material utilization was 100% (in a case where the theoretical capacity was 289 mAh/g).

Preferable crystallinity of nickel hydroxide is such that the half-value width of an X-ray diffraction peak is 5° or less in terms of the angle of diffraction. If the half-value width is greater than 5°, it means that impurities such as nitric radicals, which disturb the atomic arrangement of crystals, are contained in a large amount. In such a state, a function of nickel hydroxide as a positive electrode active material is hindered, and the active material utilization is reduced significantly. If the half-value width is less than 5° in terms of the angle of diffraction, it is considered that impurities that disturb the atomic arrangement of crystals and hinder the function of nickel hydroxide as an active material are substantially removed, and an active material utilization that corresponds to almost 100% of the positive electrode's guaranteed charge capacity can be obtained.

Sodium hydroxide, potassium hydroxide, or lithium hydroxide can be used herein as a caustic alkali. Also, an aqueous solution in which these caustic alkalis are mixed can be used herein as a caustic alkali aqueous solution. The caustic alkali aqueous solution is preferably a sodium hydroxide aqueous solution since it allows a crystalline nickel hydroxide to be obtained within a short period of time. The concentration of the caustic alkali in the aqueous solution is preferably, but not limited to, 10 to 30 wt %. A temperature and a time for immersion in the aqueous solution are preferably, but not limited to, 10 minutes to 24 hours at 40 to 110° C., and more preferably, 1 to 5 hours at 60 to 80° C.

Nitric radicals, which are known as a cause of self-discharge, are removed through immersion treatment in the caustic alkali aqueous solution, and thus, such immersion treatment in the caustic alkali aqueous solution is very effective to suppress the self-discharge of the fiber positive electrode. The immersion treatment is particularly important in applications where self-discharge such as intermittent discharge becomes an issue.

3. Stack of Fiber Negative Electrode, Separator, and Fiber Positive Electrode A fiber electrode assembly can be formed by alternately stacking a fiber negative electrode, a separator, and a fiber positive electrode in such a manner that their horizontal end positions are displaced from each other. In a case where fiber negative electrodes and fiber positive electrodes are formed such that a separator coating is formed on each fiber negative electrode and/or each fiber positive electrode, one fiber electrode and another fiber electrode serving as a counter electrode of the one fiber electrode are stacked alternately and then pressed together. In this manner, an electrode assembly formed of fiber negative electrodes, separators, and fiber positive electrodes is obtained. At the time of stacking the fiber electrodes, end positions of the respective fiber negative electrodes are displaced, by approximately 1 to 5 mm, from end positions of the respective fiber positive electrodes. This makes it easy to form terminals.

A block-shaped fiber electrode assembly can be obtained by performing press forming on a stack of a sheet-like fiber negative electrode and a sheet-like fiber positive electrode, each of which is obtained by spreading a fiber tow. Preferably, an adhesive is thinly applied to the fiber negative electrode and/or the fiber positive electrode prior to stacking them if it is desired to increase the adhesion between the fiber negative electrode and the fiber positive electrode. Here, any adhesive can be used without specific restriction, so long as the adhesive does not reduce the fiber electrode performance, separator performance, or aqueous electrolyte solution performance. Even if the adhesive is dissolved into the electrolyte solution, it does not cause a problem so long as the dissolution into the electrolyte solution occurs after the fiber electrode assembly has been fixed in a battery casing.

When forming terminals of the press-formed fiber electrode assembly, terminals can be formed by welding metal plates to negative and positive electrode sides, respectively, of the electrode assembly or by bringing metal plates into contact with, and then pressing the metal plates against, the fiber electrodes from both the sides. However, if the sheet-like fiber negative electrodes and the sheet-like fiber positive electrodes are in a simply stacked state, then there is a possibility that when a metal plate to serve as a terminal comes into contact with an electrode, the metal plate also comes into contact with a counter electrode, causing short-circuiting. In order to prevent such short-circuiting, it is preferred to use the following method: a negative electrode terminal portion and a positive electrode terminal portion of the electrode assembly are sealed with resin; thereafter, the resin is ground by a cutter or a grinder until the negative electrode terminal portion and the positive electrode terminal portion are exposed; and metal plates are held to the exposed negative electrode and positive electrode terminal portions, respectively, to perform pressing from both sides. Here, any resin can be used without specific restriction, so long as the resin has excellent resistance to an electrolyte solution and an excellent insulating property. A polymer material having an excellent insulating property, or a commercially available synthetic adhesive having excellent resistance to an electrolyte solution and an excellent insulating property, may be used as the resin.

The press-formed fiber electrode assembly is inserted in a battery casing, and an aqueous electrolyte solution is injected thereinto. In this manner, a fiber battery (secondary battery) can be formed. In the fiber battery thus formed, each fiber negative electrode is squeezed in between fiber positive electrodes while electrical insulation between the positive and negative fiber electrodes is maintained by the separator, and therefore, a distance to a counter electrode becomes very short. This makes it possible to significantly reduce internal resistance at the time of charging and discharging. Since a separator coating is formed on each single fiber, a significantly large separator surface area is obtained. As a result, the charging speed and discharging speed of the battery are greatly improved as compared to conventional secondary batteries, and also, ultrafast charging and large current discharging are realized.

Any aqueous solution having proton conductivity or hydroxide ion conductivity may be used as the aqueous electrolyte solution of the secondary battery according to the present invention. Examples of the aqueous electrolyte solution include: (1) an aqueous solution of an inorganic acid such as hydrochloric acid, sulfuric acid, nitric acid, or phosphoric acid; (2) an aqueous solution of an organic acid such as formic acid, acetic acid, oxalic acid, or citric acid; and (3) an aqueous alkali solution such as an alkali metal hydroxide aqueous solution. Among these, a caustic alkali aqueous solution is preferred from the standpoint of allowing nickel hydroxide, which serves as a positive electrode active material, to stably exist. A potassium hydroxide aqueous solution or a sodium hydroxide aqueous solution may be used as the caustic alkali aqueous solution. In cases of secondary batteries using fiber negative electrodes according to Examples 1 to 33, which will be described below, the electrolyte solution is preferably a caustic alkali aqueous solution.

Preferably, the aqueous electrolyte solution is impregnated into or retained by a polymer or a ceramic in order to electrically insulate fiber negative electrodes from fiber positive electrodes within a battery cell. Examples of the polymer include: a polymer such as a polyamide, polyethylene, polypropylene, polyvinyl alcohol, cellophane, or sodium polyacrylate; a complex polymer formed of these polymers; and a weakly acidic cation-exchange resin. Moreover, a material obtained from hydrolyzing any of these polymers may be used.

Any polymer material may be used as a separator material without specific restriction, so long as the polymer material has ion permeability, insulating property, and resistance to an aqueous electrolyte solution. For example, polyvinyl alcohol (PVA), styrene-ethylene-butylene-styrene block copolymer (SEBS), polyvinylidene fluoride (PVdF), polytetrafluoroethylene (PTFE), polyethersulfone (PES), polysulfone (PS), or ethylene vinyl acetate (EVA) can be used as a separator material.

In the case of an alkaline secondary battery using a caustic alkali aqueous solution as an electrolyte solution, a separator coating may be formed by using, for example, polyvinyl alcohol (PVA) which is water-soluble and from which a film can be readily formed.

A polymer material for a separator is dissolved in a solvent to form slurry. The slurry is applied to fiber electrodes (fiber negative electrodes and/or fiber positive electrodes) on a flat glass substrate or on a polyethylene sheet which is release-treated on one side. The slurry is then passed through a slit formed by, for example, doctor blades and thereby formed into a film having a uniform thickness. Then, the glass substrate is heated, or the fiber electrodes to which the slurry is applied are exposed to warm air, so that the slurry is dried within a short period of time. In this manner, a very thin separator coating can be formed on the surface of each fiber electrode such that the separator coating is as thin as the fiber electrode. This makes it possible to significantly reduce an inter-electrode distance.

A separator coating can be formed on the surface of fiber electrodes also in the following manner: the solvent is removed to some extent from the slurry of the polymer material for the separator, which has been applied onto a sheet-like fiber electrode; and pressure bonding is performed on the sheet-like fiber electrode before the slurry is fully dried. Although depending on the polymer type or the solvent type, the concentration of the polymer in the slurry is as described below. For example, in the case of polyvinyl alcohol (PVA), slurry in which the concentration of PVA is adjusted to approximately 5 to 10 wt % is formed, and a coating of the slurry having a uniform thickness is formed on the sheet-like fiber electrode by using a scraper. Thereafter, at the time of performing pressure bonding on the sheet-like fiber electrode, it is preferred that approximately 50 to 80 wt % of moisture has been evaporated from the slurry. If the sheet-like fiber electrode is in such a state, there is a low possibility that fiber electrodes penetrate the separator coating and are exposed when the pressure bonding is performed on the sheet-like fiber electrode, and also, the adhesion between the separator coating and the sheet-like fiber electrode is maintained at a favorable level.

In the case of low moisture evaporation amount, i.e., a case where the amount of evaporation of moisture from the slurry is less than 50 wt %, the polymer separator coating tends to be damaged at the time of pressure bonding. If the moisture evaporation amount is more than 80 wt % (i.e., a residual moisture amount is less than 10%), then the separator coating has sufficient strength. In this case, however, adhesion between the sheet-like fiber electrode and the separator coating (polymer coating) is insufficient.

It is preferred that the separator used herein is made porous, or a filler for improving hydrophilicity is added to the separator. A specific method applicable to form such a porous separator is to form an ultrafiltration membrane by immersing, in a solvent having high affinity for the solvent of the slurry, a fiber electrode to which the slurry of the polymer material for the separator is applied. For example, a toluene solution in which SEBS is dissolved is applied to a fiber electrode, which is then immersed in acetone. In this case, SEBS is not dissolved in acetone, but toluene is dissolved in acetone. As a result, a SEBS film is formed, which has a large number of holes formed thereon due to toluene extraction. Similarly, a porous PVA film can be formed by applying a PVA aqueous solution to a fiber electrode and then immersing the fiber electrode in ethanol. The ion permeability of a PVA film, which is a hydrophilic film, can be improved by forming the PVA film into a porous film.

4. Structure of Fiber Secondary Battery (1) Structure of Stack of Fiber Negative Electrode and Fiber Positive Electrode FIG. 1 is a schematic structural diagram showing a pressurizing cutter configured to stack and press-form fiber negative electrodes and fiber positive electrodes, and to cut away both ends of the stack for shaping. Preferably, the fiber negative electrodes and/or the fiber positive electrodes have a separator coating formed thereon. In FIG. 1, a separator is formed on the surface of each fiber positive electrode, and thus fiber positive electrode/separator stacked bodies 4 (i.e., fiber positive electrodes each coated with a separator coating) are formed. In FIG. 1, a left side die 1 and a right side die 2 are each provided with slits that are vertically spaced apart from each other and formed at regular intervals. These slits are formed such that the slits of the left side die 1 and the slits of the right side die 2 are vertically uneven.

As shown in FIG. 1, fiber negative electrodes 3 are inserted in the slits of the left side die 1, and fiber positive electrode/separator stacked bodies 4 are inserted in the slits of the right side die 2. A gap S is formed between end portions of fiber electrodes and the inner wall of the left side die 1 or the inner wall of the right side die 2, such that the insertion length of each fiber electrode is shorter than a distance L between the inner wall of the left side die 1 and the inner wall of the right side die 2. As a result, positions of end portions of the fiber positive electrodes and positions of end portions of the fiber negative electrodes do not coincide with each other in the vertical direction. This makes it easy to form terminals in a step performed afterward.

A cutter 5 is lowered to cut away edges of the fiber negative electrodes and the fiber positive electrodes and to press a stack of the fiber negative electrodes and the fiber positive electrodes against a fixed base 6. As a result, a fiber electrode stack 7 as shown in FIG. 2A is obtained. FIG. 2A shows the fiber electrode stack 7 which is formed as a result of stacking three sheet-like fiber positive electrodes and three sheet-like fiber negative electrodes. However, the number of sheet-like fiber negative electrodes and sheet-like fiber positive electrodes to be stacked may be varied as necessary.

Next, as shown in FIG. 2B, an epoxy resin adhesive 8 was applied to a positive electrode terminal side and a negative electrode terminal side of the fiber electrode stack 7. After the adhesive was dried, the adhesive was ground by using a grinder as indicated by dotted lines. As a result, as shown in FIG. 2C, positive electrode exposed portions 9 and negative electrode exposed portions 10 were exposed from the resin. A positive electrode terminal and a negative electrode terminal can be formed by bringing, for example, nickel metal plates into contact with the positive electrode exposed portions 9 and the negative electrode exposed portions 10.

(2) Arrangement of Fiber Negative Electrodes and Fiber Positive Electrodes in Fiber Electrode Stack FIG. 3A and FIG. 3B are schematic diagrams each showing arrangement of fiber negative electrodes and fiber positive electrodes in a fiber electrode stack which is fabricated by the above-described method in (1). Sheet-like fiber negative electrodes and sheet-like fiber positive electrodes are horizontally and alternately arranged, and then pressed together. As a result, as shown in FIG. 3A and FIG. 3B, each fiber positive electrode 11 comes into contact with fiber negative electrodes 12 at four points on the outside of the fiber positive electrode 11. Similarly, each fiber negative electrode 12 comes into contact with fiber positive electrodes 11 at four points on the outside of the fiber negative electrode 12. Since this arrangement prevents contact between fiber positive electrodes 11 and contact between fiber negative electrodes 12, the inter-electrode distance can be made shortest possible, which is ideal. FIG. 3B shows FIG. 3A being rotated to the right or left by 45 degrees. Thus, FIG. 3B is an equivalent diagram to FIG. 3A.

In order to realize the arrangement of fiber electrodes as shown in FIGS. 3A and 3B with conventional art, it is necessary to arrange fiber positive electrodes and fiber negative electrodes one by one alternately. However, in reality, it is almost impossible to perform a task of alternately arranging several thousands to several tens of thousands of fiber electrodes, each of which has a diameter of approximately tens of micrometers. Meanwhile, according to the present invention, a secondary battery with ideal electrode arrangement can be obtained through a simple task as follows: a sheet-like fiber negative electrode and a sheet-like fiber positive electrode, each of which is obtained by processing several thousands of fiber electrodes into a sheet-like shape, are horizontally and alternately stacked, and then pressed together.

In the fiber electrode arrangement shown in FIG. 3A and FIG. 3B, each fiber negative electrode is squeezed in between fiber positive electrodes and each fiber positive electrode is squeezed in between fiber negative electrodes. Therefore, a distance to a counter electrode is minimized. This makes it possible to significantly reduce internal resistance at the time of charging and discharging. Also, a separator surface area can be greatly increased as compared to conventional fiber batteries, by forming a separator coating on each fiber electrode.

In FIG. 3A and FIG. 3B, the fiber positive electrode 11 and the fiber negative electrode 12 both have a round cross section. However, the cross-sectional shape is not limited thereto. The cross-sectional shape of the fiber positive electrode and the fiber negative electrode may be polygonal such as triangular or quadrangular, or may be oval.

Sheet-like fiber positive electrodes and sheet-like fiber negative electrodes may be arranged as shown in FIG. 3C, such that fiber positive electrodes 11 and fiber negative electrodes 12 are closest packed. In this case, each fiber electrode is surrounded by six fiber electrodes including fiber positive electrodes and fiber negative electrodes.

If the sheet-like fiber positive electrode and the sheet-like fiber negative electrode both have a sufficiently thin sheet thickness, then the electrode arrangement may be such that a plurality of sheet-like fiber positive electrodes are stacked together and a plurality of sheet-like fiber negative electrodes are stacked together, as shown in FIG. 3D. Assume a case where a single fiber thickness is 15 µm. In such a case, even if 10 sheets of sheet-like fiber positive electrodes, or 10 sheets of sheet-like fiber negative electrodes, are stacked, the stacked sheets have a thickness of merely approximately 150 µm. Usually, a conventional plate electrode has a thickness of approximately 300 µm. Accordingly, it can be expected that the stacked fiber electrode sheets, having a thickness that is approximately a half of the thickness of a conventional plate electrode, improve the charging speed and discharging speed.

A stack of fiber negative electrodes and fiber positive electrodes as shown in FIG. 4A can be formed in the following manner: wrapping a spacer 22 (e.g., a polypropylene spacer) around a fiber electrode stack 21 which is fabricated as shown in FIG. 2C; and then placing the fiber electrode stack 21 in a battery casing 23 (e.g., a stainless casing which serves as a negative electrode terminal) having a square cross section. Spacers 24 are attached to an end of the battery casing 23. Then, the battery casing 23 is sealed by a stainless cover 25 (which serves as a positive electrode terminal). In this manner, a fiber battery 26 as shown in FIG. 4B can be fabricated.

The fiber battery 26 shown in FIG. 4B has a structure in which the fiber electrode stack 21 is sealed by the battery casing 23 and the cover 25. However, as an alternative example, the fiber electrode stack shown in FIG. 2A or FIG. 2C may be inserted in a cylindrical case of which both ends are opened, or an insulating rope may be wound around the fiber electrode stack. In such a manner, a fiber battery that remains in the form of a fiber electrode stack may be formed.

(3) Fabrication of High-Capacity Secondary Battery

FIG. 5A shows a case where the fiber battery 26 shown in FIG. 4B is used as a unit battery and a plurality of the unit batteries are stacked and connected in parallel (FIG. 5A shows two groups of five unit batteries, i.e., a total of ten unit batteries) to form a unit battery stack 31. The unit battery stack 31 is accommodated in an insulating framework member 32 (e.g., a polypropylene cell frame), and a positive electrode terminal side and a negative electrode terminal side of the unit battery stack 31 are covered with electrically conductive framing members 33 and 34 (e.g., nickel-plated steel plates). In this manner, a battery stack (high-capacity battery) 35 as shown in FIG. 5B can be formed. The capacity of the battery stack 35 can be increased by increasing the number of fiber batteries 26 that form the unit battery stack 31.

Further, a battery module 36 as shown in FIG. 6 can be formed by stacking a plurality of battery stacks 35. The battery stack 35 shown in FIG. 5B, in which a plurality of fiber batteries 26 are connected in parallel, has high capacity. However, the voltage of the battery stack 35 is the same as that of one fiber battery 26 which is a unit battery. Increased battery voltage as compared to one fiber battery 26, which is a unit battery, can be obtained by forming the battery module 36 in which a plurality of battery stacks 35 are serially connected.

Figure 7:
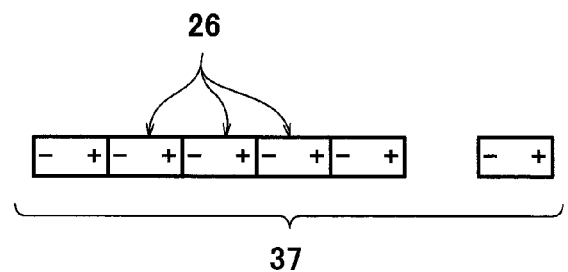
FIG. 7 is a schematic structural diagram showing a battery module which is formed by connecting (stacking) a plurality of secondary batteries according to the present invention.

If increased battery voltage as compared to the voltage of one fiber battery 26, which is a unit battery, is desired, but having the same battery capacity as that of the unit battery is sufficient, then a battery module 37 as shown in FIG. 7 in which a plurality of fiber batteries 26 are serially connected may be formed.

In the battery module 36 as shown in FIG. 6, it is preferred that a cooling plate is disposed between adjacent battery stacks 35 to remove heat that is generated due to charging and discharging.

5. Examples of Fiber Negative Electrode (1) Li—Mn—Ni—O Based Compound

Example 1

Commercially available 3000 carbon fibers (available from TOHO TENAX Co., Ltd., and obtained by carbonizing polyacrylonitrile fibers at 2500° C.) were bundled together to form a carbon fiber tow which served as a current collector. The length of the carbon fibers forming the current collector was 5 cm, and the average diameter of the carbon fibers was 6 µm.

First, electrodeposition treatment was performed, in which: an aqueous solution of $Mn(NO_3)_2$ (0.3 mol/L) was used as an electrodeposition bath; the carbon fiber tow was used as a working electrode; and a nickel foil was used as a counter electrode. The electrodeposition treatment was performed under the condition of a constant current density of 50 $mA/cm^2$ for 10 minutes. After the electrodeposition treatment was performed, the carbon fibers were washed with water and then dried under an air atmosphere at a temperature of 100° C. for 24 hours or longer. As a result, a fiber negative electrode precursor, which is formed of the carbon fibers having the surface coated with $Mn_3O_4$, was obtained. This fiber electrode precursor does not function as a negative electrode of an alkaline secondary battery. Also, none of fiber electrode precursors obtained in Examples 2 to 8 described below functions as a negative electrode of an alkaline secondary battery.

The fiber negative electrode precursor, i.e. the carbon fibers having the surface coated with $Mn_3O_4$, was immersed in a lithium hydroxide aqueous solution to which sodium hypochlorite was added (the concentration of sodium hypochlorite: 0.01 mol/L). Then, the fiber negative electrode precursor was hydrothermally treated at 130° C. for 20 hours, and thereafter dried under reduced pressure at 110° C. for 24 hours or longer. As a result, a fiber negative electrode, which is formed of the carbon fibers having the surface coated with a negative electrode active material $LiMnO_2$, was obtained.

Example 2

Carbon fibers were coated with $Mn_3O_4$ and $Ni(OH)_2$ by an electrodeposition method, in which the same carbon fiber tow (current collector) as in Example 1 was used as a working electrode, and a mixture of an aqueous solution of $Mn(NO_3)_2$ (0.1 mol/L) and an aqueous solution of $Ni(No_3)_2$ (0.1 mol/L) was used as an electrodeposition bath. A nickel foil was used as a counter electrode. Here, electrodeposition treatment was performed under the condition of a constant current density of 50 mA/cm² for 10 minutes. After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with $Mn_3O_4$ and NiO, was obtained.

The fiber negative electrode precursor, i.e. the carbon fibers having the surface coated with $Mn_3O_4$ and NiO, was immersed in a lithium hydroxide aqueous solution to which sodium hypochlorite was added (the concentration of sodium hypochlorite: 0.02 mol/L). Then, the fiber negative electrode precursor was hydrothermally treated under the condition of 120° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.5}Ni_{0.5}O_2$, was obtained.

Example 3

Carbon fibers were coated with $Mn_3O_4$ and $Ni(OH)_2$ by an electrodeposition method, in which the same carbon fiber tow as in Example 1 was used as a working electrode, and a mixture of an aqueous solution of $Mn(NO_3)_2$ (0.1 mol/L) and an aqueous solution of $Ni(No_3)_2$ (0.15 mol/L) was used as an electrodeposition bath. A nickel foil was used as a counter electrode. Here, electrodeposition treatment was performed under the condition of a constant current density of 50 mA/cm² for 10 minutes. After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with $Mn_3O_4$ and NiO, was obtained.

The fiber negative electrode precursor, i.e. the carbon fibers having the surface coated with $Mn_3O_4$ and NiO, was immersed in a lithium hydroxide aqueous solution to which sodium hypochlorite was added (the concentration of sodium hypochlorite: 0.02 mol/L). Then, the fiber negative electrode precursor was hydrothermally treated under the condition of 120° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.4}Ni_{0.6}O_2$, was obtained.

Example 4

Carbon fibers were coated with $Mn_3O_4$ and $Ni(OH)_2$ by an electrodeposition method, in which the same carbon fiber tow as in Example 1 was used as a working electrode, and a mixture of an aqueous solution of $Mn(NO_3)_2$ (0.1 mol/L) and an aqueous solution of $Ni(No_3)_2$ (0.23 mol/L) was used as an electrodeposition bath. A nickel foil was used as a counter electrode. Here, electrodeposition treatment was performed under the condition of a constant current density of 50 mA/cm² for 10 minutes. After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with $Mn_3O_4$ and NiO, was obtained.

The fiber negative electrode precursor, i.e. the carbon fibers having the surface coated with $Mn_3O_4$ and NiO, was immersed in a lithium hydroxide aqueous solution to which sodium hypochlorite was added (the concentration of sodium hypochlorite: 0.02 mol/L). Then, the fiber negative electrode precursor was hydrothermally treated under the condition of 120° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.3}Ni_{0.7}O_2$, was obtained.

Example 5

Carbon fibers were coated with $Mn_3O_4$ and $Ni(OH)_2$ by an electrodeposition method, in which the same carbon fiber tow as in Example 1 was used as a working electrode, and a mixture of an aqueous solution of $Mn(NO_3)_2$ (0.1 mol/L) and an aqueous solution of $Ni(No_3)_2$ (0.4 mol/L) was used as an electrodeposition bath. A nickel foil was used as a counter electrode. Here, electrodeposition treatment was performed under the condition of a constant current density of 50 mA/cm² for 10 minutes. After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with $Mn_3O_4$ and NiO, was obtained.

The fiber negative electrode precursor, i.e. the carbon fibers having the surface coated with $Mn_3O_4$ and NiO, was immersed in a lithium hydroxide aqueous solution to which sodium hypochlorite was added (the concentration of sodium hypochlorite: 0.02 mol/L). Then, the fiber negative electrode precursor was hydrothermally treated under the condition of 120° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.2}Ni_{0.8}O_2$, was obtained.

Example 6

Through a method similar to the methods in Examples 2 to 5, a negative electrode active material coating $LiMn_{0.8}Ni_{0.2}O_2$ was formed on a carbon fiber current collector, and thereby a fiber negative electrode was fabricated.

Example 7

Through a method similar to the methods in Examples 2 to 5, a negative electrode active material coating $LiMn_{0.6}Ni_{0.4}O_2$ was formed on a carbon fiber current collector, and thereby a fiber negative electrode was fabricated.

Example 8

Carbon fibers were coated with $Ni(OH)_2$ by an electrodeposition method, in which the same carbon fiber tow as in Example 1 was used as a working electrode, and an aqueous solution of Ni(NO$_3$)$_2$ (0.3 mol/L) was used as an electrodeposition bath. A nickel foil was used as a counter electrode. Here, electrodeposition treatment was performed under the condition of a constant current density of 50 mA/cm$^2$ for 10 minutes. After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with NiO, was obtained.

The fiber negative electrode precursor, i.e. the carbon fibers having the surface coated with NiO, was immersed in a lithium hydroxide aqueous solution to which sodium hypochlorite was added (the concentration of sodium hypochlorite: 0.02 mol/L). Then, the fiber negative electrode precursor was hydrothermally treated under the condition of 120° C. for 20 hours, and thereafter dried under reduced pressure at 110° C. for 24 hours or longer. As a result, a fiber negative electrode, which is formed of the carbon fibers having the surface coated with a negative electrode active material LiNiO$_2$, was obtained.

Comparative Example

An electrodeposition method was performed, in which: an aqueous solution of Mn(NO$_3$)$_2$ (0.3 mol/L) was used as an electrodeposition bath; a Ni foil (having a thickness of 30 μm), which is a plate-shaped current collector, was used as a working electrode; and a nickel foil was also used as a counter electrode. Through the electrodeposition method, Mn$_3$O$_4$ was deposited on the Ni foil working electrode. Here, electrodeposition treatment was performed under the condition of a constant current density of 50 mA/cm$^2$ for 10 minutes. After the electrodeposition treatment was performed, the Ni foil was washed with water and then dried under an air atmosphere at a temperature of 100° C. for 24 hours or longer. As a result, a negative electrode precursor, i.e., the Ni foil having the surface coated with Mn$_3$O$_4$, was obtained. As with the negative electrode precursors of Examples 1 to 8, this negative electrode precursor does not function as a negative electrode of an alkaline secondary battery.

The negative electrode precursor, i.e. the Ni foil having the surface coated with Mn$_3$O$_4$, was immersed in a lithium hydroxide aqueous solution to which sodium hypochlorite was added (the concentration of sodium hypochlorite: 0.01 mol/L). Then, the negative electrode precursor was hydrothermally treated under the condition of 130° C. for 20 hours, and thereafter dried under reduced pressure at 110° C. for 24 hours or longer. As a result, a plate negative electrode, i.e., the Ni foil having the surface coated with a negative electrode active material LiMnO$_2$, was obtained.

In Examples 1 to 8 and Comparative Example, the source of lithium was adjusted to 3 mol/L.

Reference Example

Fabrication of Fiber Positive Electrode

The same carbon fiber tow as in Example 1 was plated with Ni by an electrolytic method using a Watts bath. An aqueous solution, containing 350 g/L of nickel sulfate hexahydrate, 45 g/L of nickel chloride hexahydrate, and 42 g/L of boric acid as main components, was used as the Watts bath. One end of the carbon fiber tow was sandwiched by two foamed nickel pieces, and then the one end of the carbon fiber tow was fixed by pressure bonding. In this manner, a terminal was formed on the end of the carbon fiber tow. Then, the carbon fiber tow having the terminal was immersed in the Watts bath. A Ni plate having a thickness of 2 mm was used as a counter electrode. The Ni plating was adjusted such that the Ni plating thickness became 2 μm on average. The Ni-plated carbon fiber tow was used as a fibrous current collector.

Next, the fibrous current collector was coated with nickel hydroxide by an electrodeposition method, in which: an aqueous solution of Ni(NO$_3$)$_2$ (0.3 mol/L) was used as an electrodeposition bath; the fibrous current collector was used as a working electrode; and a nickel foil was used as a counter electrode. Here, electrodeposition was performed under the condition of a current density of 20 mA/cm$^2$ for 6 minutes. The thickness of nickel hydroxide electrodeposited on the fibrous current collector was 8 μm on average, and the efficiency of the nickel hydroxide electrodeposition was approximately 45%.

The fibrous current collector coated with nickel hydroxide was immersed in an aqueous solution of 20 wt % sodium hydroxide for 20 minutes at 60° C., and then washed with water and dried. As a result, a fiber positive electrode, which is formed of the carbon fibers having the surface coated with nickel hydroxide serving as a positive electrode active material, was obtained. The capacity density of nickel hydroxide of the fiber positive electrode including the fibrous current collector was 415 mAh/cc.

[Battery Test 1]

The negative electrodes of Examples 1 to 5, Example 8, and Comparative Example were used as test electrodes. Test cells were fabricated in the following manner: each test electrode was sandwiched by the above-described fiber positive electrodes serving as counter electrodes; a polypropylene nonwoven fabric was disposed as a separator between the positive and negative electrodes; and an aqueous solution in which 6.5 mol/L of potassium hydroxide and 1.5 mol/L of lithium hydroxide were mixed was used as an aqueous electrolyte solution. Charge/discharge tests were performed by using these test cells. Each test cell was formed as a battery, the negative electrode capacity of which was set to be lower than the positive electrode capacity. That is, the battery capacity was limited by the negative electrode. The negative electrode/positive electrode capacity ratio (N/P ratio) was set to 0.5.

Table 1 shows results of battery tests, in which the negative electrodes of Examples 1 to 5, Example 8, and Comparative Example were used as test electrodes. In the battery tests, discharging was controlled with reference to a cutoff voltage; a charge/discharge current corresponding to 0.2 C was used; and a charged capacity was set to 350 mAh/g.

TABLE 1

|  | At 1st Cycle | At 100th Cycle | Intermediate Discharge Voltage |
|---|---|---|---|
| Example 1 | 242 mAh/g | 190 mAh/g | Approx. 0.85 V |
| Example 2 | 245 mAh/g | 240 mAh/g | Approx. 0.95 V |
| Example 3 | 246 mAh/g | 230 mAh/g | Approx. 0.92 V |
| Example 4 | 241 mAh/g | 218 mAh/g | Approx. 0.88 V |
| Example 5 | 230 mAh/g | 181 mAh/g | Approx. 0.83 V |
| Example 8 | 223 mAh/g | 178 mAh/g | Approx. 0.92 V |
| Comparative Example | 120 mAh/g | 79 mAh/g | Approx. 0.8 V |

As is clear from Table 1, each of the test cells using the fiber negative electrodes of Examples 1 to 5 and 8 exhibited a higher discharge capacity than that of the test cell using the negative electrode of Comparative Example (i.e., a Ni foil negative electrode). Since lithium metal oxides do not have a favorable electrical conductivity, it is considered that when a negative electrode active material coating is formed on a metal foil, a conductive path is not sufficiently obtained and a capacity retention rate (%) is low. Meanwhile, in the case of a fiber negative electrode, a thin negative electrode active material coating is formed on each single fiber. In such a fiber negative electrode, a current collector is disposed inside the negative electrode active material coating, and the outer periphery of the negative electrode active material coating is in contact with an electrolyte solution. Such a structure of the fiber negative electrode having a thin active material coating facilitates smooth reactions with electrons inside the active material coating and reactions with ions outside the active material coating. Therefore, it is considered that a high discharge capacity can be obtained.

If a conventional method where a foamed nickel base material is loaded with active material particles is used, the distance between the active material and the current collector is greater than in the case of a fibrous electrode, and in addition, there are active material particles that are not in direct contact with the current collector and that are indirectly supplied with electrons from the current collector via other active material particles. When the electrical conductivity of an active material is low, reactions between the active material and electrons are not facilitated, which results in a low charging/discharging speed. Thus, the conventional electrode requires the surface of the active material to react with both electrons and ions, and also requires the thickness of a coating of an electrically conductive material to be adjusted so as not to hinder ion diffusibility.

In the case of each of the test cells using the fiber negative electrodes of Examples 1, 5, and 8, the capacity gradually decreased as the cycles were repeated, and the capacity at the 100th cycle was approximately 80% of the capacity at the 1st cycle. Such a capacity decrease can be prevented by partially replacing Mn or Ni with a different element. Meanwhile, the test cells using the fiber negative electrodes of Examples 2 and 3 exhibited a high capacity retention.

Figure 8:
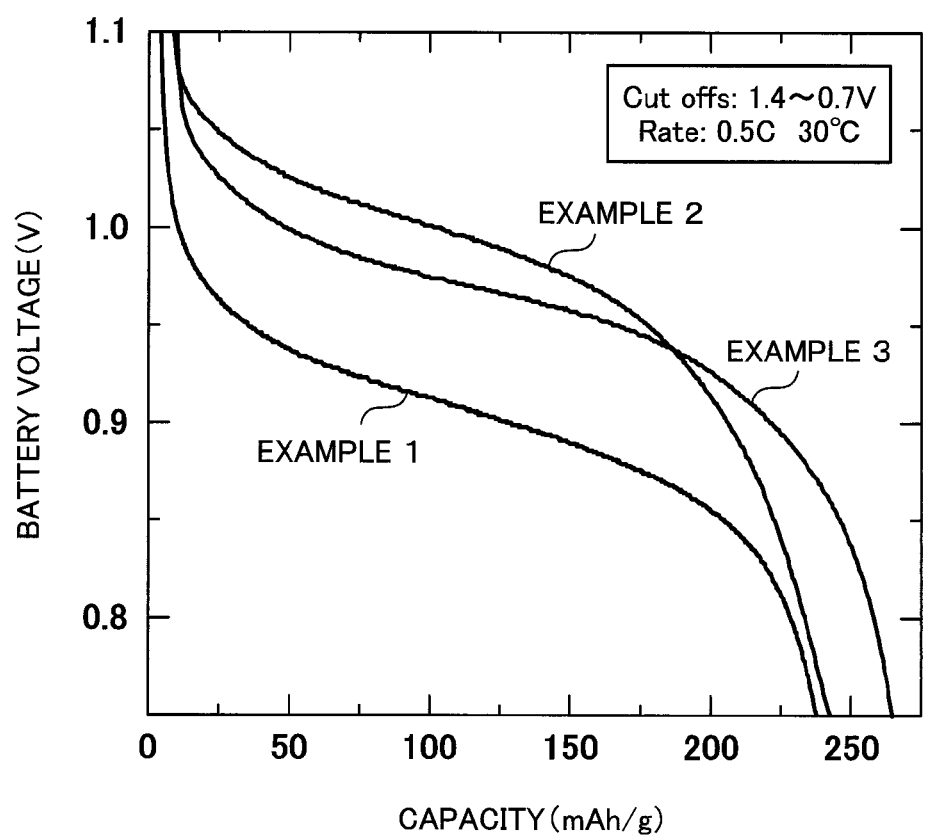
FIG. 8 shows discharge curves of test cells (batteries) using fiber negative electrodes of Examples 1, 2, and 3.
Figure 9:
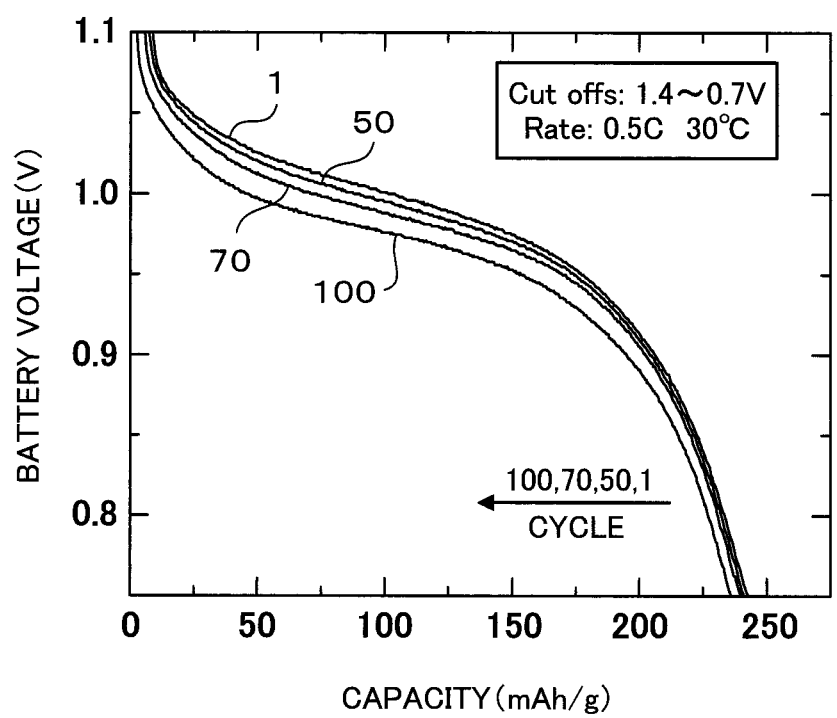
FIG. 9 shows discharge curves of the test cell using the fiber negative electrode of Example 2.
Figure 10:
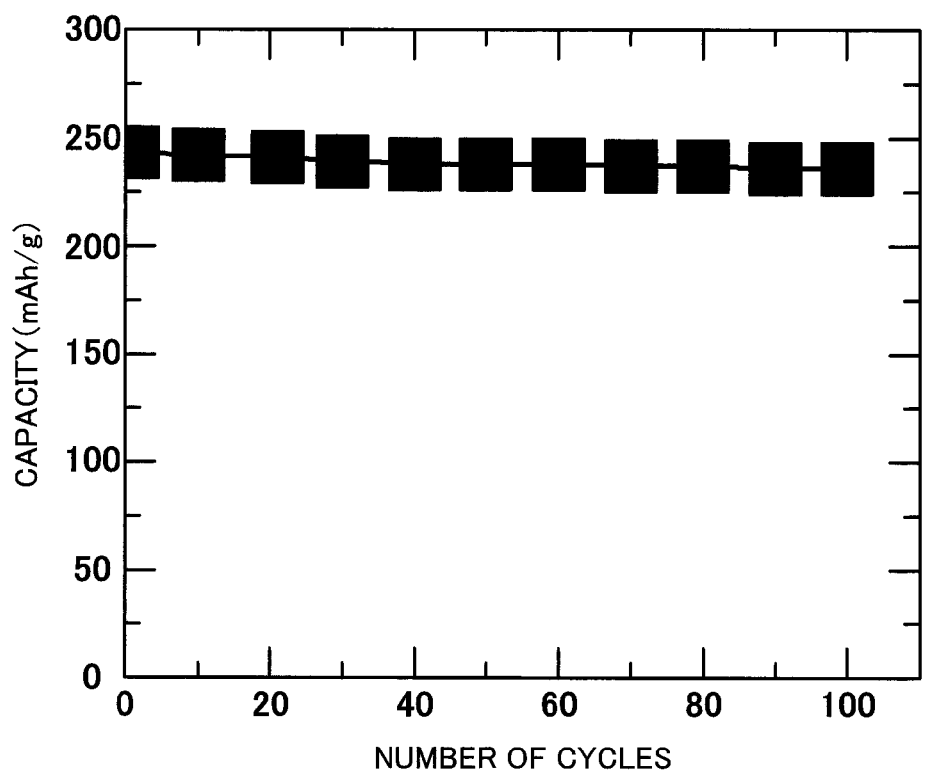
FIG. 10 shows a graph illustrating cycle-life performance of the test cell using the fiber negative electrode of Example 2.

FIG. 8 shows discharge curves of the test cells (secondary batteries) using the fiber negative electrodes of Examples 1, 2, and 3. Among the test cells shown in FIG. 8, the test cell using the fiber negative electrode of Example 2 showed particularly favorable cycle-life performance. FIG. 9 shows discharge curves of the test cell using the fiber negative electrode of Example 2. FIG. 10 shows a graph illustrating the cycle-life performance of the test cell using the fiber negative electrode of Example 2. It has been confirmed from FIGS. 9 and 10 that even when the 100th cycle has passed, the test cell using the fiber negative electrode of Example 2 shows almost no capacity decrease and maintains its voltage at approximately 1 V, which is the initial voltage value.

Figure 11:
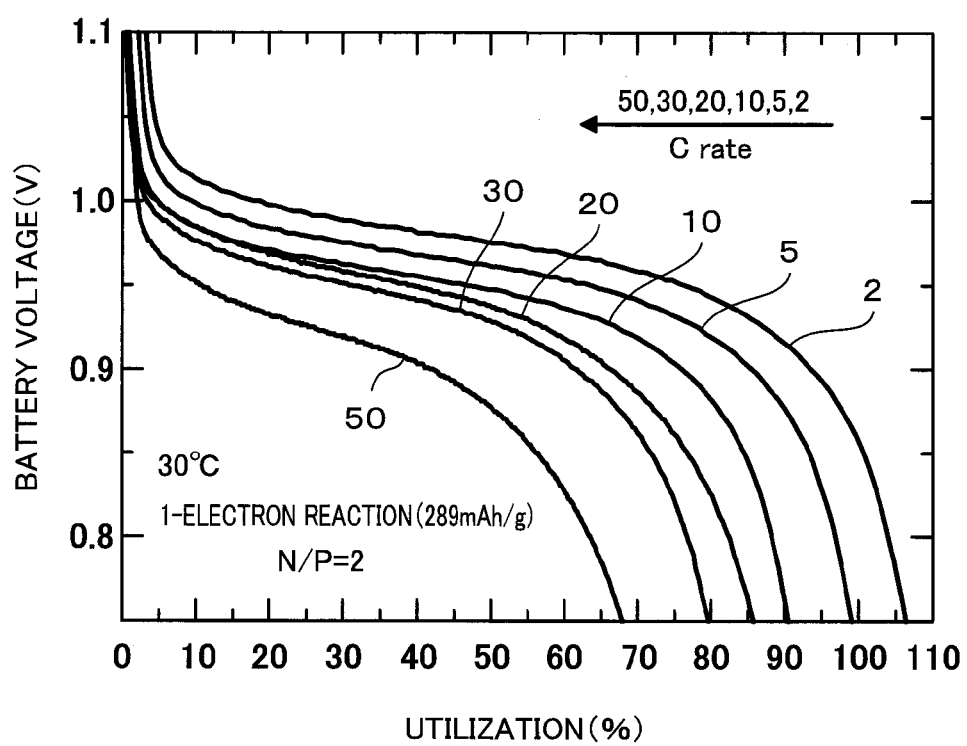
FIG. 11 shows a graph illustrating high-rate discharge capability of the test cell using the fiber negative electrode of Example 2.

FIG. 11 shows a graph illustrating high-rate discharge capability of the test cell (of which the capacity is limited by its positive electrode) using a fibrous nickel hydroxide positive electrode and the fiber negative electrode of Example 2 (of which the negative electrode active material is $LiMn_{0.5}Ni_{0.5}O_2$). Assuming that a current that causes a fully charged battery to be fully discharged in one hour is 1 C, it has been confirmed from FIG. 11 that even in the case of a large current 50 times as great as the current (i.e., 50 C), 70 to 80% of the capacity can be discharged and a discharge voltage of 0.9 to 0.95 V is maintained. Thus, the test cell using the fiber negative electrode of Example 2 also exhibited favorable high-power capability.

<Suitable Composition of Li—Mn—Ni—O Based Compound>

Figure 12:
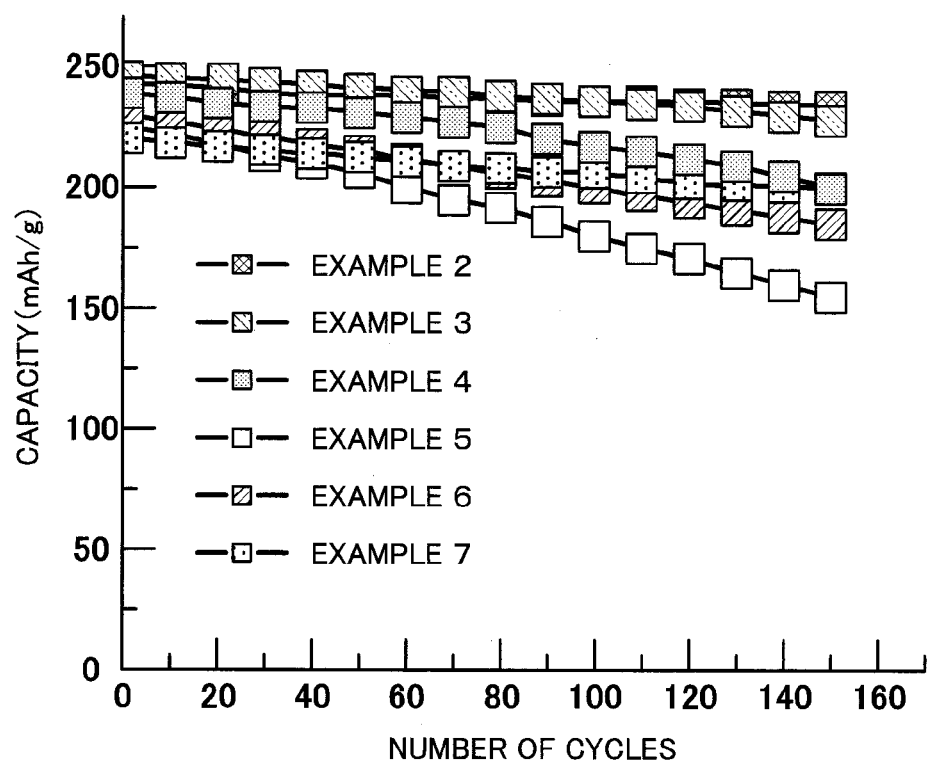
FIG. 12 shows a graph illustrating cycle-life performance of test cells using fiber negative electrodes of Examples 2 to 7.
Figure 13:
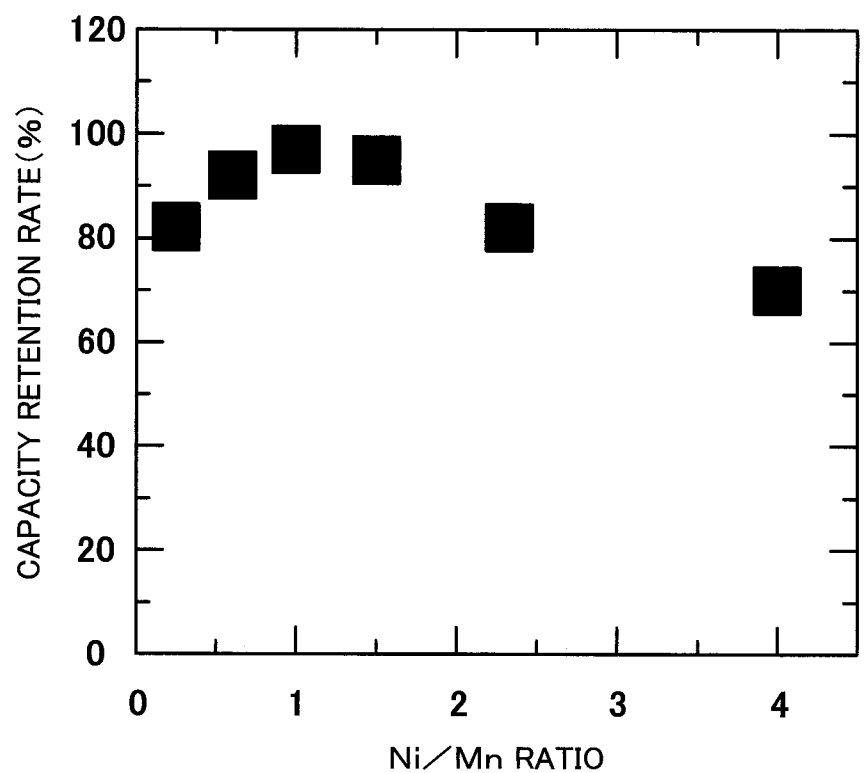
FIG. 13 shows a graph illustrating, for each test cell in the graph of FIG. 12, a relationship between a Ni/Mn ratio (molar ratio) of a Li—Mn—Ni—O based compound, which is a negative electrode active material, and a capacity retention rate (%) at the 150th cycle.

FIG. 12 shows a graph illustrating cycle-life performance of the test cells using the fiber negative electrodes of Examples 2 to 7. FIG. 13 shows a graph illustrating, for each test cell in the graph of FIG. 12, a relationship between a Ni/Mn ratio (molar ratio) of a Li—Mn—Ni—O based compound, which is a negative electrode active material, and a capacity retention rate (%) at the 150th cycle. The capacity retention rate (%) herein refers to the following: (capacity at the 150th cycle/capacity at the 1st cycle)×100. It has been confirmed from FIG. 13 that the capacity retention rate of the test cell is high particularly in a case where the Ni/Mn ratio is $1 \leq Ni/Mn \leq 1.5$.

(2) Li—Ni—Bi/Al—O Based Compound (2-1) Li—Ni—Bi—O Based Compound

Example 9

Commercially available 3000 carbon fibers (available from TOHO TENAX Co., Ltd., and obtained by carbonizing polyacrylonitrile fibers at 2500° C.) were bundled together to form a carbon fiber tow which served as a current collector. The length of the carbon fibers forming the current collector was 3 cm, and the average diameter of the carbon fibers was 6 μm.

A mixture of an aqueous solution of $Ni(NO_3)_2$ (0.3 mol/L) and an aqueous solution of $Bi(NO_3)_2$ (0.015 mol/L) was prepared as an electrodeposition bath. Ammonia water was dripped into the electrodeposition bath to adjust the pH to 3. An electrodeposition method using the electrodeposition bath was performed, in which the carbon fiber tow of the 3000 carbon fibers was used as a working electrode, and thereby the carbon fibers were coated with $Ni(OH)_2$ and $Bi_2O_3$. A nickel foil was used as a counter electrode. Here, electrodeposition treatment was performed under the condition of a constant current density of 50 mA/cm² for 10 minutes. The temperature of the electrodeposition bath was an ordinary temperature (approximately 25° C.).

After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with NiO and $Bi_2O_3$, was obtained. This fiber electrode precursor does not function as a negative electrode of an alkaline secondary battery. Also, none of fiber negative electrode precursors obtained in Examples 10 to 13 described below functions as a negative electrode of an alkaline secondary battery.

The fiber negative electrode precursor was immersed in a sodium hypochlorite aqueous solution (the concentration of sodium hypochlorite: 0.02 mol/L) for approximately 10 seconds. Next, the fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 120° C. for 20 hours or longer. As a result, a fiber negative electrode, which is formed of the carbon fibers having the surface coated with a negative electrode active material $LiNi_{0.95}Bi_{0.05}O_2$, was obtained.

Example 10

A mixture of an aqueous solution of $Ni(NO_3)_2$ (0.3 mol/L) and an aqueous solution of $Bi(NO_3)_2$ (0.03 mol/L) was prepared as an electrodeposition bath. Ammonia water was dripped into the electrodeposition bath to adjust the pH to 3. Similar to Example 9, carbon fibers were coated with Ni(OH)$_2$ and Bi$_2$O$_3$ by an electrodeposition method. A nickel foil was used as a counter electrode. Here, electrodeposition treatment was performed under the condition of a constant current density of 50 mA/cm$^2$ for 10 minutes. After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with NiO and Bi$_2$O$_3$, was obtained.

The fiber negative electrode precursor, i.e. the carbon fibers having the surface coated with NiO and Bi$_2$O$_3$, was immersed in a lithium hydroxide aqueous solution to which sodium hypochlorite was added (the concentration of sodium hypochlorite: 0.02 mol/L). Then, the fiber negative electrode precursor was hydrothermally treated under the condition of 110° C. for 20 hours, and thereafter dried under reduced pressure at 120° C. for 20 hours or longer. As a result, a fiber negative electrode, which is formed of the carbon fibers having the surface coated with a negative electrode active material LiNi$_{0.9}$Bi$_{0.1}$O$_2$, was obtained.

Example 11

A mixture of an aqueous solution of Ni(NO$_3$)$_2$ (0.3 mol/L) and an aqueous solution of Bi(NO$_3$)$_2$ (0.05 mol/L) was prepared as an electrodeposition bath. Ammonia water was dripped into the electrodeposition bath to adjust the pH to 3. Similar to Example 9, carbon fibers were coated with Ni(OH)$_2$ and Bi$_2$O$_3$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with NiO and Bi$_2$O$_3$, was obtained.

The fiber negative electrode precursor was immersed in a sodium hypochlorite aqueous solution (the concentration of sodium hypochlorite: 0.02 mol/L) for approximately 10 seconds. Next, the fiber negative electrode precursor was immersed in 3 mol/L of lithium hydroxide aqueous solution to which 0.5 g/L of hydrogen peroxide solution (H$_2$O$_2$) was added. Then, the fiber negative electrode precursor was hydrothermally treated under the condition of 110° C. for 20 hours, and thereafter dried under reduced pressure at 120° C. for 20 hours or longer. As a result, a fiber negative electrode, which is formed of the carbon fibers having the surface coated with a negative electrode active material LiNi$_{0.85}$Bi$_{0.15}$O$_2$, was obtained.

Example 12

A mixture of an aqueous solution of Ni(NO$_3$)$_2$ (0.3 mol/L) and an aqueous solution of Bi(NO$_3$)$_2$ (0.075 mol/L) was prepared as an electrodeposition bath. Ammonia water was dripped into the electrodeposition bath to adjust the pH to 3. Similar to Example 9, carbon fibers were coated with Ni(OH)$_2$ and Bi$_2$O$_3$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with NiO and Bi$_2$O$_3$, was obtained.

The fiber negative electrode precursor was immersed in a sodium hypochlorite aqueous solution (the concentration of sodium hypochlorite: 0.02 mol/L) for approximately 10 seconds. Next, the fiber negative electrode precursor was immersed in 3 mol/L of lithium hydroxide aqueous solution to which 0.5 g/L of hydrogen peroxide solution (H$_2$O$_2$) was added. Then, the fiber negative electrode precursor was hydrothermally treated under the condition of 110° C. for 20 hours, and thereafter dried under reduced pressure at 120° C. for 20 hours or longer. As a result, a fiber negative electrode, which is formed of the carbon fibers having the surface coated with a negative electrode active material LiNi$_{0.8}$Bi$_{0.2}$O$_2$, was obtained.

Example 13

A mixture of an aqueous solution of Ni(NO$_3$)$_2$ (0.3 mol/L) and an aqueous solution of Bi(NO$_3$)$_2$ (0.12 mol/L) was prepared as an electrodeposition bath. Ammonia water was dripped into the electrodeposition bath to adjust the pH to 3. Similar to Example 9, carbon fibers were coated with Ni(OH)$_2$ and Bi$_2$O$_3$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with NiO and Bi$_2$O$_3$, was obtained.

The fiber negative electrode precursor was immersed in a sodium hypochlorite aqueous solution (the concentration of sodium hypochlorite: 0.02 mol/L) for approximately 10 seconds. Next, the fiber negative electrode precursor was immersed in 3 mol/L of lithium hydroxide aqueous solution to which 0.5 g/L of hydrogen peroxide solution (H$_2$O$_2$) was added. Then, the fiber negative electrode precursor was hydrothermally treated under the condition of 110° C. for 20 hours, and thereafter dried under reduced pressure at 120° C. for 20 hours or longer. As a result, a fiber negative electrode, which is formed of the carbon fibers having the surface coated with a negative electrode active material LiNi$_{0.7}$Bi$_{0.3}$O$_2$, was obtained.

[Battery Test 2]

The fiber negative electrodes of Examples 9 to 13 were used as test electrodes. Test cells were fabricated in the following manner: each test electrode was sandwiched by the above-described fiber positive electrodes serving as counter electrodes; a polypropylene nonwoven fabric was disposed as a separator between the positive and negative electrodes; and an aqueous solution in which 6.5 mol/L of potassium hydroxide and 1.5 mol/L of lithium hydroxide were mixed was used as an aqueous electrolyte solution. Charge/discharge tests were performed by using these test cells. Each test cell was formed as a battery, the negative electrode capacity of which was set to be lower than the positive electrode capacity. That is, the battery capacity was limited by the negative electrode. The negative electrode/positive electrode capacity ratio (N/P ratio) was set to 0.5.

Table 2 shows results of battery tests, in which the fiber negative electrodes of Examples 9 to 13 and the negative electrode of Comparative Example were used as test electrodes. In the battery tests, discharging was controlled with reference to a cutoff voltage; a charge/discharge current corresponding to 0.2 C was used; and a charged capacity was set to 350 mAh/g.

TABLE 2

|  | At 1st Cycle | At 100th Cycle | Intermediate Discharge Voltage |
| --- | --- | --- | --- |
| Example 9 | 251 mAh/g | 232 mAh/g | Approx. 1.04 V |
| Example 10 | 250 mAh/g | 243 mAh/g | Approx. 1.03 V |
| Example 11 | 246 mAh/g | 215 mAh/g | Approx. 1.02 V |
| Example 12 | 240 mAh/g | 200 mAh/g | Approx. 1.02 V |
| Example 13 | 238 mAh/g | 177 mAh/g | Approx. 1.0 V |
| Comparative Example | 120 mAh/g | 79 mAh/g | Approx. 0.8 V |

As is clear from Table 2, each of the test cells using the fiber negative electrodes of Examples 9 to 13 exhibited a higher capacity and a higher capacity retention than those of the test cell using the negative electrode of Comparative Example (i.e., a Ni foil negative electrode).

In the case of Example 9, the capacity at the 100th cycle was 92% of the capacity at the 1st cycle. In the case of Example 10, the capacity at the 100th cycle was 97% of the capacity at the 1st cycle. On the other hand, in the case of each of Examples 11 to 13, the capacity decrease was greater than in the cases of Examples 9 and 10 from early cycles. In the case of each of Examples 11 to 13, the capacity at the 100th cycle was approximately 75 to 85% of the capacity at the 1st cycle.

Figure 14:
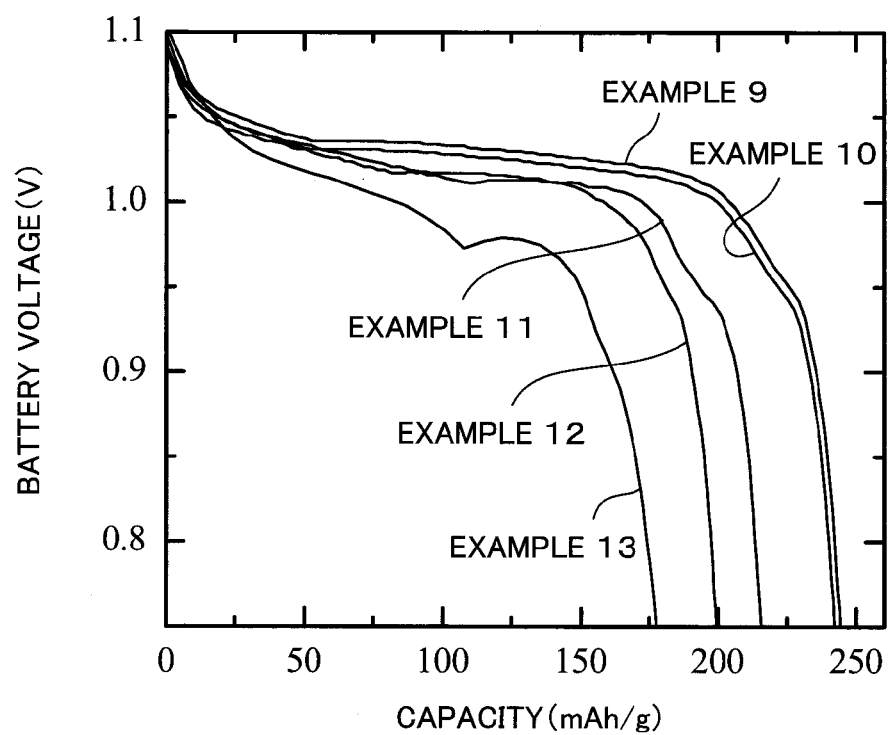
FIG. 14 shows discharge curves (at the 120th cycle) of test cells (batteries) using fiber negative electrodes of Examples 9 to 13.

FIG. 14 shows discharge curves (at the 120th cycle) of the test cells (secondary batteries) using the fiber negative electrodes of Examples 9 to 13. It has been confirmed that each of the test cells using the fiber negative electrodes of Examples 9 and 10 has a higher discharge voltage of 1.03 to 1.04 V and a higher discharge capacity than the discharge voltage and discharge capacity of the test cells using the fiber negative electrodes of Examples 11 to 13.

Figure 15:
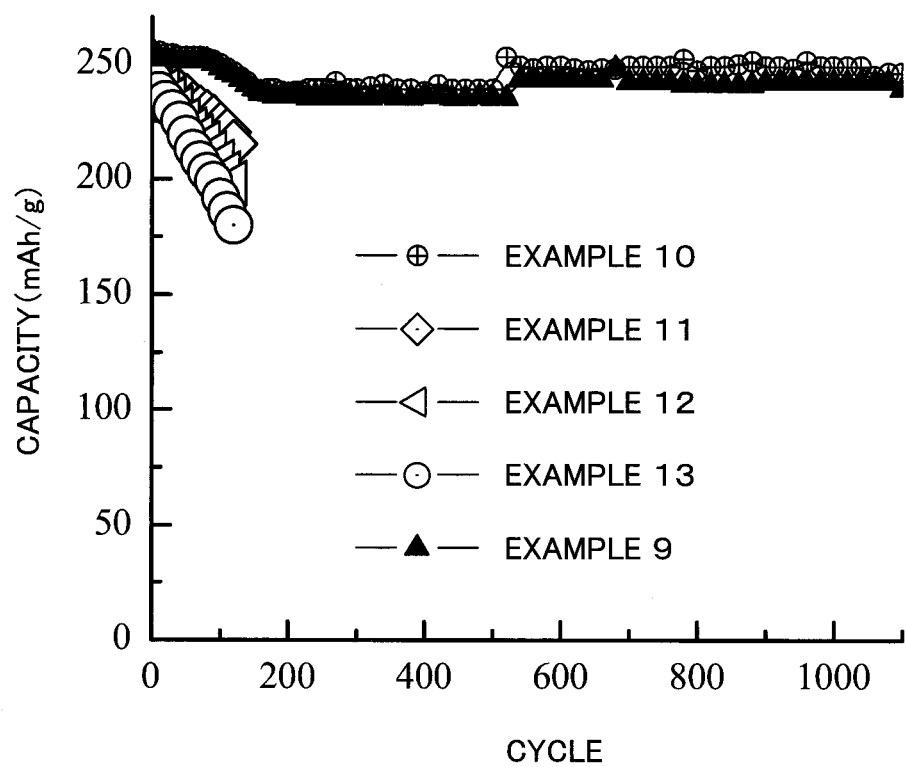
FIG. 15 shows a graph illustrating cycle-life performance of the test cells using the fiber negative electrodes of Examples 9 to 13.

FIG. 15 shows a graph illustrating cycle-life performance of the test cells using the fiber negative electrodes of Examples 9 to 13. It has been confirmed that even when the 1000th cycle has passed, the test cells using the fiber negative electrodes of Examples 9 and 10 maintain a high discharge capacity.

<Suitable Composition of Li—Ni—Bi—O Based Compound>

Figure 16:
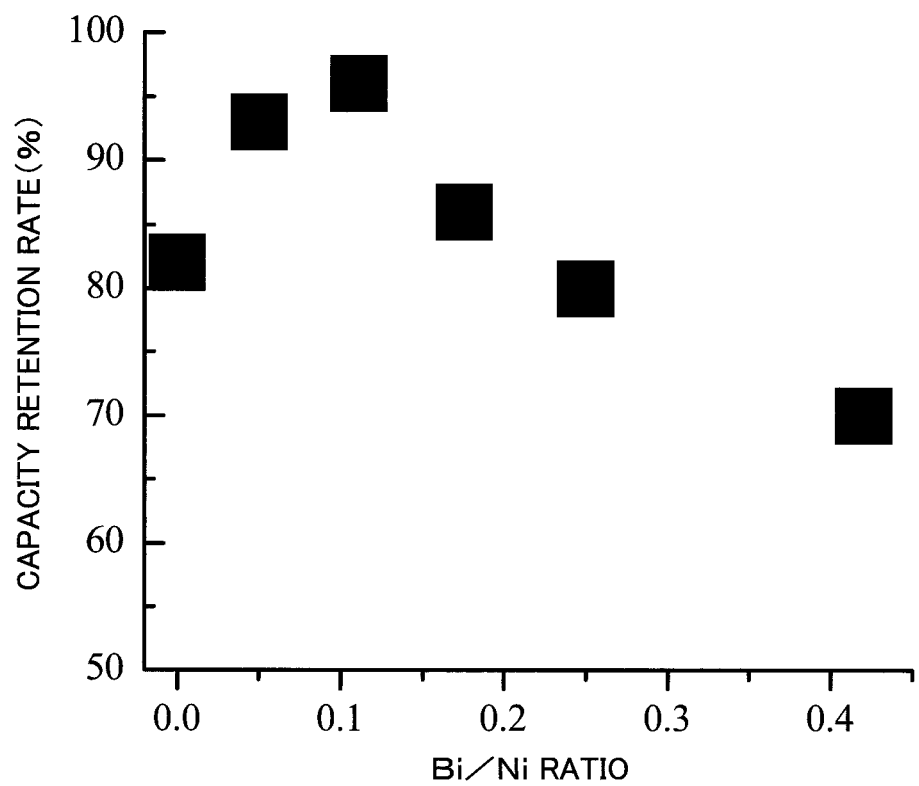
FIG. 16 shows a graph illustrating, for each test cell in the graph of FIG. 15, a relationship between a Bi/Ni ratio (molar ratio) of a Li—Ni—Bi—O based compound, which is a negative electrode active material, and a capacity retention rate (%) at the 1000th cycle.

FIG. 16 shows a graph illustrating, for each test cell in the graph of FIG. 15, a relationship between a Bi/Ni ratio (molar ratio) of a Li—Ni—Bi—O based compound, which is a negative electrode active material, and a capacity retention rate (%) at the 100th cycle. The capacity retention rate (%) herein refers to the following: (capacity at the 100th cycle/capacity at the 1st cycle)×100. It has been confirmed from FIG. 16 that the capacity retention rate of the test cell is high particularly in a case where the Bi/Ni ratio is 0<Bi/Ni≤0.2.

(2-2) Li—Ni—Al—O Based Compound

Example 14

A mixture of an aqueous solution of $Ni(NO_3)_2$ (0.3 mol/L) and an aqueous solution of $Al(NO_3)_3$ (0.008 mol/L) was prepared as an electrodeposition bath. Ammonia water was dripped into the electrodeposition bath to adjust the pH to 4. Similar to Example 9, carbon fibers were coated with $Ni(OH)_2$ and $Al(OH)_3$ by an electrodeposition method. A nickel foil was used as a counter electrode. Here, electrodeposition treatment was performed under the condition of a constant current density of 50 mA/cm² for 10 minutes. The temperature of the electrodeposition bath was an ordinary temperature (approximately 25° C.). After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with NiO and $Al_2O_3$, was obtained. This fiber electrode precursor does not function as a negative electrode of an alkaline secondary battery. Also, none of fiber negative electrode precursors obtained in Examples 15 to 18 described below functions as a negative electrode of an alkaline secondary battery.

The fiber negative electrode precursor was immersed in a sodium hypochlorite aqueous solution (the concentration of sodium hypochlorite: 0.02 mol/L) for approximately 10 seconds. Next, the fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiNi_{0.98}Al_{0.02}O_2$, was obtained.

Example 15

A mixture of an aqueous solution of $Ni(NO_3)_2$ (0.3 mol/L) and an aqueous solution of $Al(NO_3)_3$ (0.025 mol/L) was prepared as an electrodeposition bath. Ammonia water was dripped into the electrodeposition bath to adjust the pH to 4. Similar to Example 9, carbon fibers were coated with $Ni(OH)_2$ and $Al(OH)_3$ by an electrodeposition method. A nickel foil was used as a counter electrode. Here, electrodeposition treatment was performed under the condition of a constant current density of 50 mA/cm² for 10 minutes. The temperature of the electrodeposition bath was an ordinary temperature (approximately 25° C.). After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with NiO and $Al_2O_3$, was obtained.

The fiber negative electrode precursor was immersed in a sodium hypochlorite aqueous solution (the concentration of sodium hypochlorite: 0.02 mol/L) for approximately 10 seconds. Next, the fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter washed with water and dried under reduced pressure at 110° C. for 24 hours or longer. As a result, a fiber negative electrode, which is formed of the carbon fibers having the surface coated with a negative electrode active material $LiNi_{0.92}Al_{0.08}O_2$, was obtained.

The fiber negative electrode precursor, i.e. the carbon fibers having the surface coated with NiO and $Al_2O_3$, was immersed in a lithium hydroxide aqueous solution to which sodium hypochlorite was added (the concentration of sodium hypochlorite: 0.02 mol/L). Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiNi_{0.9}Al_{0.1}O_2$, was obtained.

Example 16

A mixture of an aqueous solution of $Ni(NO_3)_2$ (0.3 mol/L) and an aqueous solution of $Al(NO_3)_3$ (0.052 mol/L) was prepared as an electrodeposition bath. Ammonia water was dripped into the electrodeposition bath to adjust the pH to 4. Similar to Example 9, carbon fibers were coated with $Ni(OH)_2$ and $Al(OH)_3$ by an electrodeposition method. A nickel foil was used as a counter electrode. Here, electrodeposition treatment was performed under the condition of a constant current density of 50 mA/cm² for 10 minutes. The temperature of the electrodeposition bath was an ordinary temperature (approximately 25° C.). After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with NiO and $Al_2O_3$, was obtained.

The fiber negative electrode precursor was immersed in a sodium hypochlorite aqueous solution (the concentration of sodium hypochlorite: 0.02 mol/L) for approximately 10 seconds. Next, the fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiNi_{0.85}Al_{0.15}O_2$, was obtained.

Example 17

A mixture of an aqueous solution of $Ni(NO_3)_2$ (0.3 mol/L) and an aqueous solution of $Al(NO_3)_3$ (0.116 mol/L) was prepared as an electrodeposition bath. Ammonia water was dripped into the electrodeposition bath to adjust the pH to 4. Similar to Example 9, carbon fibers were coated with $Ni(OH)_2$ and $Al(OH)_3$ by an electrodeposition method. A nickel foil was used as a counter electrode. Here, electrodeposition treatment was performed under the condition of a constant current density of 50 mA/cm² for 10 minutes. The temperature of the electrodeposition bath was an ordinary temperature (approximately 25° C.). After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with NiO and $Al_2O_3$, was obtained.

The fiber negative electrode precursor was immersed in a sodium hypochlorite aqueous solution (the concentration of sodium hypochlorite: 0.02 mol/L) for approximately 10 seconds. Next, the fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiNi_{0.72}Al_{0.28}O_2$, was obtained.

[Battery Test 3]

The fiber negative electrodes of Examples 14 to 17 were used as test electrodes. Test cells were fabricated in the following manner: each test electrode was sandwiched by the above-described fiber positive electrodes serving as counter electrodes; a polypropylene nonwoven fabric was disposed as a separator between the positive and negative electrodes; and an aqueous solution in which 6.5 mol/L of potassium hydroxide and 1.5 mol/L of lithium hydroxide were mixed was used as an aqueous electrolyte solution. Charge/discharge tests were performed by using these test cells. Each test cell was formed as a battery, the negative electrode capacity of which was set to be lower than the positive electrode capacity. That is, the battery capacity was limited by the negative electrode. The negative electrode/positive electrode capacity ratio (N/P ratio) was set to 0.5.

Table 3 shows results of battery tests, in which the fiber negative electrodes of Examples 14 to 17 and the negative electrode of Comparative Example were used as test electrodes. In the battery tests, discharging was controlled with reference to a cutoff voltage; a charge/discharge current corresponding to 0.2 C was used; and a charged capacity was set to 350 mAh/g.

TABLE 3

|  | At 1st Cycle | At 100th Cycle | Intermediate Discharge Voltage |
|---|---|---|---|
| Example 14 | 238 mAh/g | 222 mAh/g | Approx. 0.92 V |
| Example 15 | 228 mAh/g | 224 mAh/g | Approx. 0.91 V |
| Example 16 | 216 mAh/g | 212 mAh/g | Approx. 0.89 V |
| Example 17 | 205 mAh/g | 201 mAh/g | Approx. 0.88 V |
| Comparative Example | 120 mAh/g | 79 mAh/g | Approx. 0.8 V |

As is clear from Table 3, each of the test cells using the fiber negative electrodes of Examples 14 to 17 exhibited a higher capacity and a higher capacity retention than those of the test cell using the negative electrode of Comparative Example (i.e., a Ni foil negative electrode). In the case of Example 14, the capacity at the 100th cycle was 93% of the capacity at the 1st cycle. On the other hand, in the case of each of Examples 15 to 17, the capacity at the 100th cycle was 96% or higher than the capacity at the 1st cycle.

Figure 17:
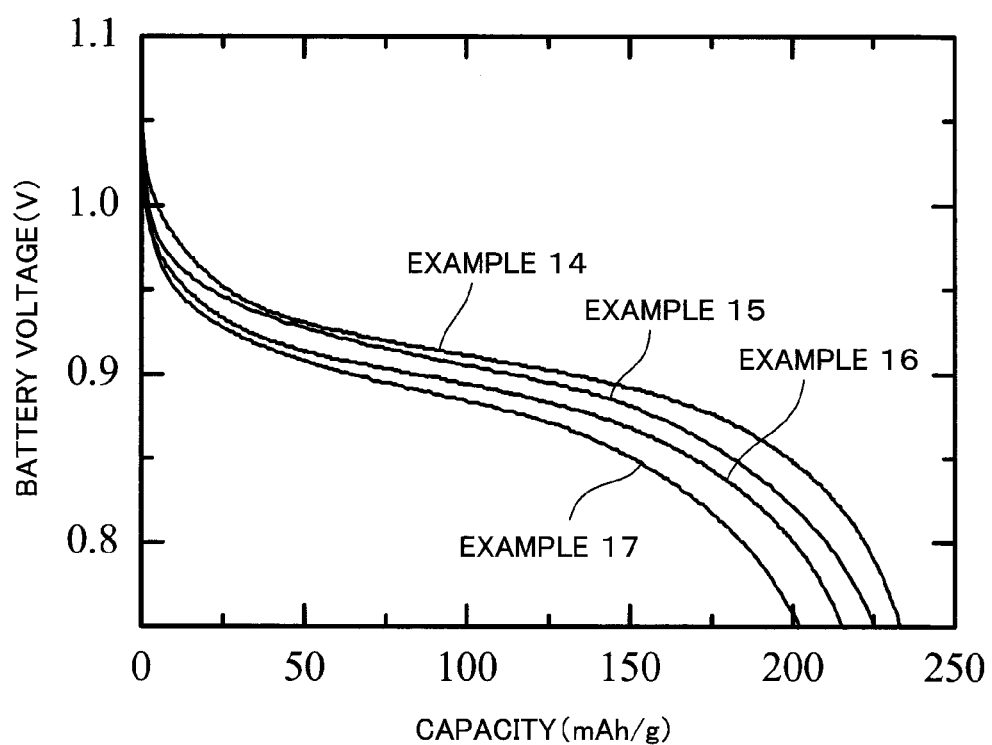
FIG. 17 shows discharge curves (at the 1st cycle) of test cells (secondary batteries) using fiber negative electrodes of Examples 14 to 17.

FIG. 17 shows discharge curves (at the 1st cycle) of the test cells (secondary batteries) using the fiber negative electrodes of Examples 14 to 17. The test cells using the fiber negative electrodes of Examples 14 to 17 showed a tendency for their discharge voltage and discharge capacity to decrease in accordance with an increase in the amount of Al.

Figure 18:
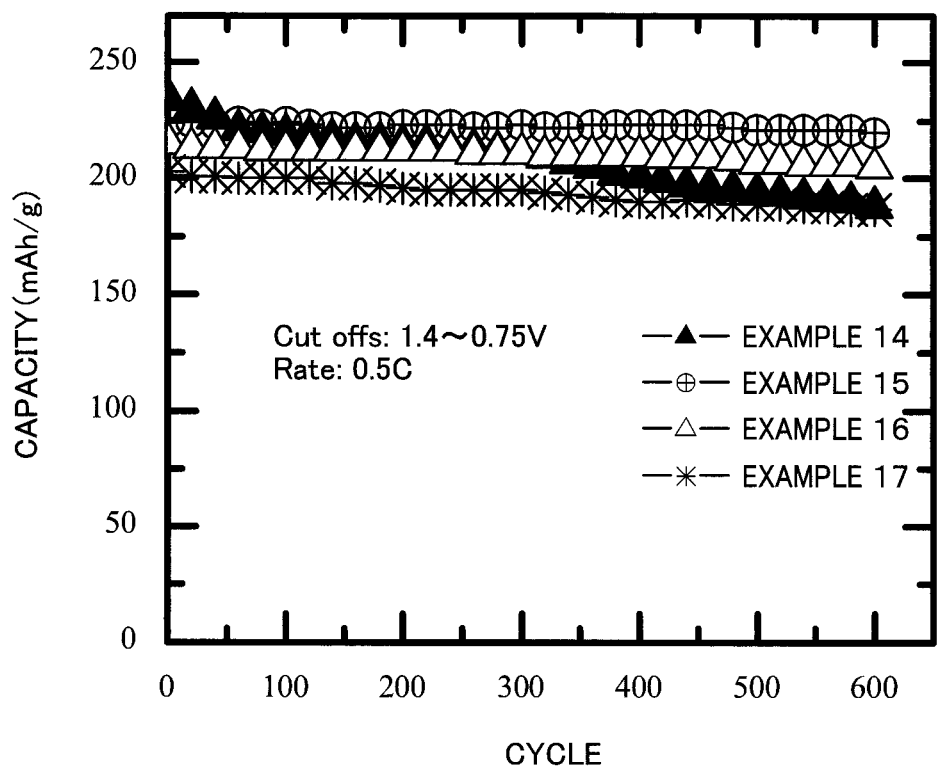
FIG. 18 shows a graph illustrating cycle-life performance of the test cells using the fiber negative electrodes of Examples 14 to 17.

FIG. 18 shows a graph illustrating cycle-life performance of the test cells using the fiber negative electrodes of Examples 14 to 17. It has been confirmed that even when the 600th cycle has passed, the test cells using the fiber negative electrodes of Examples 14, 15, and 16 maintain a high discharge capacity of 90% or higher.

<Suitable Composition of Li—Ni—Al—O Based Compound>

Figure 19:
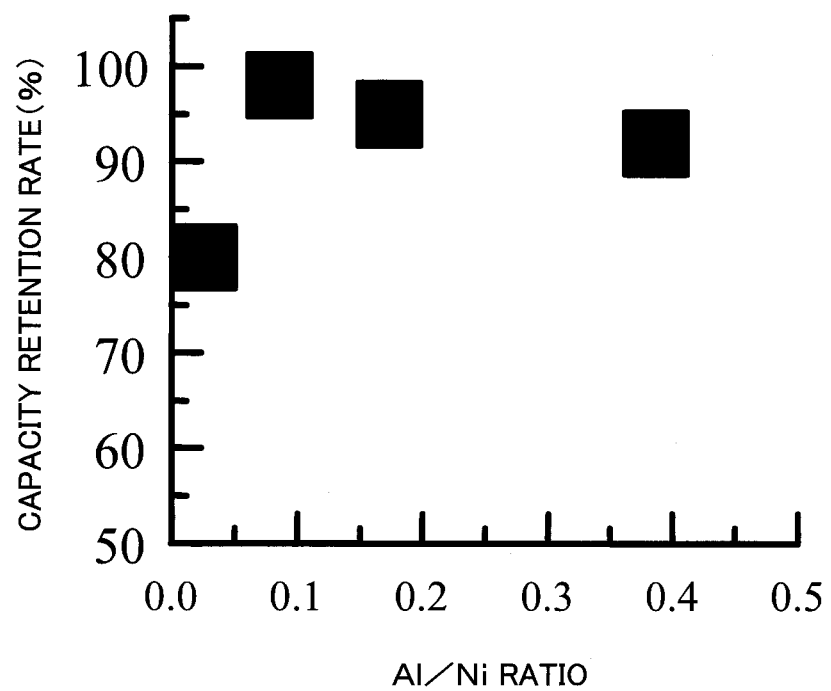
FIG. 19 shows a graph illustrating, for each test cell in the graph of FIG. 17, a relationship between an Al/Ni ratio (molar ratio) of a Li—Ni—Al—O based compound, which is a negative electrode active material, and a capacity retention rate (%) at the 600th cycle.

FIG. 19 shows a graph illustrating, for each test cell in the graph of FIG. 18, a relationship between an Al/Ni ratio (molar ratio) of a Li—Ni—Al—O based compound, which is a negative electrode active material, and a capacity retention rate (%) at the 600th cycle. The capacity retention rate (%) herein refers to the following: (capacity at the 600th cycle/capacity at the 1st cycle)×100. It has been confirmed from FIG. 19 that the capacity retention rate of the test cell is high particularly in a case where the Al/Ni ratio is 0<Al/Ni≤0.3.

(3) Li—Mn—Ce/Bi/Al—O Based Compound (3-1) Li—Mn—Bi—O Based Compound

Example 18

A mixture of an aqueous solution of $Mn(NO_3)_2$ (0.3 mol/L) and an aqueous solution of $Ce(NO_3)_3$ (0.006 mol/L) was prepared as an electrodeposition bath. Ammonia water was dripped into the electrodeposition bath to adjust the pH to 4. Similar to Example 9, carbon fibers were coated with $Mn_3O_4$ and $CeO_2$ by an electrodeposition method. A nickel foil was used as a counter electrode. Here, electrodeposition treatment was performed under the condition of a constant current density of 50 mA/cm² for 10 minutes. The temperature of the electrodeposition bath was an ordinary temperature (approximately 25° C.). After the electrodeposition treatment was performed, the carbon fibers were washed with water and then dried under an air atmosphere at a temperature of 70° C. for 24 hours or longer. As a result, a fiber negative electrode precursor, which is formed of the carbon fibers having the surface coated with $Mn_3O_4$ and $CeO_2$, was obtained. This fiber electrode precursor does not function as a negative electrode of an alkaline secondary battery. Also, none of fiber negative electrode precursors obtained in Examples 19 and 20 described below functions as a negative electrode of an alkaline secondary battery.

The fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 120° C. for 20 hours or longer. As a result, a fiber negative electrode, which is formed of the carbon fibers having the surface coated with a negative electrode active material $LiNi_{0.98}Ce_{0.02}O_2$, was obtained.

Example 19

A mixture of an aqueous solution of $Mn(NO_3)_2$ (0.3 mol/L) and an aqueous solution of $Ce(NO_3)_3$ (0.03 mol/L) was prepared as an electrodeposition bath. Ammonia water was dripped into the electrodeposition bath to adjust the pH to 4. Similar to Example 9, carbon fibers were coated with $Mn_3O_4$ and $CeO_2$ by an electrodeposition method. A nickel foil was used as a counter electrode. Here, electrodeposition treatment was performed under the condition of a constant current density of 50 mA/cm² for 10 minutes. The temperature of the electrodeposition bath was an ordinary temperature (approximately 25° C.). After the electrodeposition treatment was performed, the carbon fibers were washed with water and then dried under an air atmosphere at a temperature of 70° C. for 24 hours or longer. As a result, a fiber negative electrode precursor, which is formed of the carbon fibers having the surface coated with $Mn_3O_4$ and $CeO_2$, was obtained.

The fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 120° C. for 20 hours or longer. As a result, a fiber negative electrode, which is formed of the carbon fibers having the surface coated with a negative electrode active material $LiMn_{0.9}Ce_{0.1}O_2$, was obtained.

Example 20

A mixture of an aqueous solution of $Mn(NO_3)_2$ (0.3 mol/L) and an aqueous solution of $Ce(NO_3)_3$ (0.075 mol/L) was prepared as an electrodeposition bath. Ammonia water was dripped into the electrodeposition bath to adjust the pH to 4. Similar to Example 9, carbon fibers were coated with $Mn_3O_4$ and $CeO_2$ by an electrodeposition method. A nickel foil was used as a counter electrode. Here, electrodeposition treatment was performed under the condition of a constant current density of 50 mA/cm² for 10 minutes. The temperature of the electrodeposition bath was an ordinary temperature (approximately 25° C.). After the electrodeposition treatment was performed, the carbon fibers were washed with water and then dried under an air atmosphere at a temperature of 70° C. for 24 hours or longer. As a result, a fiber negative electrode precursor, which is formed of the carbon fibers having the surface coated with $Mn_3O_4$ and $CeO_2$, was obtained.

The fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 120° C. for 20 hours or longer. As a result, a fiber negative electrode, which is formed of the carbon fibers having the surface coated with a negative electrode active material $LiMn_{0.8}Ce_{0.2}O_2$, was obtained.

[Battery Test 4]

The fiber negative electrodes of Examples 18 to 20 were used as test electrodes. Test cells were fabricated in the following manner: each test electrode was sandwiched by the above-described fiber positive electrodes serving as counter electrodes; a polypropylene nonwoven fabric was disposed as a separator between the positive and negative electrodes; and an aqueous solution in which 6.5 mol/L of potassium hydroxide and 1.5 mol/L of lithium hydroxide were mixed was used as an aqueous electrolyte solution. Charge/discharge tests were performed by using these test cells. Each test cell was formed as a battery, the negative electrode capacity of which was set to be lower than the positive electrode capacity. That is, the battery capacity was limited by the negative electrode. The negative electrode/positive electrode capacity ratio (N/P ratio) was set to 0.5.

Table 4 shows results of battery tests, in which the fiber negative electrodes of Examples 18 to 20 and the negative electrode of Comparative Example were used as test electrodes. In the battery tests, discharging was controlled with reference to a cutoff voltage; a charge/discharge current corresponding to 0.2 C was used; and a charged capacity was set to 350 mAh/g.

TABLE 4

|  | At 1st Cycle | At 100th Cycle | Intermediate Discharge Voltage |
|---|---|---|---|
| Example 18 | 245 mAh/g | 228 mAh/g | Approx. 0.92 V |
| Example 19 | 245 mAh/g | 235 mAh/g | Approx. 0.91 V |
| Example 20 | 210 mAh/g | 205 mAh/g | Approx. 0.9 V |
| Comparative Example | 120 mAh/g | 79 mAh/g | Approx. 0.8 V |

As is clear from Table 4, each of the test cells using the fiber negative electrodes of Examples 18 to 20 exhibited a higher capacity and a higher capacity retention than those of the test cell using the negative electrode of Comparative Example (i.e., a Ni foil negative electrode). At the 100th cycle, each of the test cells using the fiber negative electrodes of Examples 18 to 20 exhibited a capacity which was approximately 93 to 97% of its capacity at the 1st cycle.

Figure 20:
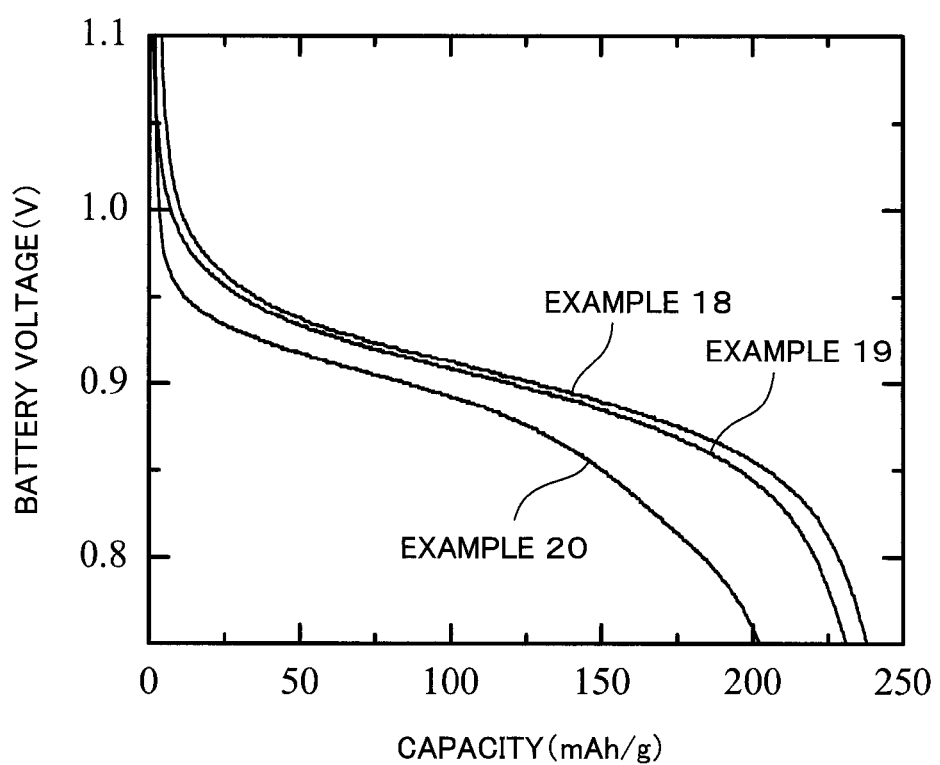
FIG. 20 shows discharge curves (at the 150th cycle) of test cells (secondary batteries) using fiber negative electrodes of Examples 18 to 20.

FIG. 20 shows discharge curves (at the 150th cycle) of the test cells (secondary batteries) using the fiber negative electrodes of Examples 18 to 20. All of the test cells using the fiber negative electrodes of Examples 18 to 20 exhibited a discharge voltage of approximately 0.9 V. These test cells showed a tendency for their discharge voltage and discharge capacity to decrease in accordance with an increase in the amount of Ce.

Figure 21:
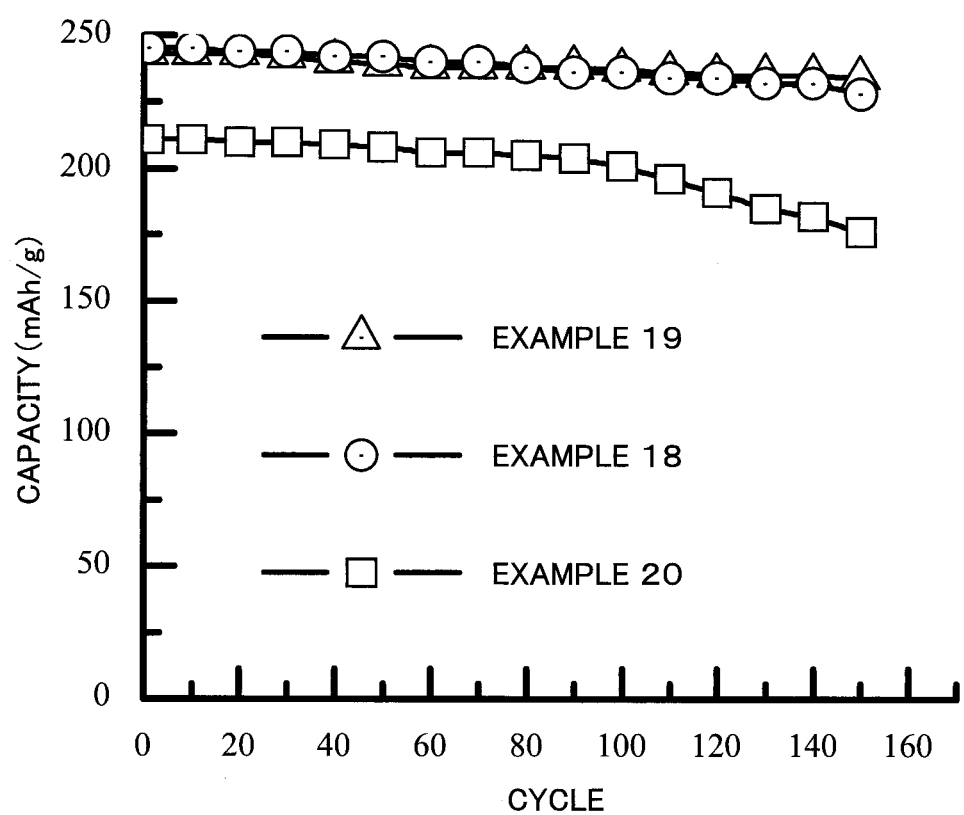
FIG. 21 shows a graph illustrating cycle-life performance of the test cells using the fiber negative electrodes of Examples 18 to 20.

FIG. 21 shows a graph illustrating cycle-life performance of the test cells using the fiber negative electrodes of Examples 18 to 20. Among these test cells, the test cell using the fiber negative electrode of Example 18 exhibited a greater capacity decrease than that of the other test cells. At the 150th cycle, the capacity of the test cell using the fiber negative electrode of Example 18 was approximately 85% of its capacity at the 1st cycle. It has been confirmed that even when the 150th cycle has passed, the capacity decrease of the test cells using the fiber negative electrodes of Examples 19 and 20 is small and these test cells maintain a discharge capacity of approximately 230 mAh/g.

<Suitable Composition of Li—Mn—Ce—O Based Compound>

Figure 22:
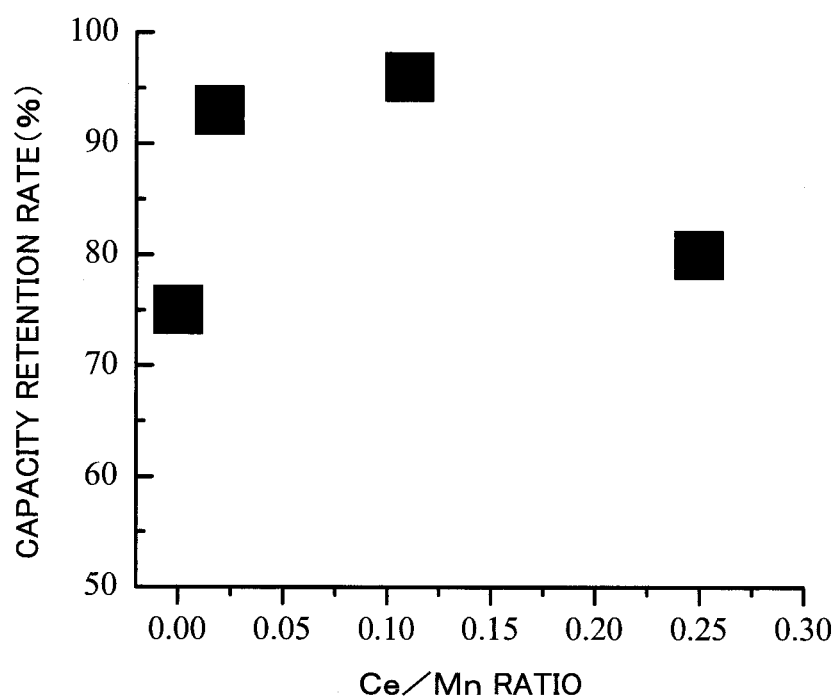
FIG. 22 shows a graph illustrating, for each test cell in the graph of FIG. 21, a relationship between a Ce/Mn ratio (molar ratio) of a Li—Mn—Ce—O based compound, which is a negative electrode active material, and a capacity retention rate (%) at the 150th cycle.

FIG. 22 shows a graph illustrating, for each test cell in the graph of FIG. 21, a relationship between a Ce/Mn ratio (molar ratio) of a Li—Mn—Ce—O based compound, which is a negative electrode active material, and a capacity retention rate (%) at the 150th cycle. The capacity retention rate (%) herein refers to the following: (capacity at the 150th cycle/capacity at the 1st cycle)×100. It has been confirmed from FIG. 22 that the capacity retention rate of the test cell is high particularly in a case where the Ce/Mn ratio is 0<Ce/Mn<0.25.

(3-2) Li—Mn—Bi—O Based Compound

Example 21

A mixture of an aqueous solution of $Mn(NO_3)_2$ (0.3 mol/L) and an aqueous solution of $Bi(NO_3)_3$ (0.008 mol/L) was prepared as an electrodeposition bath. Ammonia water was dripped into the electrodeposition bath to adjust the pH to 4. Similar to Example 9, carbon fibers were coated with $Mn_3O_4$ and $Bi_2O_3$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 70° C. for 24 hours or longer. As a result, a fiber negative electrode precursor, which is formed of the carbon fibers having the surface coated with $Mn_3O_4$ and $Bi_2O_3$, was obtained. This fiber electrode precursor does not function as a negative electrode of an alkaline secondary battery. Also, none of fiber negative electrode precursors obtained in Examples 22 to 24 described below functions as a negative electrode of an alkaline secondary battery.

The fiber negative electrode precursor was sealed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.98}Bi_{0.02}O_2$, was obtained.

Example 22

A mixture of an aqueous solution of $Mn(NO_3)_2$ (0.3 mol/L) and an aqueous solution of $Bi(NO_3)_3$ (0.015 mol/L) was prepared as an electrodeposition bath. Ammonia water was dripped into the electrodeposition bath to adjust the pH to 4. Similar to Example 9, carbon fibers were coated with $Mn_3O_4$ and $Bi_2O_3$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 70° C. for 24 hours or longer. As a result, a fiber negative electrode precursor, which is formed of the carbon fibers having the surface coated with $Mn_3O_4$ and $Bi_2O_3$, was obtained.

The fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.96}Bi_{0.04}O_2$, was obtained.

Example 23

A mixture of an aqueous solution of $Mn(NO_3)_2$ (0.3 mol/L) and an aqueous solution of $Bi(NO_3)_3$ (0.03 mol/L) was prepared as an electrodeposition bath. Ammonia water was dripped into the electrodeposition bath to adjust the pH to 4. Similar to Example 9, carbon fibers were coated with $Mn_3O_4$ and $Bi_2O_3$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 70° C. for 24 hours or longer. As a result, a fiber negative electrode precursor, which is formed of the carbon fibers having the surface coated with $Mn_3O_4$ and $Bi_2O_3$, was obtained.

The fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.9}Bi_{0.1}O_2$, was obtained.

Example 24

A mixture of an aqueous solution of $Mn(NO_3)_2$ (0.3 mol/L) and an aqueous solution of $Bi(NO_3)_3$ (0.075 mol/L) was prepared as an electrodeposition bath. Ammonia water was dripped into the electrodeposition bath to adjust the pH to 4. Similar to Example 9, carbon fibers were coated with $Mn_3O_4$ and $Bi_2O_3$ by an electrodeposition method. A nickel foil was used as a counter electrode. Here, electrodeposition treatment was performed under the condition of a constant current density of 50 mA/cm² for 10 minutes. The temperature of the electrodeposition bath was an ordinary temperature (approximately 25° C.). After the electrodeposition treatment was performed, the carbon fibers were washed with water and then dried under an air atmosphere at a temperature of 70° C. for 24 hours or longer. As a result, a fiber negative electrode precursor, which is formed of the carbon fibers having the surface coated with $Mn_3O_4$ and $Bi_2O_3$, was obtained.

The fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.8}Bi_{0.2}O_2$, was obtained.

[Battery Test 5]

The fiber negative electrodes of Examples 21 to 24 were used as test electrodes. Test cells were fabricated in the following manner: each test electrode was sandwiched by the above-described fiber positive electrodes serving as counter electrodes; a polypropylene nonwoven fabric was disposed as a separator between the positive and negative electrodes; and an aqueous solution in which 6.5 mol/L of potassium hydroxide and 1.5 mol/L of lithium hydroxide were mixed was used as an aqueous electrolyte solution. Charge/discharge tests were performed by using these test cells. Each test cell was formed as a battery, the negative electrode capacity of which was set to be lower than the positive electrode capacity. That is, the battery capacity was limited by the negative electrode. The negative electrode/positive electrode capacity ratio (N/P ratio) was set to 0.5.

Table 5 shows results of battery tests, in which the fiber negative electrodes of Examples 21 to 24 and the negative electrode of Comparative Example were used as test electrodes. In the battery tests, discharging was controlled with reference to a cutoff voltage; a charge/discharge current corresponding to 0.2 C was used; and a charged capacity was set to 350 mAh/g.

TABLE 5

|  | At 1st Cycle | At 100th Cycle | Intermediate Discharge Voltage |
|---|---|---|---|
| Example 21 | 272 mAh/g | 267 mAh/g | Approx. 0.99 V |
| Example 22 | 270 mAh/g | 266 mAh/g | Approx. 0.98 V |
| Example 23 | 260 mAh/g | 252 mAh/g | Approx. 0.98 V |
| Example 24 | 250 mAh/g | 244 mAh/g | Approx. 0.98 V |
| Comparative Example | 120 mAh/g | 79 mAh/g | Approx. 0.8 V |

As is clear from Table 5, each of the test cells using the fiber negative electrodes of Examples 21 to 24 exhibited a higher capacity and a higher capacity retention than those of the test cell using the negative electrode of Comparative Example (i.e., a Ni foil negative electrode). At the 100th cycle, each of the test cells using the fiber negative electrodes of Examples 21 to 24 exhibited a capacity which was approximately 97 to 98% of its capacity at the 1st cycle.

Figure 23:
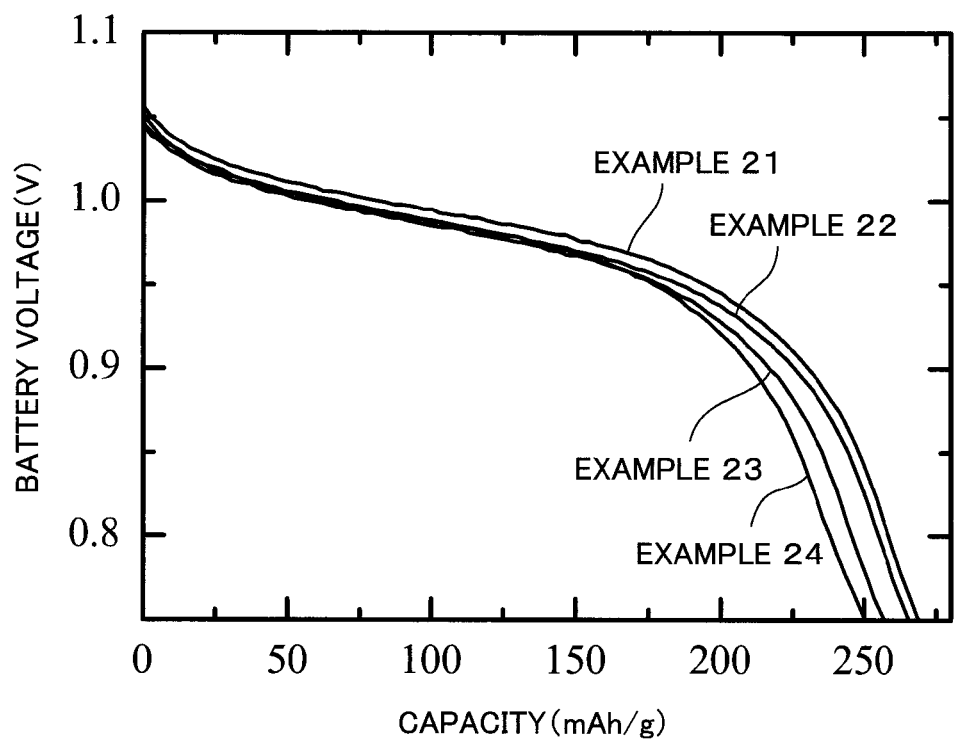
FIG. 23 shows discharge curves (at the 1st cycle) of test cells (secondary batteries) using fiber negative electrodes of Examples 21 to 24.

FIG. 23 shows discharge curves (at the 1st cycle) of the test cells (secondary batteries) using the fiber negative electrodes of Examples 21 to 24. All of the test cells using the fiber negative electrodes of Examples 21 to 24 maintained a discharge voltage of approximately 0.98 V. These test cells showed a tendency for their charge voltage to decrease by approximately 20 mAh/g in accordance with an increase in the amount of Ce.

Figure 24:
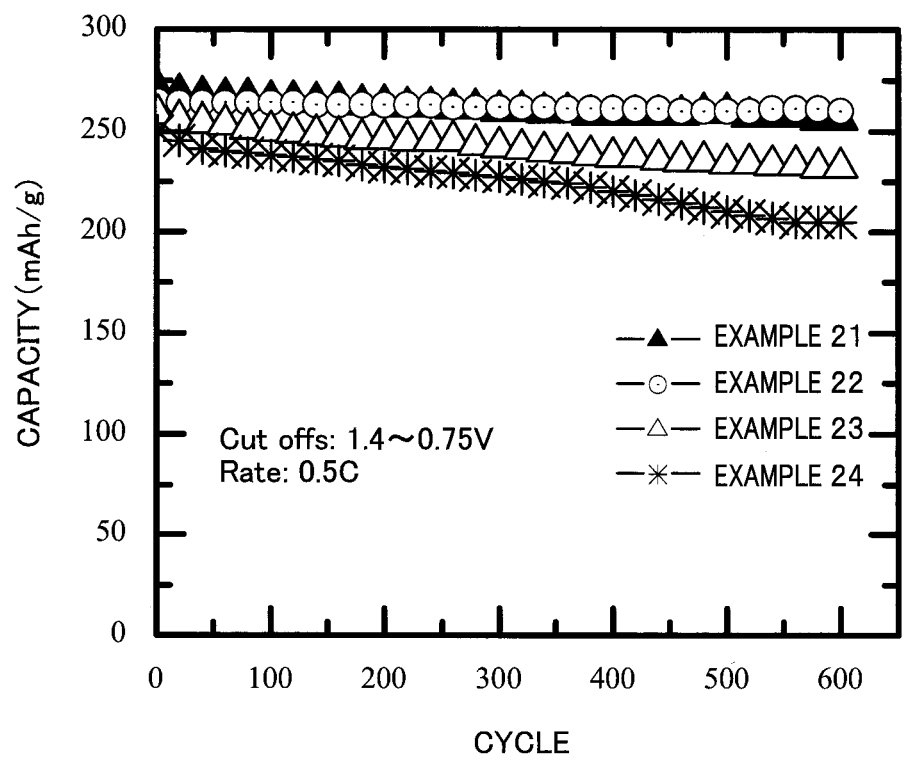
FIG. 24 shows a graph illustrating cycle-life performance of the test cells using the fiber negative electrodes of Examples 21 to 24.

FIG. 24 shows a graph illustrating cycle-life performance of the test cells using the fiber negative electrodes of Examples 21 to 24. Among these test cells, the test cells using the fiber negative electrodes of Examples 23 and 24, each of which contains Bi in a large amount, showed a tendency for their capacity to decrease at a greater degree than the other test cells. On the other hand, the test cells using the fiber negative electrodes of Examples 21 and 22, each of which contains Bi in a small amount, showed almost no capacity decrease even when the 600th cycle had passed.

<Suitable Composition of Li—Mn—Bi—O Based Compound>

Figure 25:
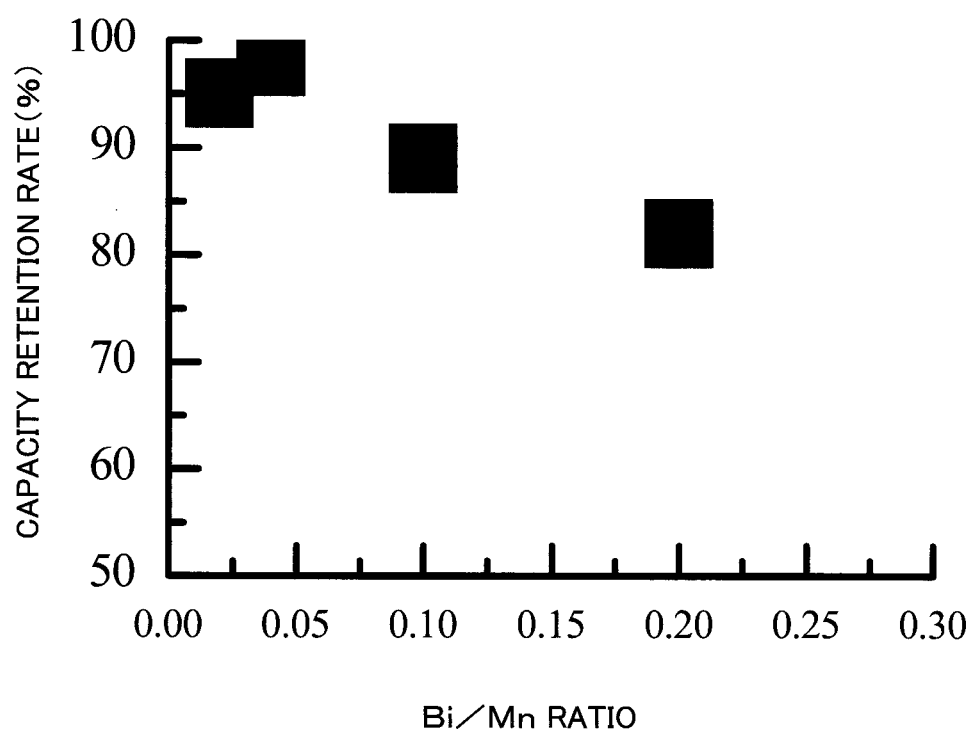
FIG. 25 shows a graph illustrating, for each test cell in the graph of FIG. 24, a relationship between a Bi/Mn ratio (molar ratio) of a Li—Mn—Bi—O based compound, which is a negative electrode active material, and a capacity retention rate (%) at the 600th cycle.

FIG. 25 shows a graph illustrating, for each test cell in the graph of FIG. 24, a relationship between a Bi/Mn ratio (molar ratio) of a Li—Mn—Bi—O based compound, which is a negative electrode active material, and a capacity retention rate (%) at the 600th cycle. The capacity retention rate (%) herein refers to the following: (capacity at the 600th cycle/capacity at the 1st cycle)×100. It has been confirmed from FIG. 25 that the capacity retention rate of the test cell is high particularly in a case where the Bi/Mn ratio is 0<Bi/Mn≤0.1.

(3-3) Li—Mn—Al—O Based Compound

Example 25

A mixture of an aqueous solution of $Mn(NO_3)_2$ (0.3 mol/L) and an aqueous solution of $Al(NO_3)_3$ (0.008 mol/L) was prepared as an electrodeposition bath. Ammonia water was dripped into the electrodeposition bath to adjust the pH to 4. Similar to Example 9, carbon fibers were coated with $Mn_3O_4$ and $Al(OH)_3$ by an electrodeposition method. A nickel foil was used as a counter electrode. Here, electrodeposition treatment was performed under the condition of a constant current density of 50 mA/cm² for 10 minutes. The temperature of the electrodeposition bath was an ordinary temperature (approximately 25° C.). After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with $Mn_3O_4$ and $Al_2O_3$, was obtained. This fiber electrode precursor does not function as a negative electrode of an alkaline secondary battery. Also, none of fiber negative electrode precursors obtained in Examples 26 to 28 described below functions as a negative electrode of an alkaline secondary battery.

The fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.98}Al_{0.02}O_2$, was obtained.

Example 26

A mixture of an aqueous solution of $Mn(NO_3)_2$ (0.3 mol/L) and an aqueous solution of $Al(NO_3)_3$ (0.015 mol/L) was prepared as an electrodeposition bath. Ammonia water was dripped into the electrodeposition bath to adjust the pH to 4. Similar to Example 9, carbon fibers were coated with $Mn_3O_4$ and $Al(OH)_3$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with $Mn_3O_4$ and $Al_2O_3$, was obtained.

The fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.95}Al_{0.05}O_2$, was obtained.

Example 27

A mixture of an aqueous solution of $Mn(NO_3)_2$ (0.3 mol/L) and an aqueous solution of $Al(NO_3)_3$ (0.04 mol/L) was prepared as an electrodeposition bath. Ammonia water was dripped into the electrodeposition bath to adjust the pH to 4. Similar to Example 9, carbon fibers were coated with $Mn_3O_4$ and $Al(OH)_3$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with $Mn_3O_4$ and $Al_2O_3$, was obtained.

The fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.88}Al_{0.12}O_2$, was obtained.

Example 28

A mixture of an aqueous solution of $Mn(NO_3)_2$ (0.3 mol/L) and an aqueous solution of $Al(NO_3)_3$ (0.08 mol/L) was prepared as an electrodeposition bath. Ammonia water was dripped into the electrodeposition bath to adjust the pH to 4. Similar to Example 9, carbon fibers were coated with $Mn_3O_4$ and $Al(OH)_3$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 130° C. for 24 hours or longer. As a result, a fiber negative electrode precursor, which is formed of the carbon fibers having the surface coated with $Mn_3O_4$ and $Al_2O_3$, was obtained.

The fiber negative electrode precursor was immersed in 3 mol/L of lithium hydroxide aqueous solution to which 0.5 g/L of hydrogen peroxide solution ($H_2O_2$) was added. Then, the fiber negative electrode precursor was hydrothermally treated under the condition of 110° C. for 20 hours, and thereafter dried under reduced pressure at 110° C. for 24 hours or longer. As a result, a fiber negative electrode, which is formed of the carbon fibers having the surface coated with a negative electrode active material $LiMn_{0.78}Al_{0.22}O_2$, was obtained.

[Battery Test 6]

The fiber negative electrodes of Examples 25 to 28 were used as test electrodes. Test cells were fabricated in the following manner: each test electrode was sandwiched by the above-described fiber positive electrodes serving as counter electrodes; a polypropylene nonwoven fabric was disposed as a separator between the positive and negative electrodes; and an aqueous solution in which 6.5 mol/L of potassium hydroxide and 1.5 mol/L of lithium hydroxide were mixed was used as an aqueous electrolyte solution. Charge/discharge tests were performed by using these test cells. Each test cell was formed as a battery, the negative electrode capacity of which was set to be lower than the positive electrode capacity. That is, the battery capacity was limited by the negative electrode. The negative electrode/positive electrode capacity ratio (N/P ratio) was set to 0.5.

Table 6 shows results of battery tests, in which the fiber negative electrodes of Examples 25 to 28 and the negative electrode of Comparative Example were used as test electrodes. In the battery tests, discharging was controlled with reference to a cutoff voltage; a charge/discharge current corresponding to 0.2 C was used; and a charged capacity was set to 350 mAh/g.

TABLE 6

|  | At 1st Cycle | At 100th Cycle | Intermediate Discharge Voltage |
|---|---|---|---|
| Example 25 | 248 mAh/g | 242 mAh/g | Approx. 0.91 V |
| Example 26 | 235 mAh/g | 229 mAh/g | Approx. 0.9 V |
| Example 27 | 226 mAh/g | 217 mAh/g | Approx. 0.89 V |
| Example 28 | 215 mAh/g | 210 mAh/g | Approx. 0.88 V |
| Comparative Example | 120 mAh/g | 79 mAh/g | Approx. 0.8 V |

As is clear from Table 6, each of the test cells using the fiber negative electrodes of Examples 25 to 28 exhibited a higher capacity and a higher capacity retention than those of the test cell using the negative electrode of Comparative Example (i.e., a Ni foil negative electrode). In the case of Example 28, the capacity at the 100th cycle was approximately 90% of the capacity at the 1st cycle. On the other hand, in the case of each of Examples 25 to 27, the capacity at the 100th cycle was approximately 97 to 98% of the capacity at the 1st cycle.

Figure 26:
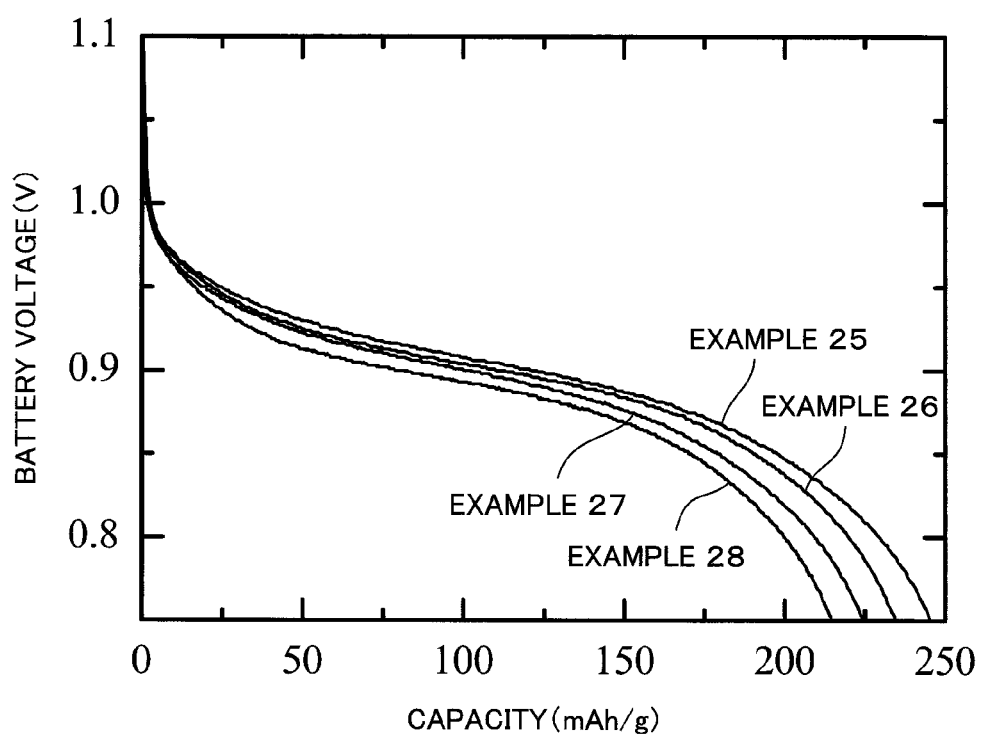
FIG. 26 shows discharge curves (at the 1st cycle) of test cells (secondary batteries) using fiber negative electrodes of Examples 25 to 28.

FIG. 26 shows discharge curves (at the 1st cycle) of the test cells (secondary batteries) using the fiber negative electrodes of Examples 25 to 28. All of the test cells using the fiber negative electrodes of Examples 25 to 28 maintained a discharge voltage of approximately 0.9 V. These test cells showed a tendency for their discharge voltage to decrease in accordance with an increase in the amount of Al.

Figure 27:
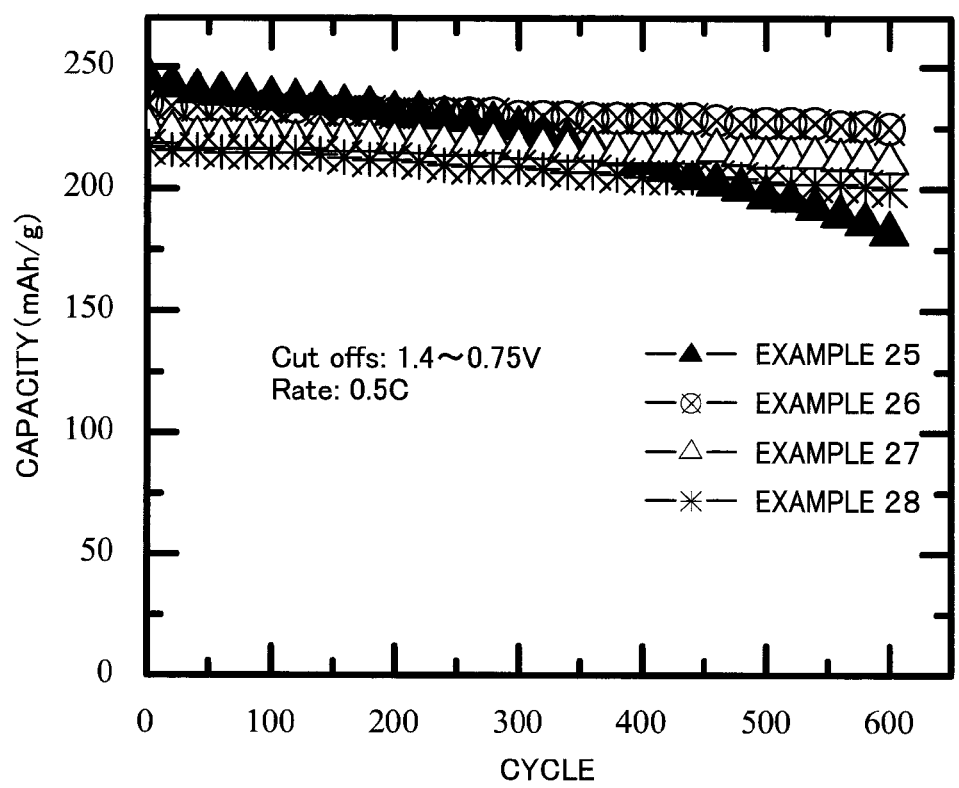
FIG. 27 shows a graph illustrating cycle-life performance of the test cells using the fiber negative electrodes of Examples 25 to 28.

FIG. 27 shows a graph illustrating cycle-life performance of the test cells using the fiber negative electrodes of Examples 25 to 28. As is clear from FIG. 27, the test cell using the fiber negative electrode of Example 25, which contains Al in a small amount, showed a significant capacity decrease when the 600th cycle had passed. On the other hand, the test cells using the fiber negative electrodes of Examples 26 to 28 did not show any significant capacity decrease even when the 600th cycle had passed.

<Suitable Composition of Li—Mn—Al—O Based Compound>

Figure 28:
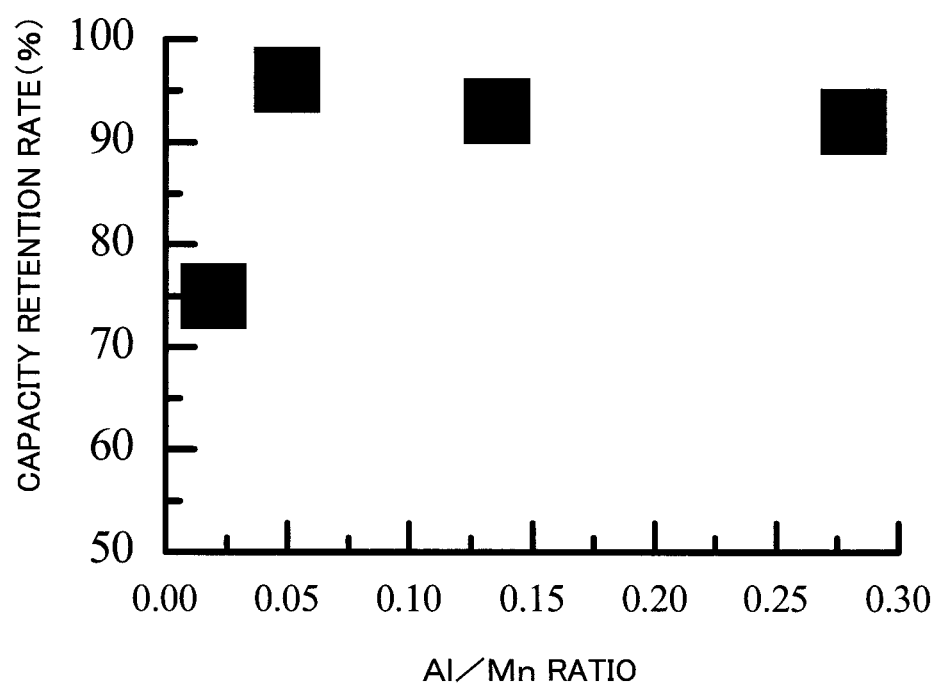
FIG. 28 shows a graph illustrating, for each test cell in the graph of FIG. 27, a relationship between an Al/Mn ratio (molar ratio) of a Li—Mn—Al—O based compound, which is a negative electrode active material, and a capacity retention rate (%) at the 600th cycle.

FIG. 28 shows a graph illustrating, for each test cell in the graph of FIG. 27, a relationship between an Al/Mn ratio (molar ratio) of a Li—Mn—Al—O based compound, which is a negative electrode active material, and a capacity retention rate (%) at the 600th cycle. The capacity retention rate (%) herein refers to the following: (capacity at the 600th cycle/capacity at the 1st cycle)×100. It has been confirmed from FIG. 28 that the capacity retention rate of the test cell is high particularly in a case where the Al/Mn ratio is 0.02<Al/Mn<0.3.

(4) Na—Mn—O Based Compound

Example 29

An aqueous solution of $Mn(NO_3)_2$ (0.3 mol/L) was prepared as an electrodeposition bath. Ammonia water was dripped into the electrodeposition bath to adjust the pH to 4. Similar to Example 9, carbon fibers were coated with $Mn_3O_4$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 70° C. for 24 hours or longer. As a result, a fiber negative electrode precursor, which is formed of the carbon fibers having the surface coated with $Mn_3O_4$, was obtained. This fiber electrode precursor does not function as a negative electrode of an alkaline secondary battery. Also, none of fiber negative electrode precursors obtained in Examples 30 to 33 described below functions as a negative electrode of an alkaline secondary battery.

The fiber negative electrode precursor was immersed in an aqueous solution obtained by adding 2 wt % of hydrogen peroxide solution to 3 mol/L of sodium hydroxide aqueous solution. The fiber negative electrode precursor in such an immersed state was sealed and then hydrothermally treated under the condition of 120° C. for 20 hours, and thereafter dried under reduced pressure at 110° C. for 24 hours or longer. As a result, a fiber negative electrode, which is formed of the carbon fibers having the surface coated with a negative electrode active material $Na_{0.42}MnO_2$, was obtained.

Example 30

An aqueous solution of $Mn(NO_3)_2$ (0.3 mol/L) was prepared as an electrodeposition bath. Ammonia water was dripped into the electrodeposition bath to adjust the pH to 4. Similar to Example 9, carbon fibers were coated with $Mn_3O_4$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 70° C. for 24 hours or longer. As a result, a fiber negative electrode precursor, which is formed of the carbon fibers having the surface coated with $Mn_3O_4$, was obtained.

The fiber negative electrode precursor was immersed in an aqueous solution obtained by adding 4 wt % of hydrogen peroxide solution to 4 mol/L of sodium hydroxide aqueous solution. The fiber negative electrode precursor in such an immersed state was sealed and then hydrothermally treated under the condition of 120° C. for 20 hours, and thereafter dried under reduced pressure at 110° C. for 24 hours or longer. As a result, a fiber negative electrode, which is formed of the carbon fibers having the surface coated with a negative electrode active material $Na_{0.51}MnO_2$, was obtained.

Example 31

An aqueous solution of $Mn(NO_3)_2$ (0.3 mol/L) was prepared as an electrodeposition bath. Ammonia water was dripped into the electrodeposition bath to adjust the pH to 4. Similar to Example 9, carbon fibers were coated with $Mn_3O_4$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere at a temperature of 70° C. for 24 hours or longer. As a result, a fiber negative electrode precursor, which is formed of the carbon fibers having the surface coated with $Mn_3O_4$, was obtained.

The fiber negative electrode precursor was immersed in an aqueous solution obtained by adding 6 wt % of hydrogen peroxide solution to 3 mol/L of sodium hydroxide aqueous solution. The fiber negative electrode precursor in such an immersed state was sealed and then hydrothermally treated under the condition of 120° C. for 30 hours, and thereafter dried under reduced pressure at 110° C. for 24 hours or longer. As a result, a fiber negative electrode, which is formed of the carbon fibers having the surface coated with a negative electrode active material $Na_{0.63}MnO_2$, was obtained.

Example 32

An aqueous solution of $Mn(NO_3)_2$ (0.3 mol/L) was prepared as an electrodeposition bath. Ammonia water was dripped into the electrodeposition bath to adjust the pH to 4. Similar to Example 9, carbon fibers were coated with $Mn_3O_4$ by an electrodeposition method. A nickel foil was used as a counter electrode. Here, electrodeposition treatment was performed under the condition of a constant current density of 50 mA/cm$^2$ for 10 minutes. The temperature of the electrodeposition bath was an ordinary temperature (approximately 25° C.). After the electrodeposition treatment was performed, the carbon fibers were washed with water and then dried under an air atmosphere for 24 hours or longer. As a result, a fiber negative electrode precursor, which is formed of the carbon fibers having the surface coated with $Mn_3O_4$, was obtained.

The fiber negative electrode precursor was immersed in an aqueous solution obtained by adding 8 wt % of hydrogen peroxide solution to 4 mol/L of sodium hydroxide aqueous solution. The fiber negative electrode precursor in such an immersed state was sealed and then hydrothermally treated under the condition of 120° C. for 30 hours, and thereafter dried under reduced pressure at 110° C. for 24 hours or longer. As a result, a fiber negative electrode, which is formed of the carbon fibers having the surface coated with a negative electrode active material $Na_{0.77}MnO_2$, was obtained.

Example 33

An aqueous solution of $Mn(NO_3)_2$ (0.3 mol/L) was prepared as an electrodeposition bath. Ammonia water was dripped into the electrodeposition bath to adjust the pH to 4. Similar to Example 9, carbon fibers were coated with $Mn_3O_4$ by an electrodeposition method. A nickel foil was used as a counter electrode. Here, electrodeposition treatment was performed under the condition of a constant current density of 50 mA/cm² for 10 minutes. The temperature of the electrodeposition bath was an ordinary temperature (approximately 25° C.). After the electrodeposition treatment was performed, the carbon fibers were washed with water and then dried under an air atmosphere at a temperature of 70° C. for 24 hours or longer. As a result, a fiber negative electrode precursor, which is formed of the carbon fibers having the surface coated with $Mn_3O_4$, was obtained.

The fiber negative electrode precursor was immersed in an aqueous solution obtained by adding 8 wt % of hydrogen peroxide solution to 3 mol/L of sodium hydroxide aqueous solution. The fiber negative electrode precursor in such an immersed state was sealed and then hydrothermally treated under the condition of 130° C. for 20 hours, and thereafter dried under reduced pressure at 110° C. for 24 hours or longer. As a result, a fiber negative electrode, which is formed of the carbon fibers having the surface coated with a negative electrode active material $Na_{0.83}MnO_2$, was obtained.

[Battery Test 7]

The fiber negative electrodes of Examples 29 to 33 were used as test electrodes. Test cells were fabricated in the following manner: each test electrode was sandwiched by the above-described fiber positive electrodes serving as counter electrodes; a polypropylene nonwoven fabric was disposed as a separator between the positive and negative electrodes; and an aqueous solution in which 6.5 mol/L of potassium hydroxide and 1.5 mol/L of lithium hydroxide were mixed was used as an aqueous electrolyte solution. Charge/discharge tests were performed by using these test cells. Each test cell was formed as a battery, the negative electrode capacity of which was set to be lower than the positive electrode capacity. That is, the battery capacity was limited by the negative electrode. The negative electrode/positive electrode capacity ratio (N/P ratio) was set to 0.5.

Table 7 shows results of battery tests, in which the fiber negative electrodes of Examples 29 to 33 and the negative electrode of Comparative Example were used as test electrodes. In the battery tests, discharging was controlled with reference to a cutoff voltage; a charge/discharge current corresponding to 0.2 C was used; and a charged capacity was set to 350 mAh/g.

TABLE 7

|  | At 1st Cycle | At 100th Cycle | Intermediate Discharge Voltage |
| --- | --- | --- | --- |
| Example 29 | 360 mAh/g | 340 mAh/g | Approx. 1.0 V |
| Example 30 | 345 mAh/g | 327 mAh/g | Approx. 1.01 V |
| Example 31 | 326 mAh/g | 324 mAh/g | Approx. 0.99 V |
| Example 32 | 320 mAh/g | 301 mAh/g | Approx. 1.0 V |
| Example 33 | 290 mAh/g | 275 mAh/g | Approx. 0.98 V |
| Comparative Example | 120 mAh/g | 79 mAh/g | Approx. 0.8 V |

As is clear from Table 7, each of the test cells using the fiber negative electrodes of Examples 29 to 33 exhibited a higher capacity and a higher capacity retention than those of the test cell using the negative electrode of Comparative Example (i.e., a Ni foil negative electrode). At the 100th cycle, each of the test cells using the fiber negative electrodes of Examples 29 to 33 exhibited a capacity which was approximately 94 to 95% of its capacity at the 1st cycle.

Figure 29:
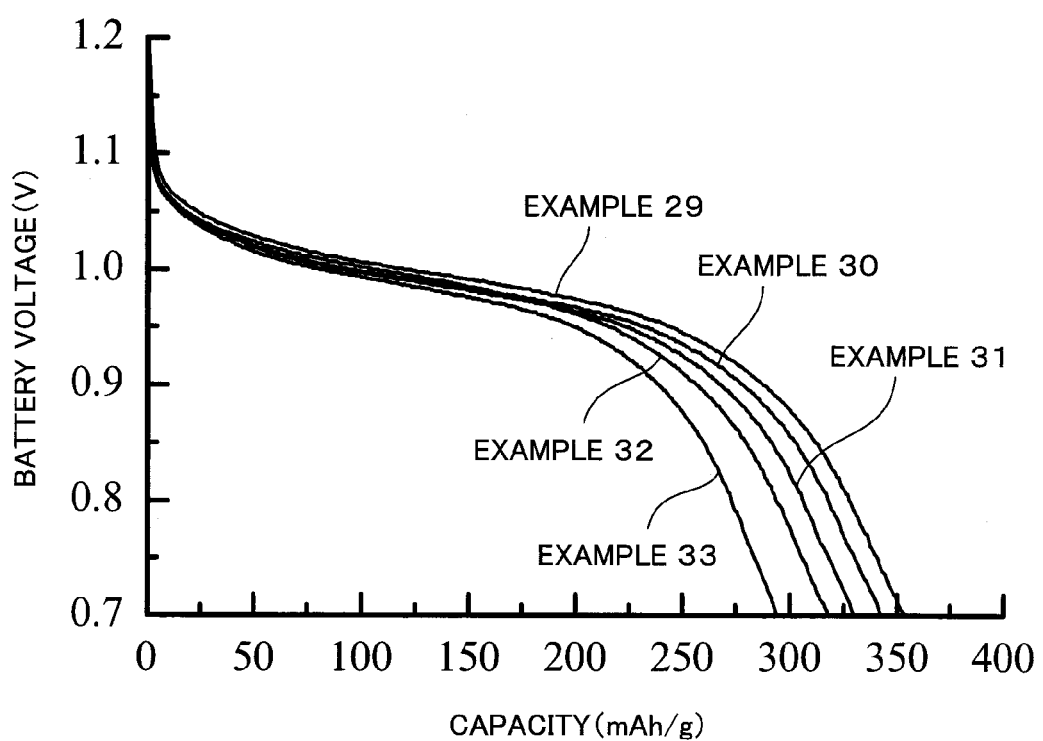
FIG. 29 shows discharge curves (at the 1st cycle) of test cells (secondary batteries) using fiber negative electrodes of Examples 29 to 33.

FIG. 29 shows discharge curves (at the 1st cycle) of the test cells (secondary batteries) using the fiber negative electrodes of Examples 29 to 33. All of the test cells using the fiber negative electrodes of Examples 29 to 33 showed a tendency for their discharge voltage to decrease in accordance with an increase in the amount of Na, but maintained a discharge voltage of approximately 1 V.

Figure 30:
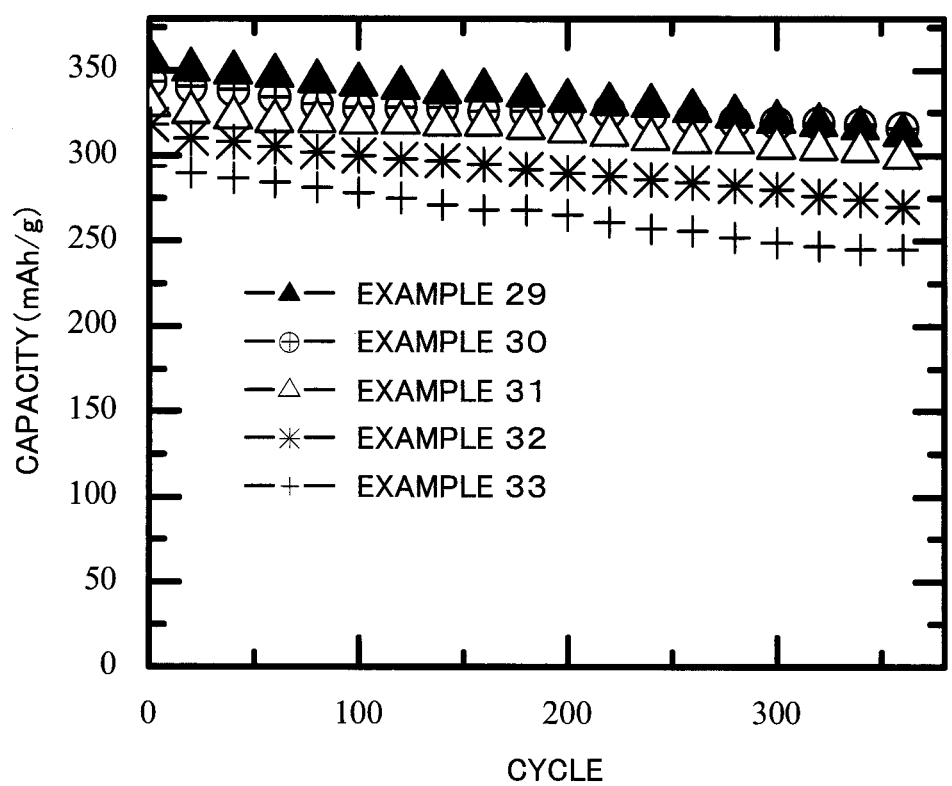
FIG. 30 shows a graph illustrating cycle-life performance of the test cells using the fiber negative electrodes of Examples 29 to 33.

FIG. 30 shows a graph illustrating cycle-life performance of the test cells using the fiber negative electrodes of Examples 29 to 33. All of the test cells using the fiber negative electrodes of Examples 29 to 33 showed a tendency for their capacity to gradually decrease from early cycles to the 350th cycle in accordance with an increase in the number of performed cycles.

<Suitable Composition of Na—Mn—O Based Compound>

Figure 31:
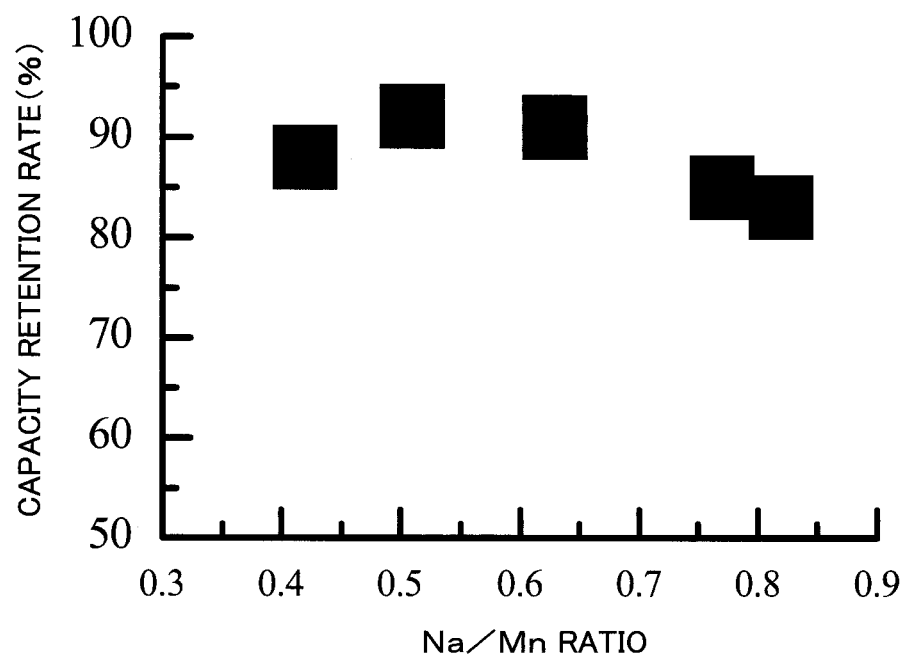
FIG. 31 shows a graph illustrating, for each test cell in the graph of FIG. 30, a relationship between a Na/Mn ratio (molar ratio) of a Na—Mn—O based compound, which is a negative electrode active material, and a capacity retention rate (%) at the 350th cycle.

FIG. 31 shows a graph illustrating, for each test cell in the graph of FIG. 30, a relationship between a Na/Mn ratio (molar ratio) of a Na—Mn—O based compound, which is a negative electrode active material, and a capacity retention rate (%) at the 350th cycle. The capacity retention rate (%) herein refers to the following: (capacity at the 350th cycle/capacity at the 1st cycle)×100. It has been confirmed from FIG. 31 that the capacity retention rate of the test cell is high particularly in a case where the Na/Mn ratio is 0.4<Na/Mn<0.85.

INDUSTRIAL APPLICABILITY

In the field of batteries, a negative electrode for use in a secondary battery and a secondary battery including the negative electrode, according to the present invention, are useful as a secondary battery in which protons serve as an intercalating species and as a negative electrode for use in such a secondary battery.

Generally speaking, the capacity of a hydrogen storage alloy used for a negative electrode of a nickel-metal hydride battery gradually degrades due to repeated charging and discharging. The reason for this is considered that when hydrogen absorption and desorption are repeated through charging and discharging, cracks occurs to the alloy and thereby a new interface is exposed and then corroded by an electrolyte solution. Due to the corrosion, the absolute amount of the alloy decreases, and the amount of hydrogen the alloy can absorb decreases, accordingly. This results in a capacity decrease. In the case of a nickel-metal hydride battery, the capacity of which is limited by the negative electrode, it is considered that the capacity decreases to approximately 60 to 80% of its initial capacity when 100 to 300 cycles have passed, although such a capacity decrease depends on the composition of the hydrogen storage alloy. The capacity of nickel-metal hydride batteries in practical use is limited by their positive electrode. For such a nickel-metal hydride battery, it is often the case that the negative electrode/positive electrode capacity ratio (N/P ratio) is set to 2 or greater for the purpose of maintaining durability up to 300 to 1000 cycles.

The Li—Ni—Bi—O based compound and the Li—Mn—Bi—O based compound, each of which is used as the negative electrode active material of the fiber negative electrode according to the present invention, are obtained by adding a small amount of Bi to base compounds that are a Li—Mn—O based compound and a Li—Ni—O based compound. The Li—Ni—Bi—O based compound and the Li—Mn—Bi—O based compound obtained in this manner exhibit almost no capacity decrease even when 600 to 1000 cycles have passed, and exhibit better cycle-life performance than conventional hydrogen storage alloy negative electrode active materials. The Li—Ni—Bi—O based compound and the Li—Mn—Bi—O based compound, each of which is used as the negative electrode active material of the fiber negative electrode according to the present invention, are less likely to cause degradation in the cycle-life performance when applied in a battery of which the capacity is limited by its negative electrode. For this reason, the N/P ratio can be set within a wide range in accordance with the intended use of the battery.

For example, generally speaking, the N/P ratio is set to 2 to 2.5 in the case of a conventional nickel-metal hydride battery so that the battery's characteristics can be maintained even if negative electrode degradation has occurred after cycles are repeated. However, in the case of the fiber negative electrode according to the present invention, the N/P ratio can be set to be less than 2 since negative electrode degradation is less likely to occur. Since the capacity of the fiber negative electrode according to the present invention can be made small, space for accommodating the negative electrode in a battery can be reduced, which makes more space available for accommodating the positive electrode. Thus, it is expected that the energy density of the battery can be increased.

If the capacity of the negative electrode accommodated in a battery is N and the capacity of the positive electrode accommodated in the battery is P, then the N/P ratio represents the ratio of the negative electrode capacity to the positive electrode capacity. In a case where a conventional nickel-metal hydride battery, a nickel-zinc battery, or a nickel-cadmium battery is put in practical use, if such a battery with a small N/P ratio is overcharged, then hydrogen is evolved from the negative electrode, causing an increase in gas pressure within the sealed battery, which is dangerous. For this reason, in general, the N/P ratio is set to a large value so that hydrogen will not be easily evolved. In the case of a nickel-metal hydride battery, when charging and discharging are repeated, an alloy negative electrode is gradually corroded, which may cause a decrease in the battery capacity. Therefore, it is often the case that the N/P ratio is set to be relatively large such that N/P>2.

In a case where Al is added to a Li—Ni—O compound or a Li—Mn—O compound, it is known that a high discharge capacity and a high discharge capacity retention are obtained although in this case the voltage is lower by approximately 0.1 V than in a case where Bi is added to the compound. The reserves of Al are more abundant than the reserves of Bi. Accordingly, Al is considered to be more suitable as a raw material for industrial secondary batteries since there is a possibility that such industrial secondary batteries are mass-manufactured in a large scale.

In a case where a Li—Mn—Ce—O based compound is used as a negative electrode active material, the capacity decreases to approximately 95% of the initial capacity when approximately 150 cycles have passed. Thus, in the case of using a Li—Mn—Ce—O based compound as a negative electrode active material, cycle durability is lower than in the case of using a Li—Ni—Bi—O based compound as a negative electrode active material. However, in the case of using the Li—Mn—Ce—O based compound, most of the constituent elements of the compound are Mn and O. Therefore, in this case, the raw material cost can be kept lower than that in the case of conventional alloy negative electrodes.

A fiber negative electrode in which a Na—Mn—O based compound is used as a negative electrode active material exhibits a discharged capacity which is higher, by approximately 50 to 100 mAh/g, than that of a fiber negative electrode in which a Li-based oxide different from the Na—Mn—O based compound is used as a negative electrode active material. Na is less expensive than Li. Mn is less expensive than transition metals such as Ni and Co, and also less expensive than rare earth elements.

As described above, the negative electrode for use in a secondary battery and the secondary battery including the negative electrode, according to the present invention, allow the composition of the negative electrode active material to be selected in accordance with its intended use and price.

REFERENCE SIGNS LIST

1: left side die
2: right side die
3: fiber negative electrode
4: fiber positive electrode/separator stacked bodies
5: cutter
6: fixed base
7: fiber electrode stack
8: adhesive
9: positive electrode exposed portion
10: negative electrode exposed portion
11: fiber positive electrode
12: fiber negative electrode
21: fiber electrode stack
22: spacer
23: battery casing
24: spacer
25: cover
26: fiber battery (unit battery)
31: unit battery stack
32: insulating framework member
33, 34: electrically conductive framing member
35: battery stack (high-capacity battery)
36, 37: battery module

The invention claimed is:
1. A secondary battery comprising:
at least one fiber negative electrode, each fiber negative electrode including a carbon fiber and a negative electrode active material coating, the negative electrode active material coating being formed on a surface of the carbon fiber, the negative electrode active material coating containing a compound represented by a chemical formula 1;
at least one fiber positive electrode, each fiber positive electrode including a carbon fiber and a positive electrode active material coating, the positive electrode active material coating being formed on a surface of the carbon fiber, the positive electrode active material coating containing nickel hydroxide;
an aqueous electrolyte solution; and
a separator, wherein
the negative electrode active material coating has a surface that is uncoated with an electrically conductive material,
the chemical formula 1 is $LiMn_eNi_fO_2$, in which $1 \le f/e \le 1.5$,
protons are an intercalating species of the secondary battery,
the at least one fiber negative electrode directly absorbs the protons that move from the at least one fiber positive electrode in charging, and the at least one fiber negative electrode directly desorbs the protons that move to the at least one fiber positive electrode in discharging.

2. The secondary battery according to claim 1, wherein
the at least one fiber negative electrode comprises a plurality of fiber negative electrodes,
the at least one fiber positive electrode comprises a plurality of fiber positive electrodes,
the fiber negative electrodes and the fiber positive electrodes are stacked alternately in such a manner that horizontal end positions of the fiber negative electrodes and horizontal end positions of the fiber positive electrodes are displaced from each other, and
a stack of the fiber negative electrodes and the fiber positive electrodes is press-formed vertically.

3. The secondary battery according to claim 2, wherein
a separator coating is formed on the fiber negative electrodes or on the fiber positive electrodes.

4. The secondary battery according to claim 2, wherein
a negative electrode terminal is disposed at end portions of the fiber negative electrodes of the press-formed stack, and
a positive electrode terminal is disposed at end portions of the fiber positive electrodes of the press-formed stack.

5. The secondary battery according to claim 2, wherein the fiber negative electrode and the fiber positive electrode, which are alternately stacked, are fixed by an adhesive there between.

6. A battery stack comprising:
a plurality of the secondary batteries according to claim 1;
an insulating framework member; and
an electrically conductive framing member.

7. A battery module comprising a plurality of the secondary batteries according to claim 1, the secondary batteries being stacked.

8. A battery module comprising a plurality of the battery stacks according to claim 6, the battery stacks being stacked.

9. A fiber negative electrode, comprising:
a carbon fiber; and
a negative electrode active material coating formed on a surface of the carbon fiber, the negative electrode active material coating containing a compound represented by a chemical formula 1, wherein
the chemical formula 1 is $LiMn_e Ni_f O_2$, in which $1 \leq f/e \leq 1.5$, and
wherein the fiber negative electrode is provided in a secondary battery having an aqueous electrolyte solution and protons as an intercalating species of the secondary battery,
the fiber negative electrode directly absorbs the protons in charging, and
the fiber negative electrode directly desorbs the protons in discharging.

* * * * *